US012639302B2

(12) United States Patent
Saupe et al.

(10) Patent No.: US 12,639,302 B2
(45) Date of Patent: May 26, 2026

(54) SPILLING A HASH SET STRUCTURE TO DISK IN CONJUNCTION WITH EXECUTING A SET OPERATION VIA A DATABASE SYSTEM

(71) Applicant: Ocient Holdings LLC, Chicago, IL (US)

(72) Inventors: Ellis Mihalko Saupe, University City, MO (US); Andrew Park, St. Charles, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 19/014,732

(22) Filed: Jan. 9, 2025

(65) Prior Publication Data

US 2026/0133966 A1 May 14, 2026

Related U.S. Application Data

(60) Provisional application No. 63/719,409, filed on Nov. 12, 2024.

(51) Int. Cl.
| *G06F 16/24* | (2019.01) |
| *G06F 16/22* | (2019.01) |
| *G06F 16/2453* | (2019.01) |

(52) U.S. Cl.
CPC .... *G06F 16/24537* (2019.01); *G06F 16/2255* (2019.01)

(58) Field of Classification Search
CPC .................................................. G06F 16/24537
USPC .......................................................... 707/698
See application file for complete search history.

(56) References Cited

U.S. PATENT DOCUMENTS

| 5,548,770 | A | 8/1996 | Bridges |
| 6,230,200 | B1 | 5/2001 | Forecast |
| 6,633,772 | B2 | 10/2003 | Ford |
| 7,499,907 | B2 | 3/2009 | Brown |
| 7,908,242 | B1 | 3/2011 | Achanta |
| 8,126,870 | B2 * | 2/2012 | Chowdhuri ....... G06F 16/24532 |
| | | | 707/713 |
| 8,352,494 | B1 * | 1/2013 | Badoiu ............... G06F 16/5838 |
| | | | 707/780 |

(Continued)

OTHER PUBLICATIONS

A new high performance fabric for HPC, Michael Feldman, May 2016, Intersect360 Research.

(Continued)

*Primary Examiner* — Syling Yen
(74) *Attorney, Agent, or Firm* — Garlick & Markison; Timothy W. Markison

(57) ABSTRACT

A database system is operable to, in response to the spill to disk condition being met, spill a hash set structure to disk based on partitioning a set of hash values of the hash set structure into a plurality of hash buckets written to disk memory resources. Each of a remaining incoming subset of input rows of a plurality of input rows are processed while the spill to disk condition is met based on storing an un-hashed row value of the each of the remaining incoming subset of input rows into one of a plurality of row buckets written to the disk memory resources. In response to completing processing of all of the plurality of input rows, output rows of an output row set are generated based on processing the plurality of hash buckets and the plurality of row buckets.

16 Claims, 64 Drawing Sheets

(56) References Cited

U.S. PATENT DOCUMENTS

| | | | |
|---|---|---|---|
| 12,072,887 | B1 | 8/2024 | Schieferstein |
| 12,117,986 | B1 | 10/2024 | Veselova |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2018/0081946 | A1* | 3/2018 | Bondalapati ........ G06F 16/2456 |
| 2018/0300330 | A1* | 10/2018 | Samwel ............. G06F 16/2456 |
| 2020/0117649 | A1 | 4/2020 | Arnold |
| 2021/0191942 | A1 | 6/2021 | Arnold |
| 2021/0216548 | A1 | 7/2021 | Arnold |
| 2021/0240713 | A1 | 8/2021 | Kondiles |
| 2022/0043690 | A1 | 2/2022 | Kondiles |
| 2022/0043755 | A1 | 2/2022 | Kondiles |
| 2022/0043787 | A1 | 2/2022 | Kondiles |
| 2022/0382751 | A1 | 12/2022 | Dhuse |
| 2023/0091018 | A1 | 3/2023 | Arnold |
| 2023/0385277 | A1 | 11/2023 | Schmidt |
| 2023/0385278 | A1 | 11/2023 | Bove |
| 2023/0418827 | A1 | 12/2023 | Kondiles |
| 2024/0004882 | A1 | 1/2024 | Bove |
| 2024/0134858 | A1 | 4/2024 | Schieferstein |
| 2024/0143595 | A1 | 5/2024 | Bove |
| 2024/0370433 | A1 | 11/2024 | Kondiles |
| 2024/0370439 | A1 | 11/2024 | Veselova |
| 2024/0411815 | A1 | 12/2024 | Saupe |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable. html.

Distributed Systems, Fall2012, Mohsen Taheriyan, http://www-scf. usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti.

* cited by examiner database system 10 computing device 18 computing device 18 computing device 18 node 37 node 37 node 37

DB OS = DataBase Operating Sysetm
CD OS = computing device operating system node 37 data set 32 columns 80 rows or records

OCTH00455-03
17/64

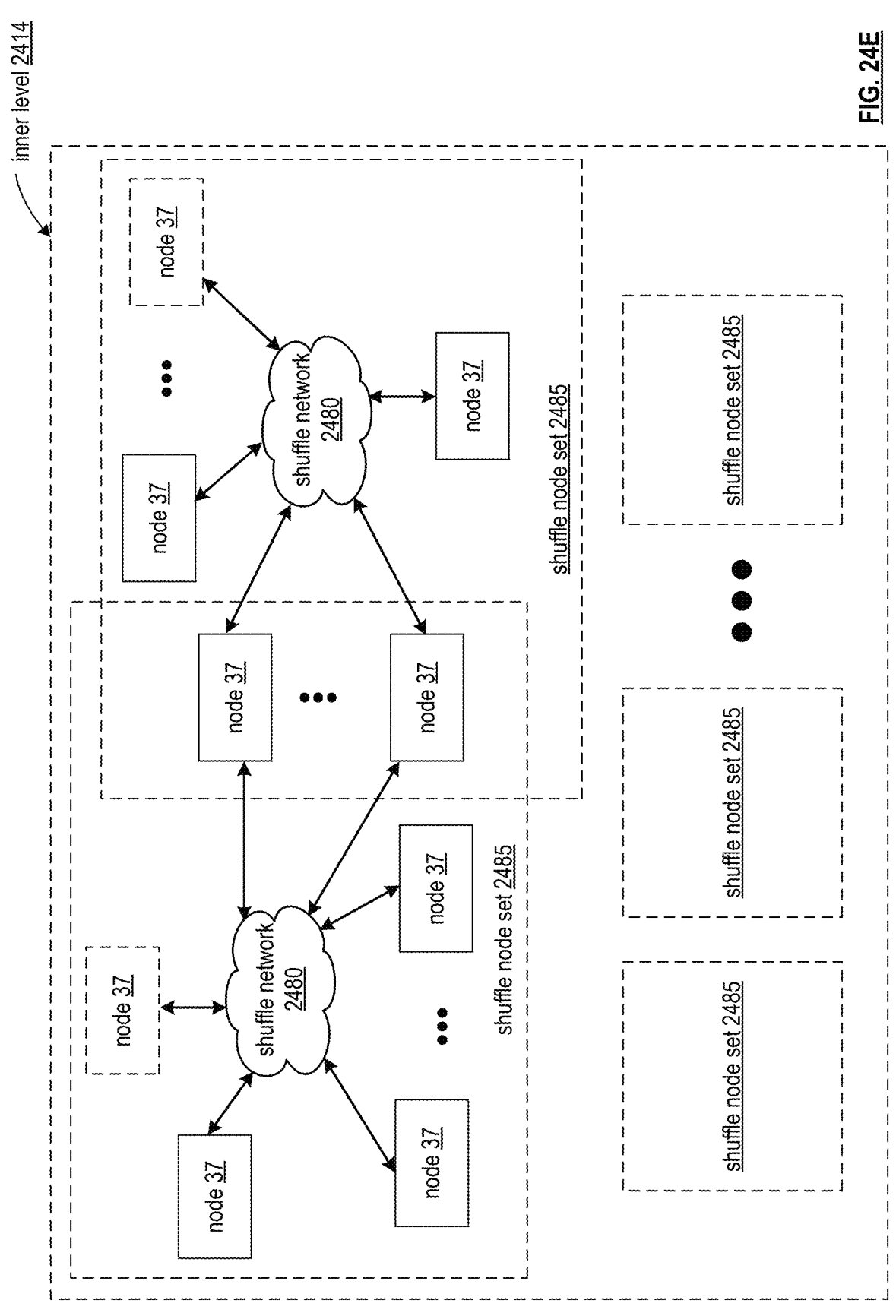

query processing system 2502 query execution module
2504 database system 10 database system 10 query execution module 2504 database
system 10 database system 10 query processing system 2510 query processing system 2510 database system 10 database
system 10 query execution module 2504 database system 10 query execution module 2504 query execution module 2504 database system 10 database system 10 database system 10 database system 10 database system 10 query execution module 2504 query
execution
module 2504 query execution module 2504 query
execution
module 2504 query execution module 2504

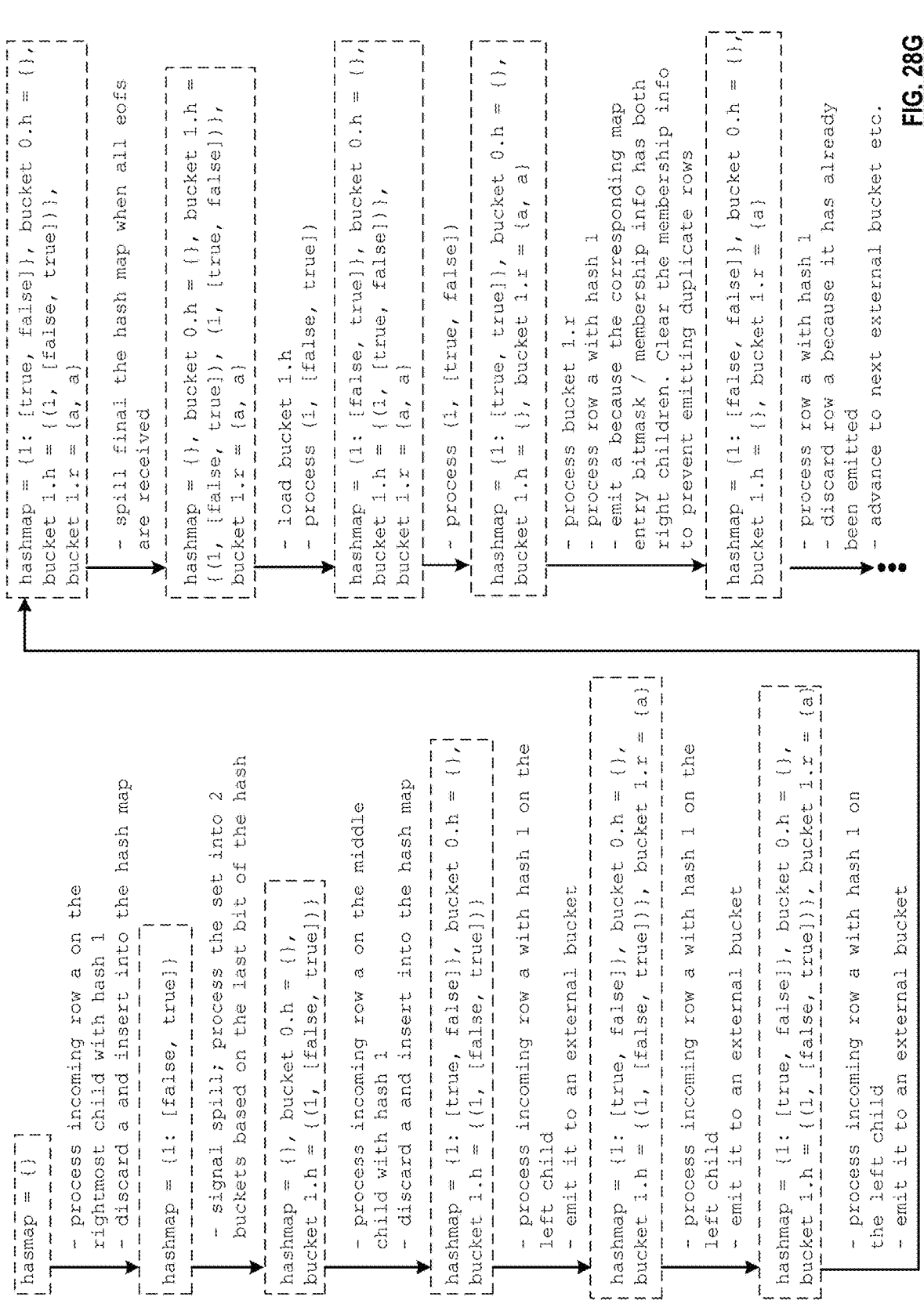

```
hashmap = {}

- process incoming row a on the
    rightmost child with hash 1
  - discard a and insert into the hash map hashmap = {1: [false, true]}

- signal spill; process the set into 2
    buckets based on the last bit of the hash hashmap = {}, bucket 0.h = {},
bucket 1.h = {(1, [false, true])}

- process incoming row a on the middle
    child with hash 1
  - discard a and insert into the hash map hashmap = {1: [true, false]}, bucket 0.h = {},
bucket 1.h = {(1, [false, true])}

- process incoming row a with hash 1 on the
    left child
  - emit it to an external bucket hashmap = {1: [true, false]}, bucket 0.h = {},
bucket 1.h = {(1, [false, true])}, bucket 1.r = {a}

- process incoming row a with hash 1 on the
    left child
  - emit it to an external bucket hashmap = {1: [true, false]}, bucket 0.h = {},
bucket 1.h = {(1, [false, true])}, bucket 1.r = {a}

- process incoming row a with hash 1 on
    the left child
  - emit it to an external bucket
```

```
hashmap = {1: [true, false]}, bucket 0.h = {},
bucket 1.h = {(1, [false, true])},
bucket 1.r = {a, a}

- spill final the hash map when all eofs
    are received hashmap = {}, bucket 0.h = {}, bucket 1.h =
{(1, [false, true]), (1, [true, false])},
bucket 1.r = {a, a}

- load bucket 1.h
  - process (1, [false, true])

hashmap = {1: [false, true]}, bucket 0.h = {},
bucket 1.h = {(1, [true, false])},
bucket 1.r = {a, a}

- process (1, [true, false])

hashmap = {1: [true, true]}, bucket 0.h = {},
bucket 1.h = {}, bucket 1.r = {a, a}

- process bucket 1.r
  - process row a with hash 1
  - emit a because the corresponding map
    entry bitmask / membership info has both
    right children. Clear the membership info
    to prevent emitting duplicate rows hashmap = {1: [false, false]}, bucket 0.h = {},
bucket 1.h = {}, bucket 1.r = {a}

- process row a with hash 1
  - discard row a because it has already
    been emitted
  - advance to next external bucket etc.
```

FIG. 28G

SPILLING A HASH SET STRUCTURE TO DISK IN CONJUNCTION WITH EXECUTING A SET OPERATION VIA A DATABASE SYSTEM

CROSS-REFERENCE TO RELATED APPLICATIONS

The present U.S. Utility Patent Application claims priority pursuant to 35 U.S.C. § 119(e) to U.S. Provisional Application No. 63/719,409, entitled "SPILLING A HASH SET STRUCTURE TO DISK IN CONJUNCTION WITH EXECUTING A SET OPERATION VIA A DATABASE SYSTEM", filed Nov. 12, 2024, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 24E is an embodiment is schematic block diagrams illustrating a plurality of nodes that communicate via shuffle networks in accordance with various embodiments;

Figure 28A:
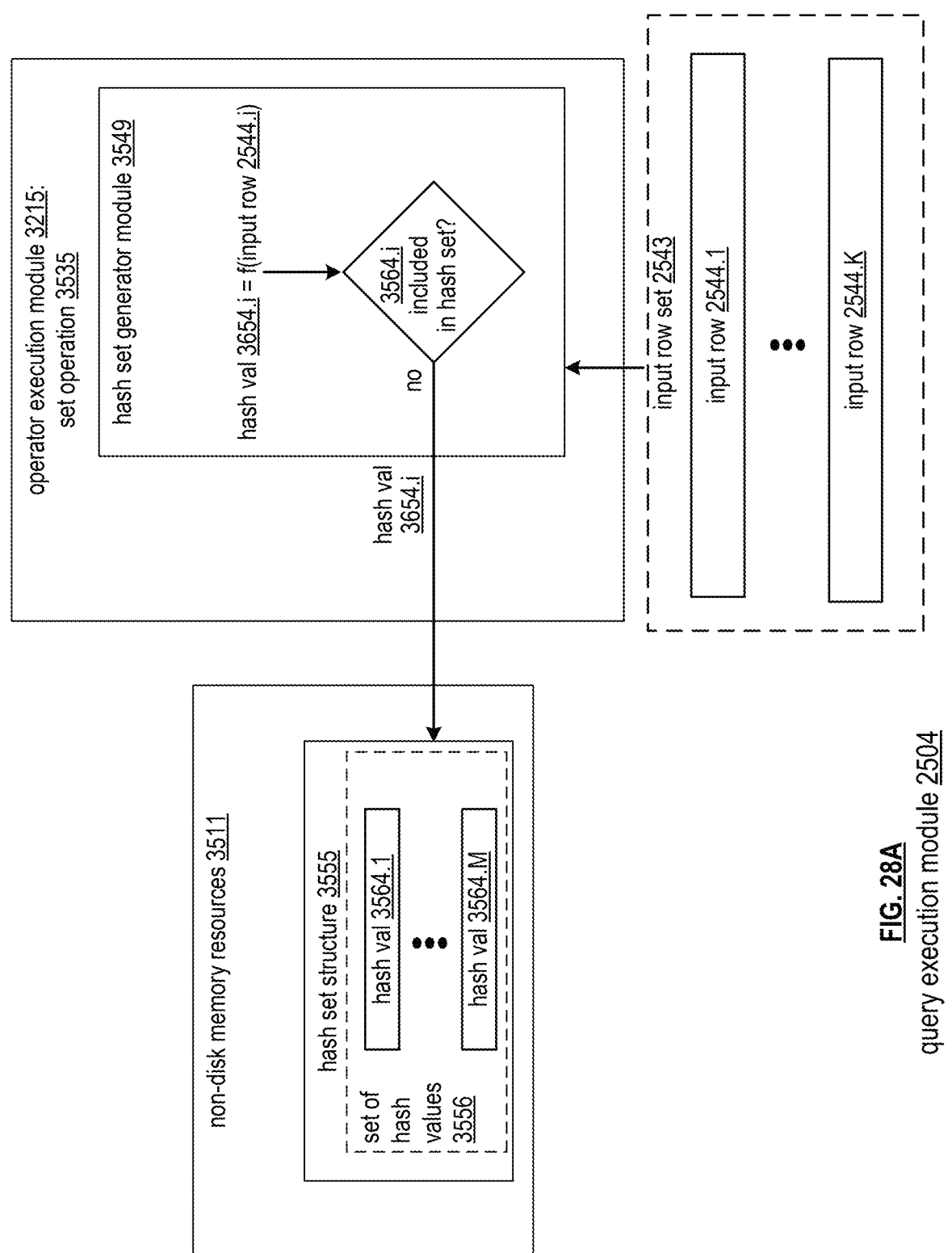
FIGS. 28A-28E illustrate embodiments of an operator execution module executing a set operation in accordance with various embodiments.
Figure 28B:
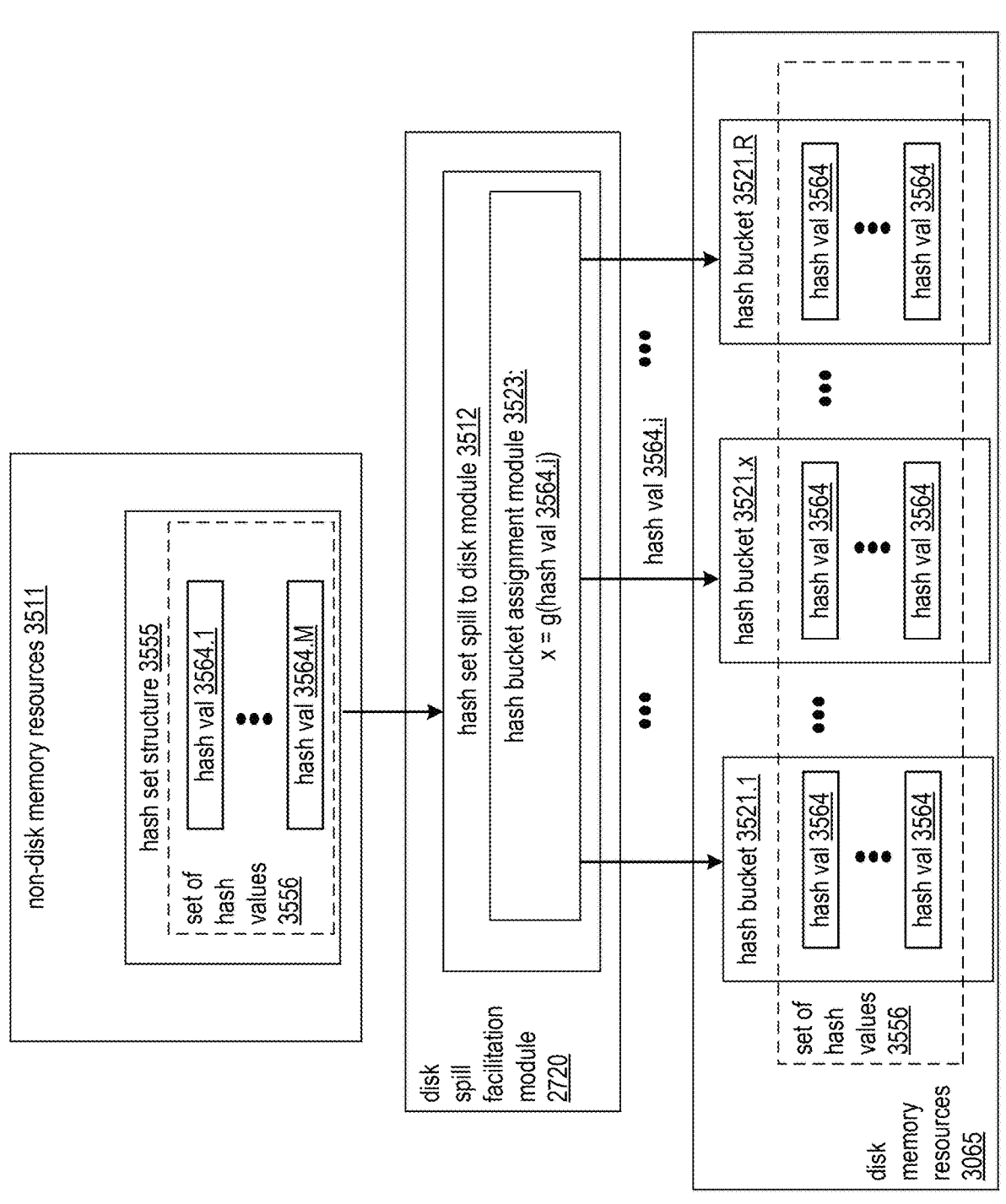
Figure 28C:
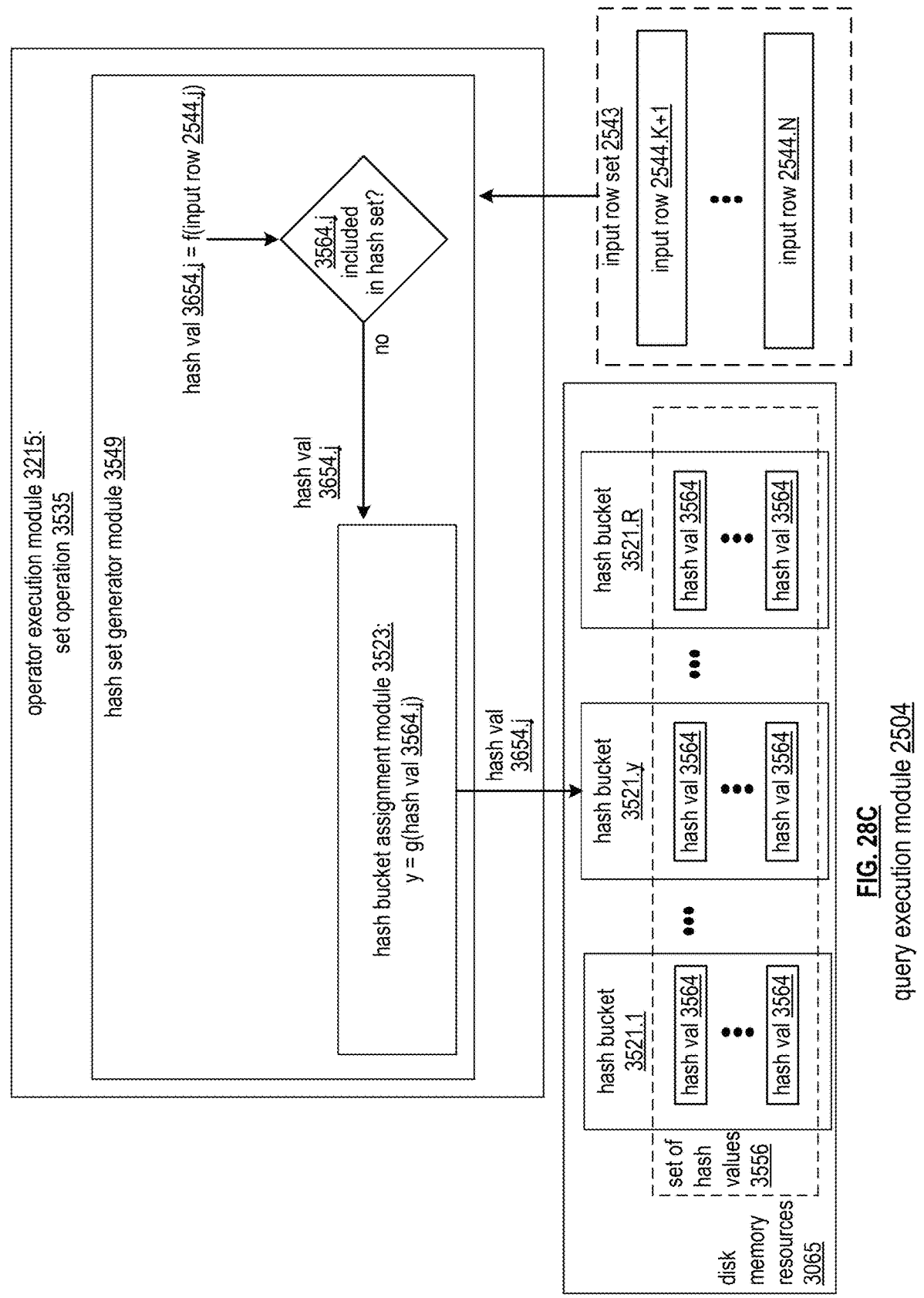
Figure 28D:
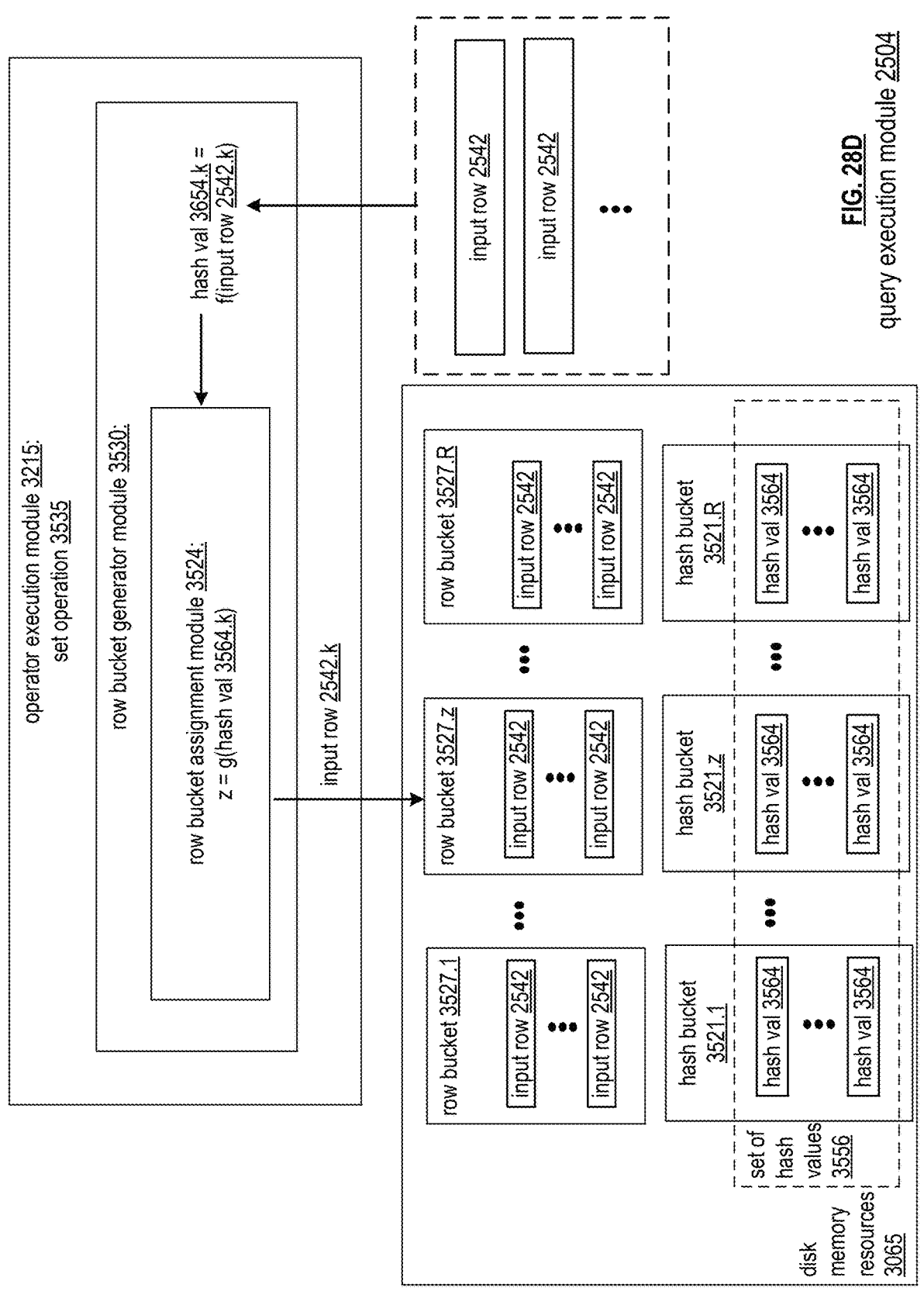
Figure 28E:
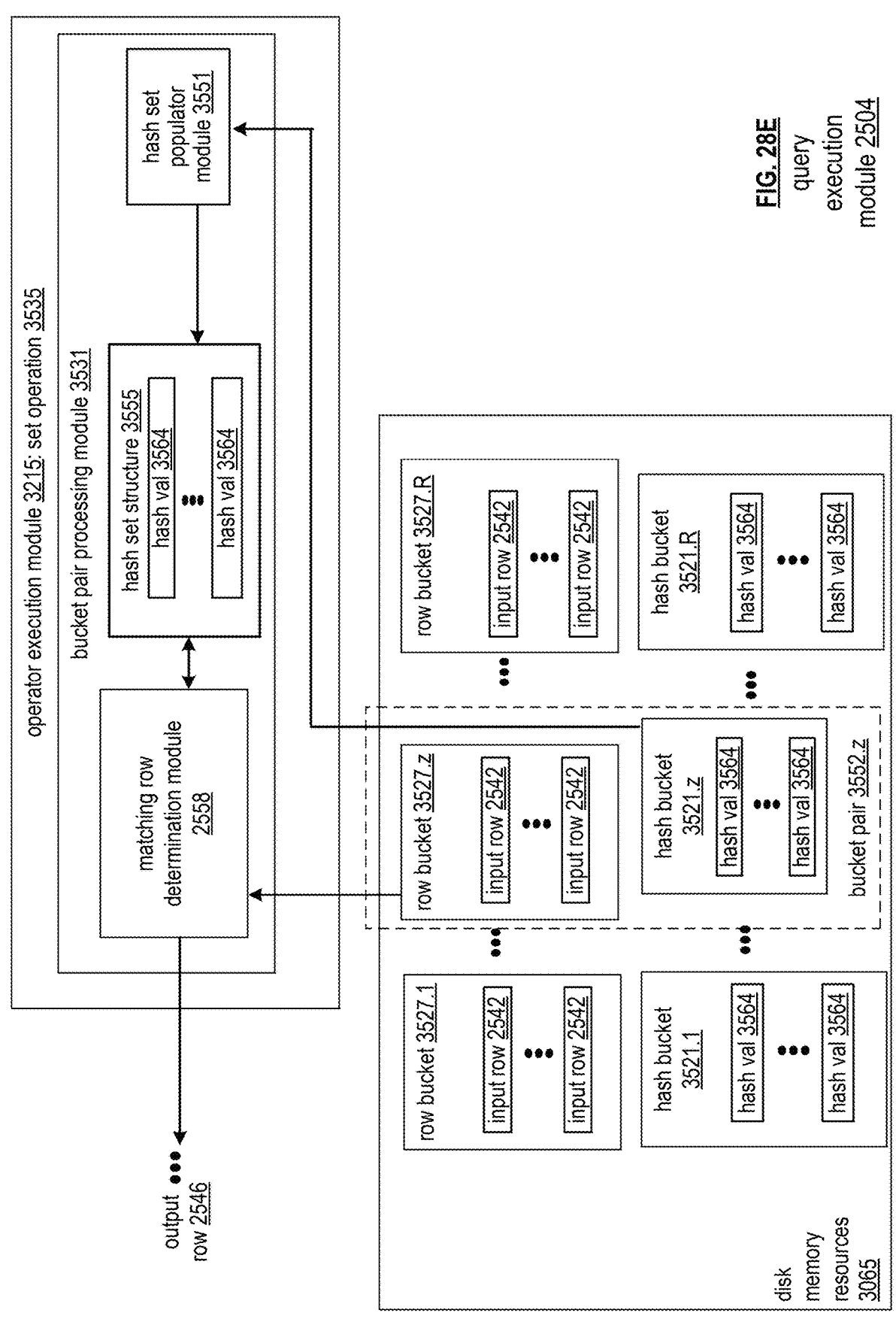
Figure 28F:
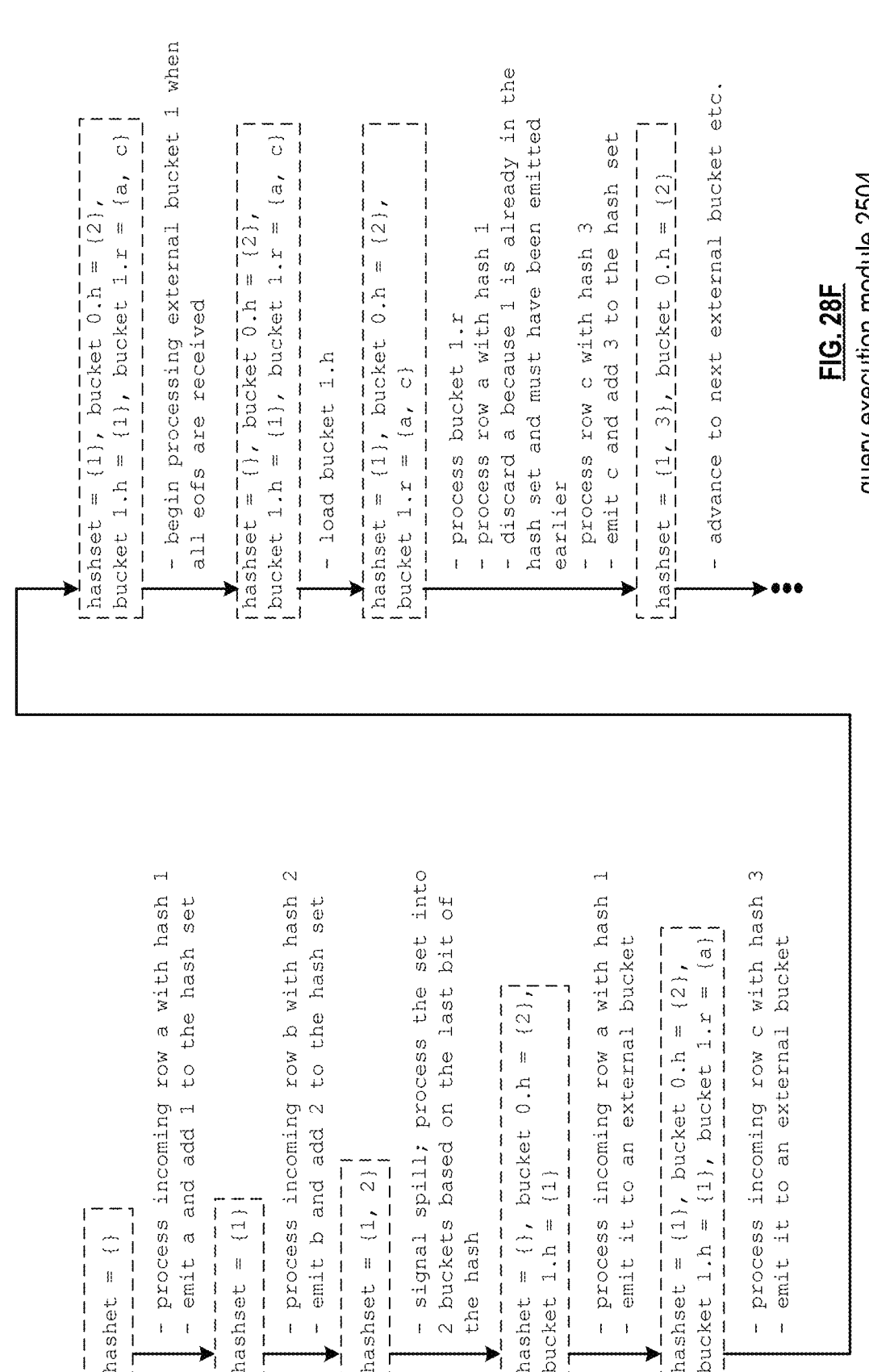
Figure 28H:
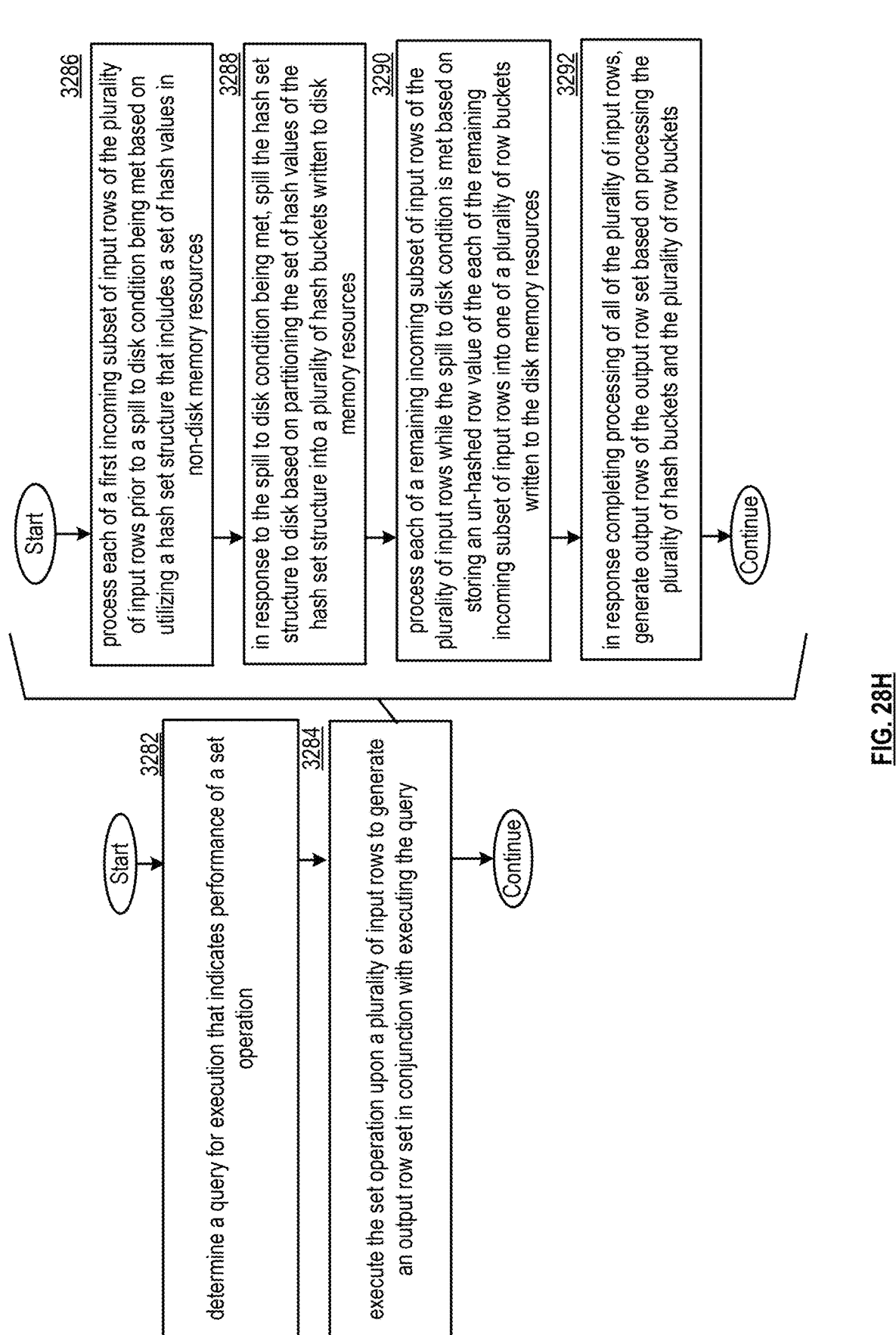

FIGS. 28F-28G each illustrate an example series of steps for executing an example set operation; and FIG. 28H is a logic diagram illustrating a method for execution in accordance with various embodiments.

DETAILED DESCRIPTION OF THE INVENTION

Figure 1:
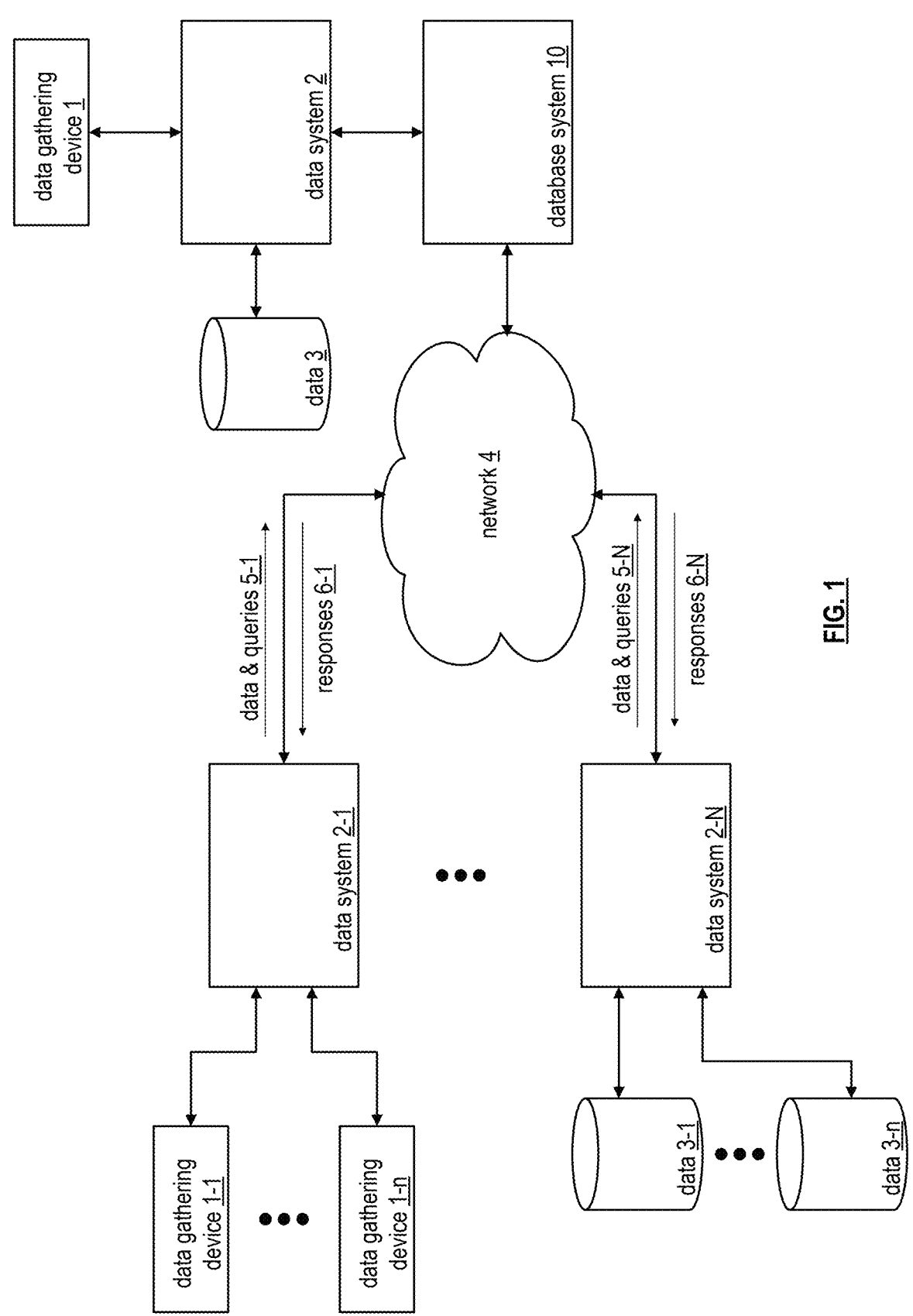
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
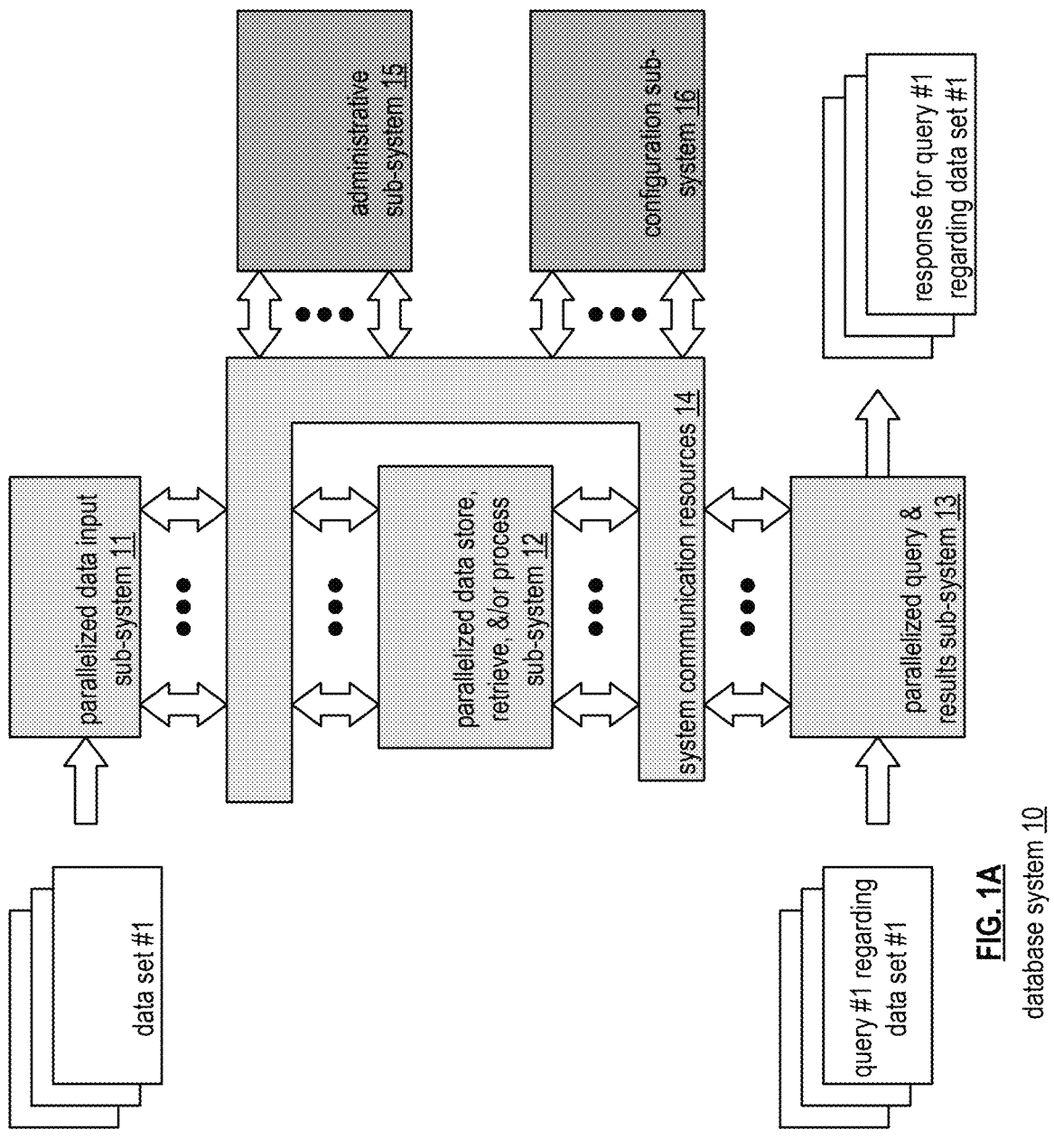
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of: wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figures 2, 3:
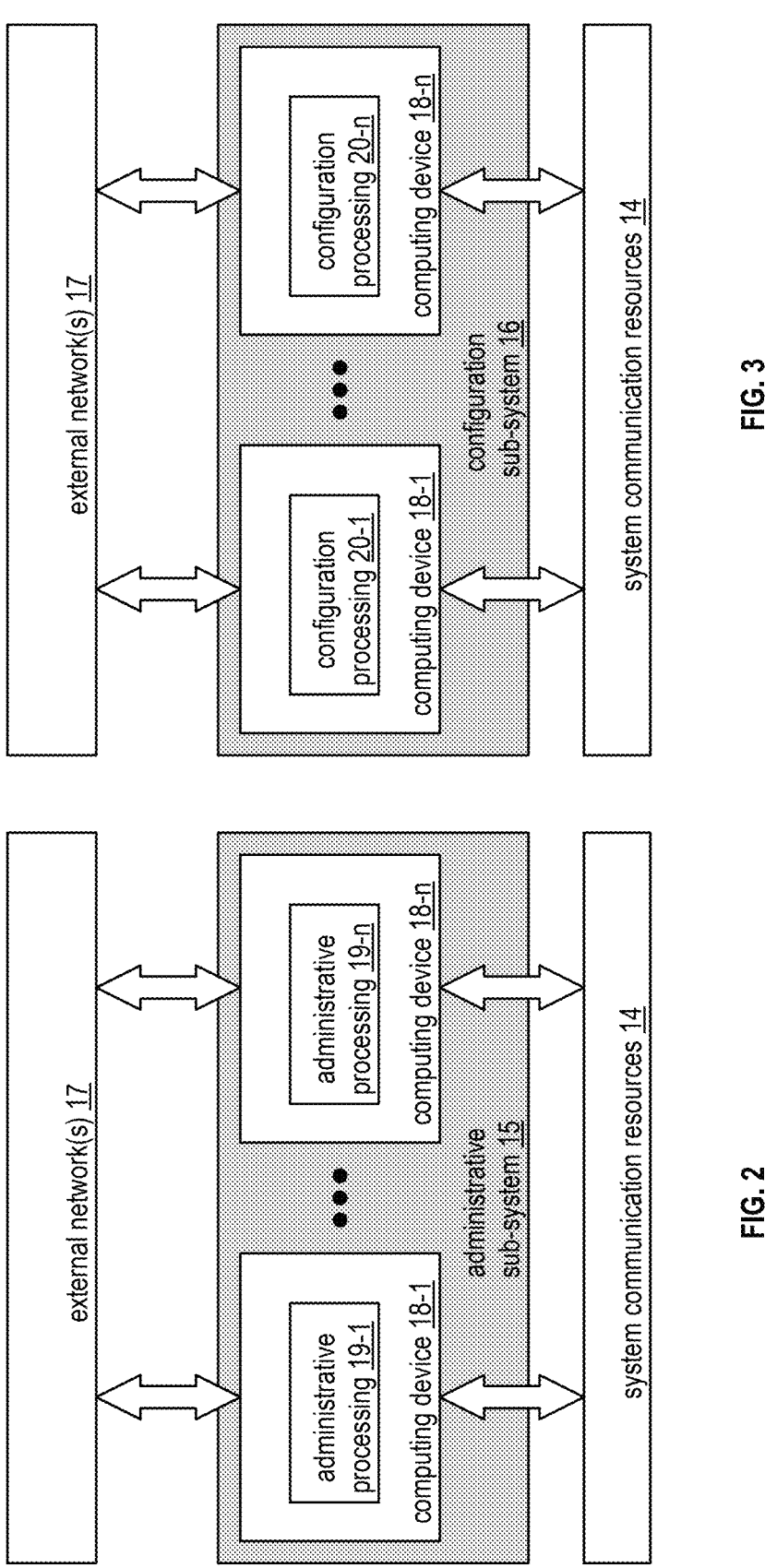
FIG. 2 is a schematic block diagram of an embodiment of an administrative sub-system in accordance with various embodiments.
FIG. 3 is a schematic block diagram of an embodiment of a configuration sub-system in accordance with various embodiments.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
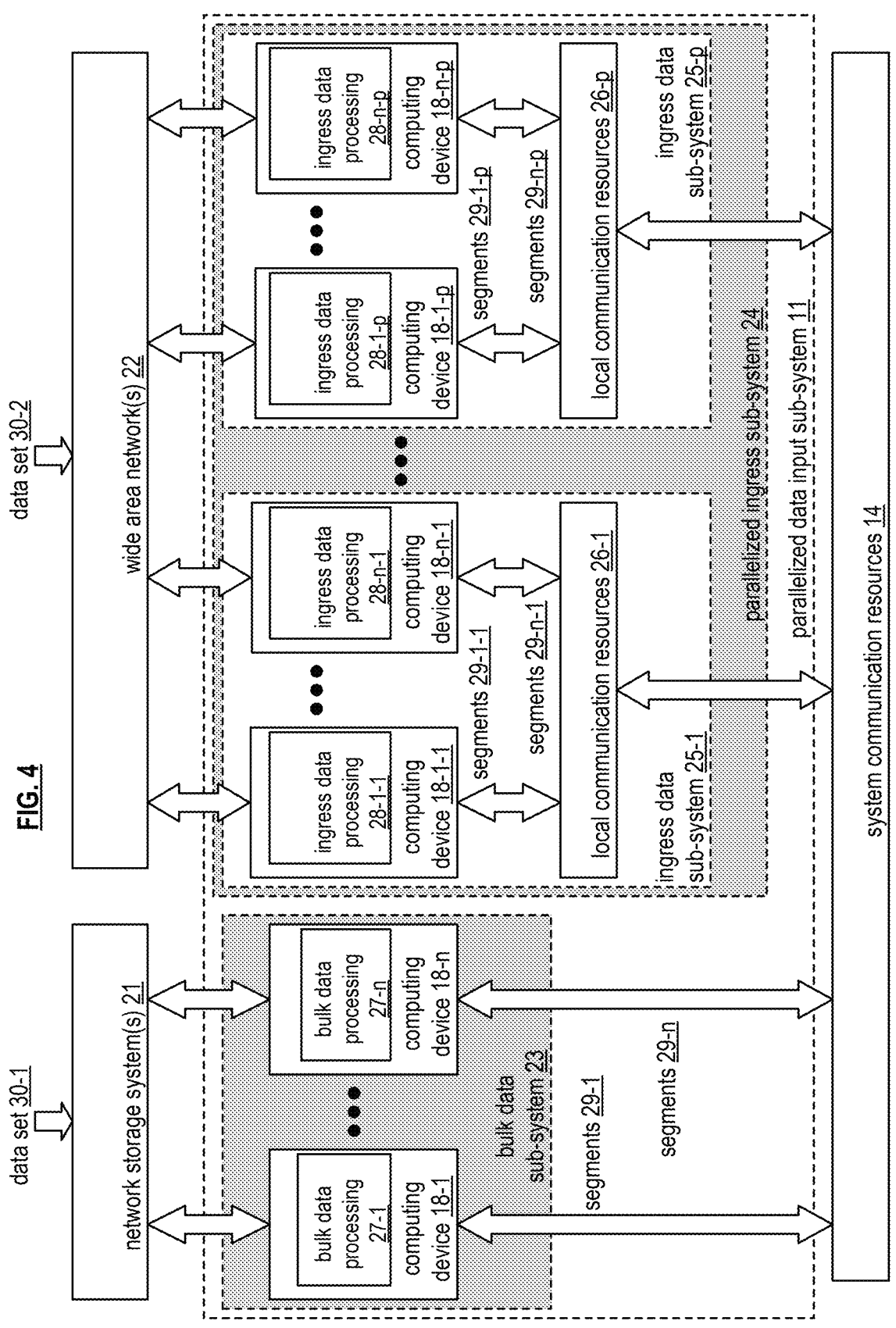
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
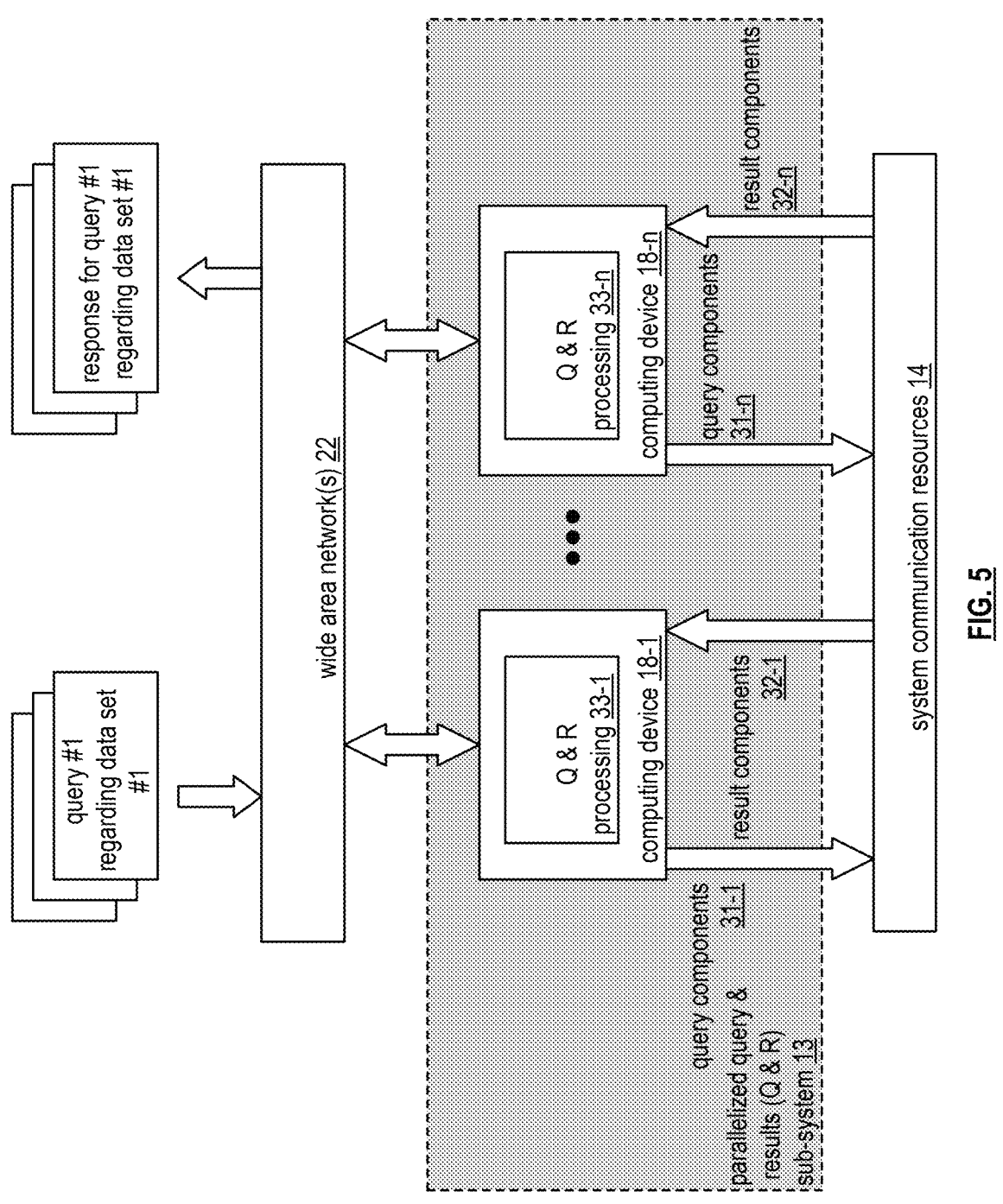
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-*n*. Each of the computing devices executes a query (Q)& response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
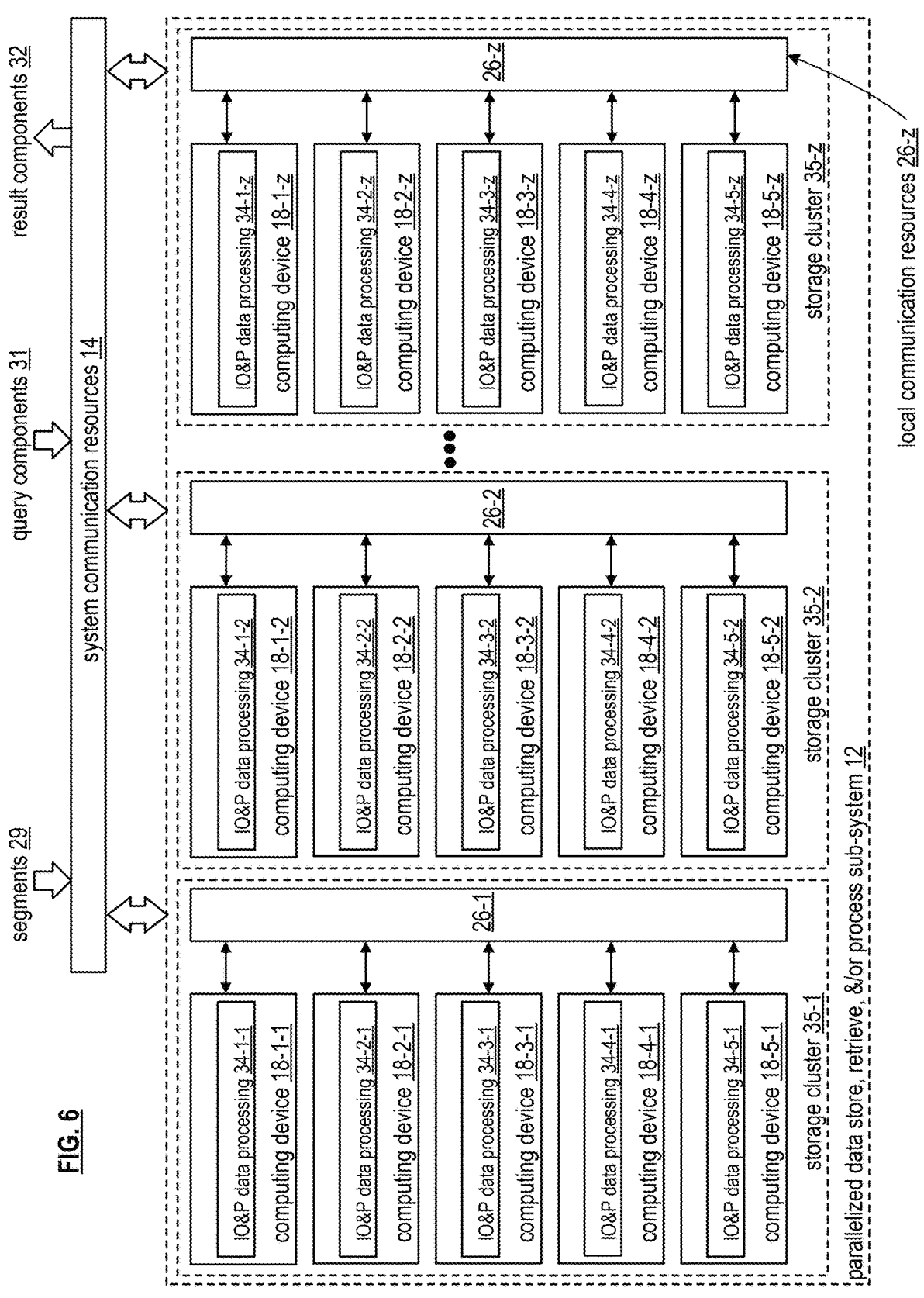
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster

35-1 is storing and/or processing a second segment group while it is storing/or and processing a first segment group.

Figure 7:
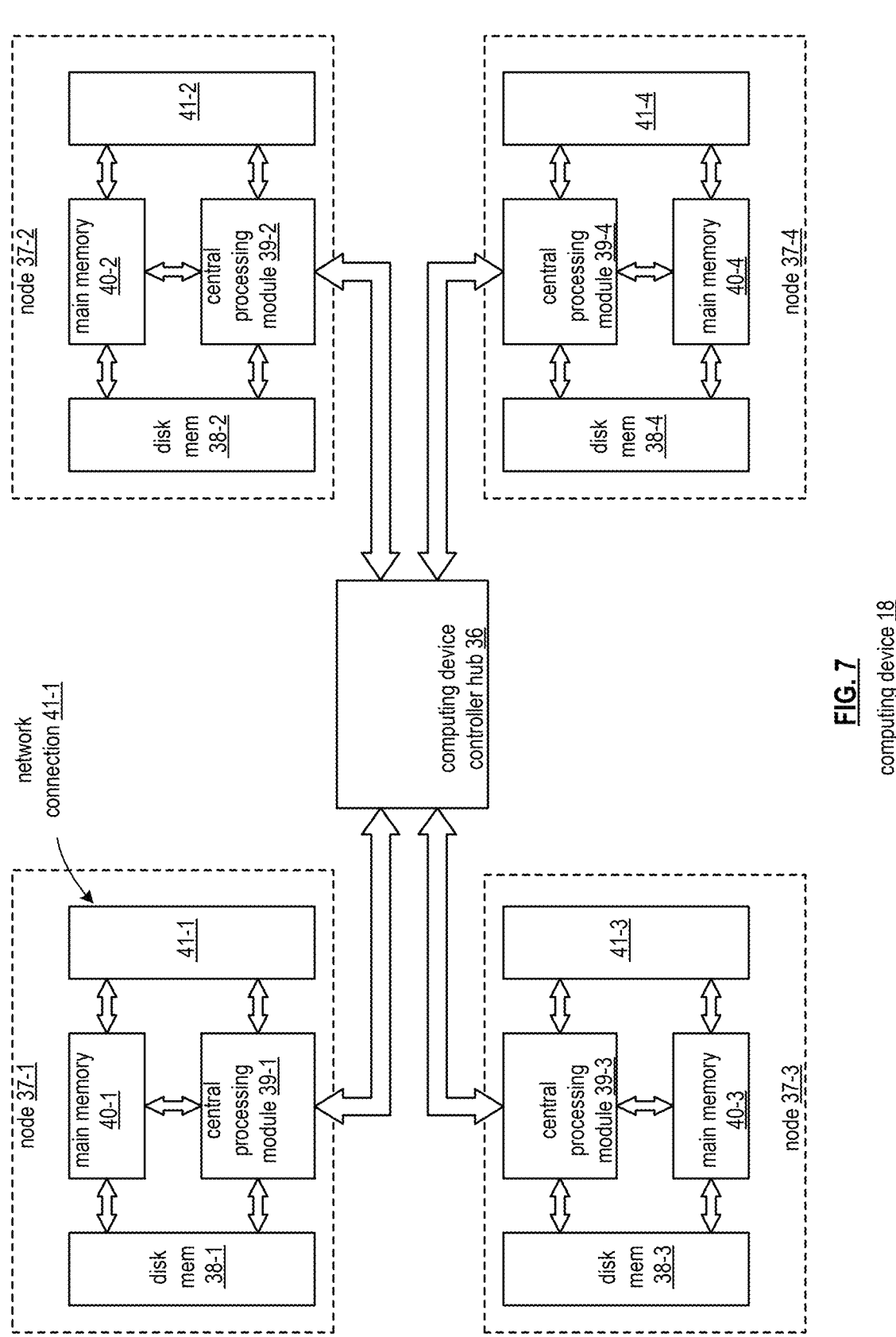
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
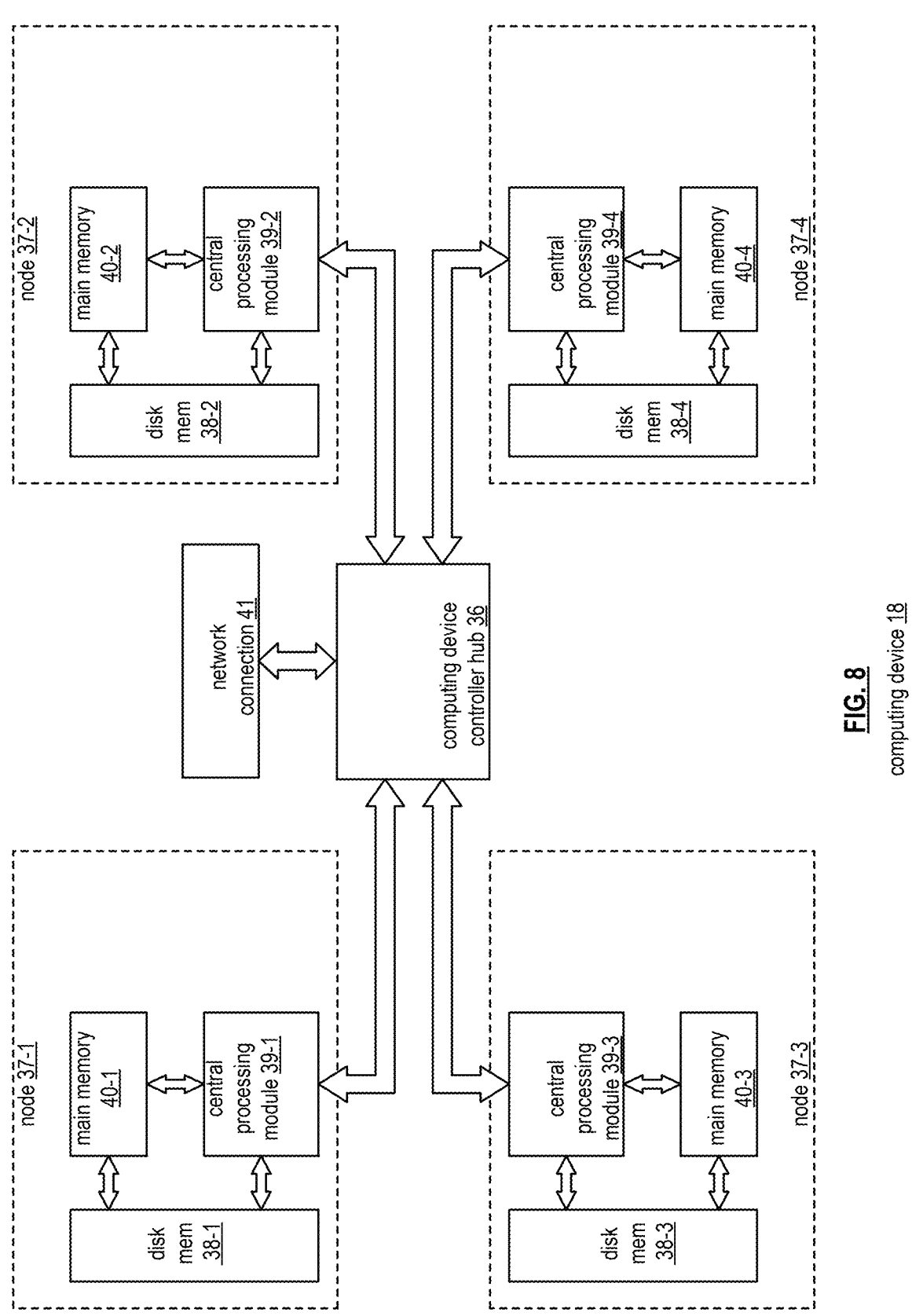
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
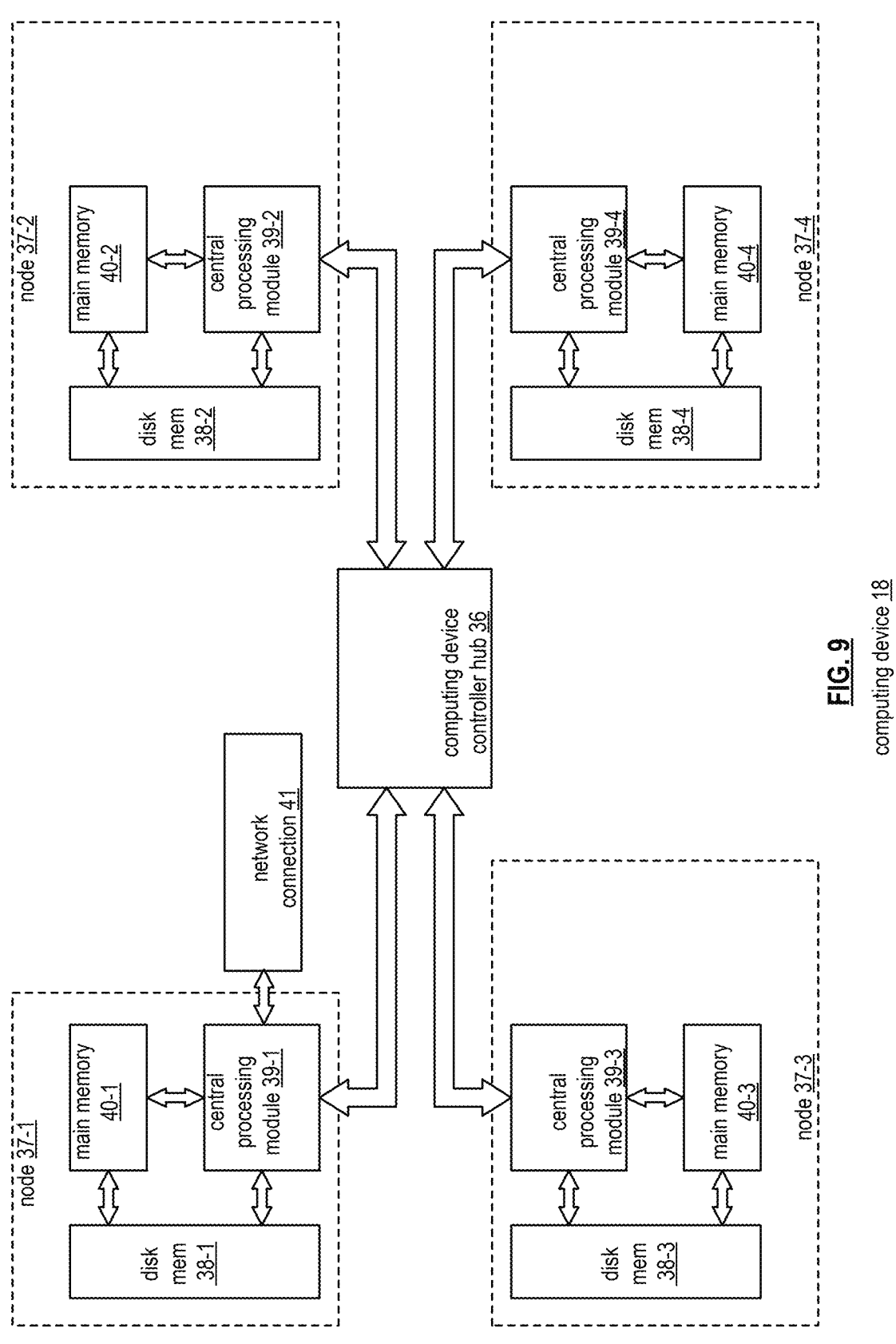
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
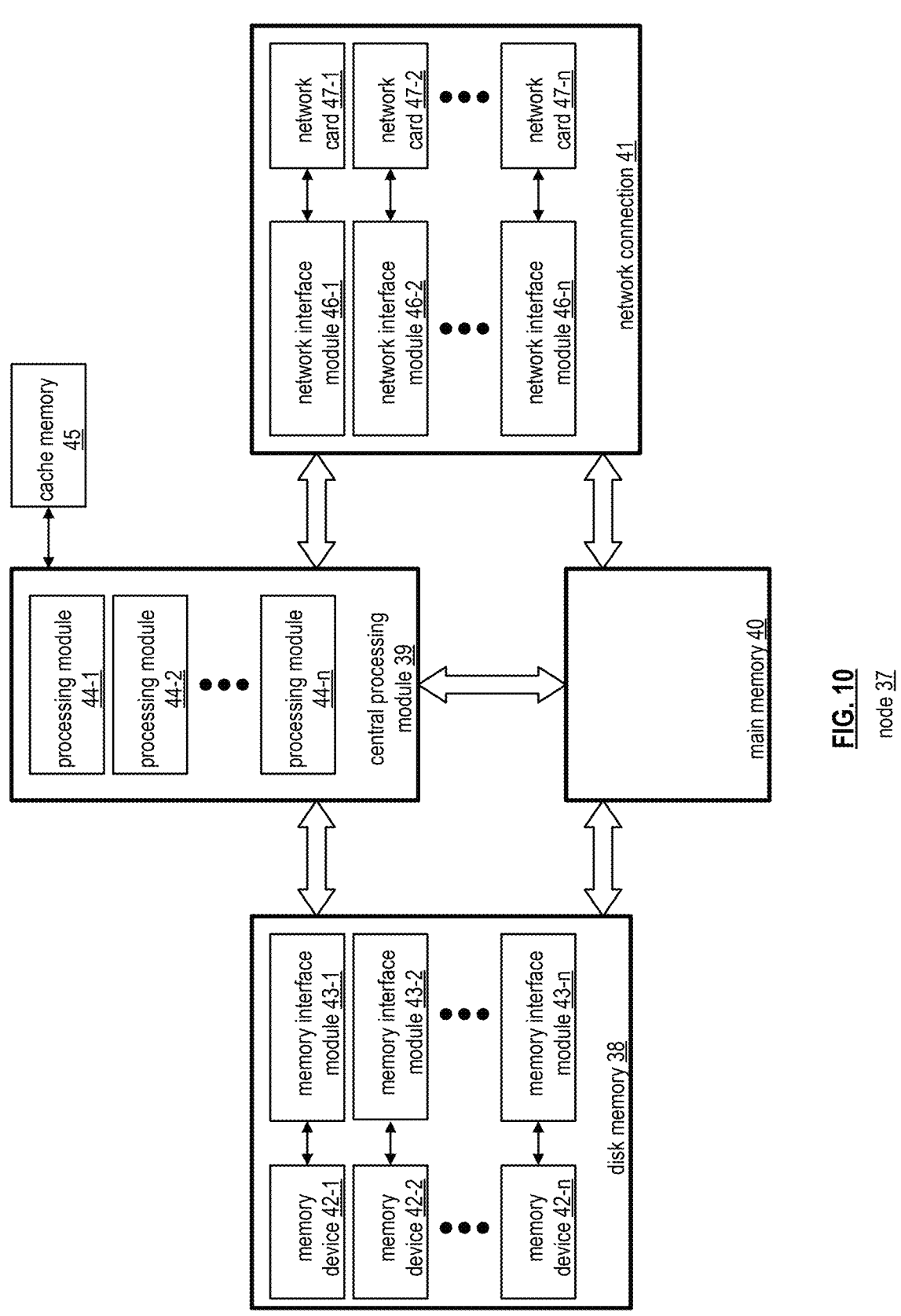
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
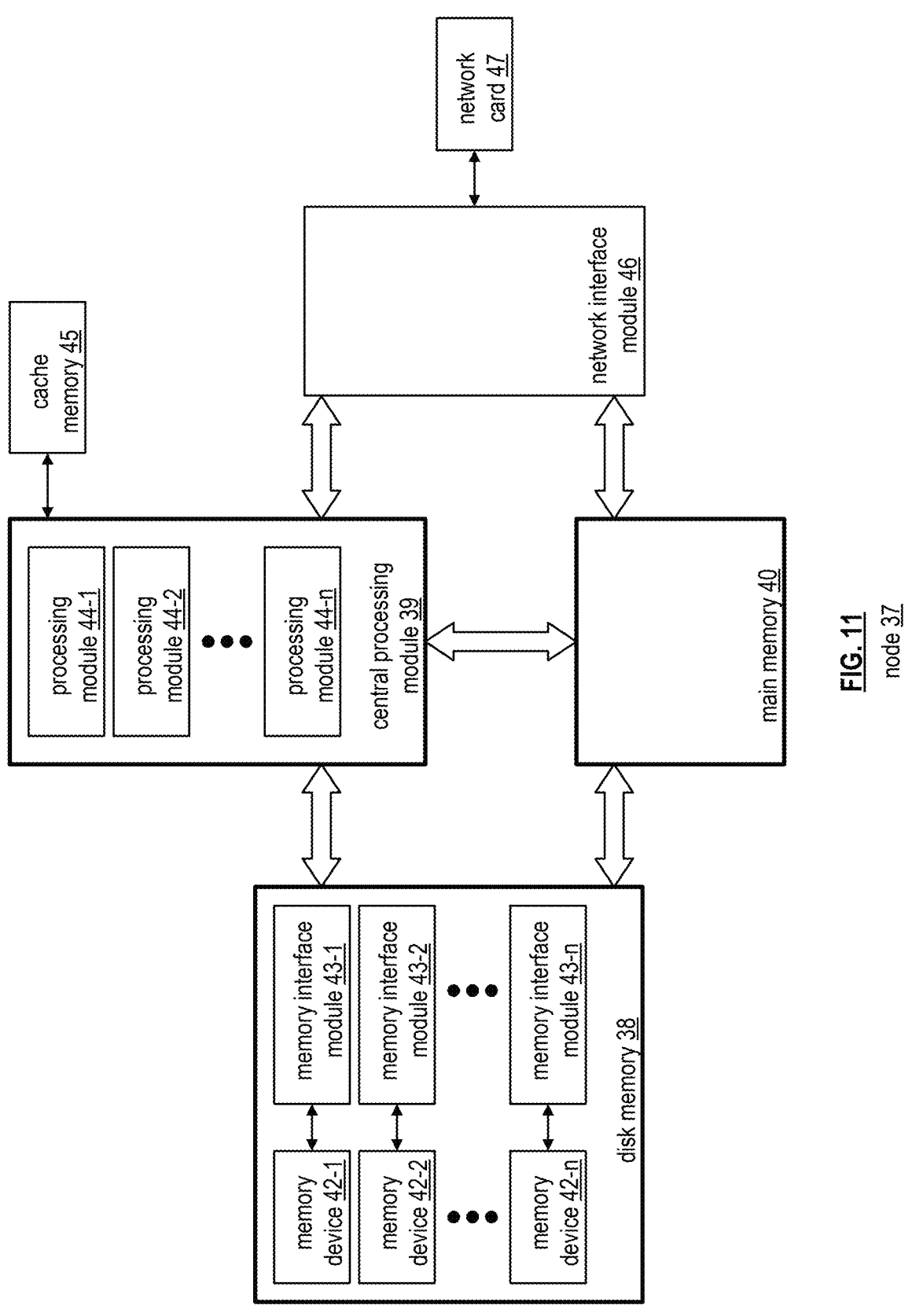
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
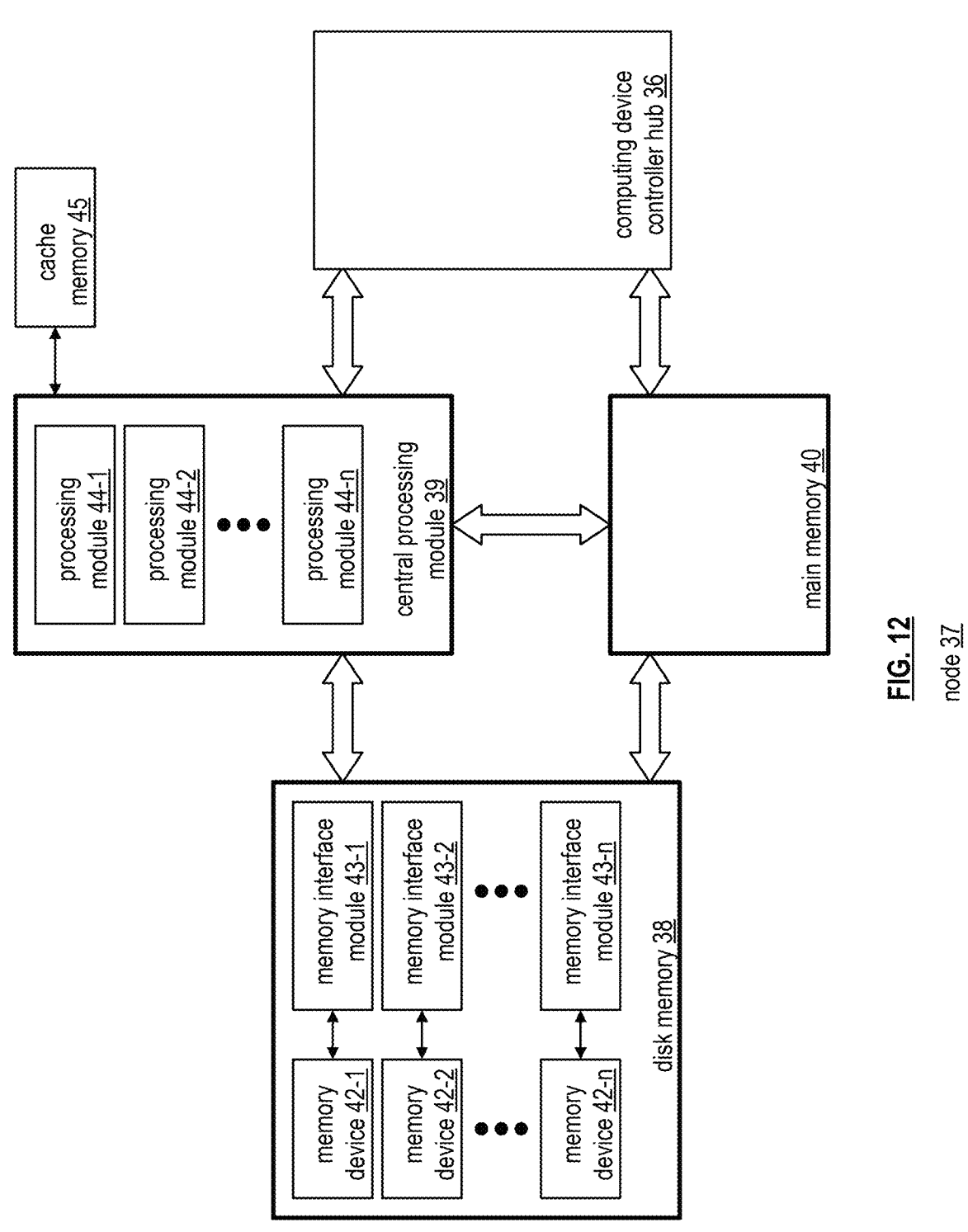
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
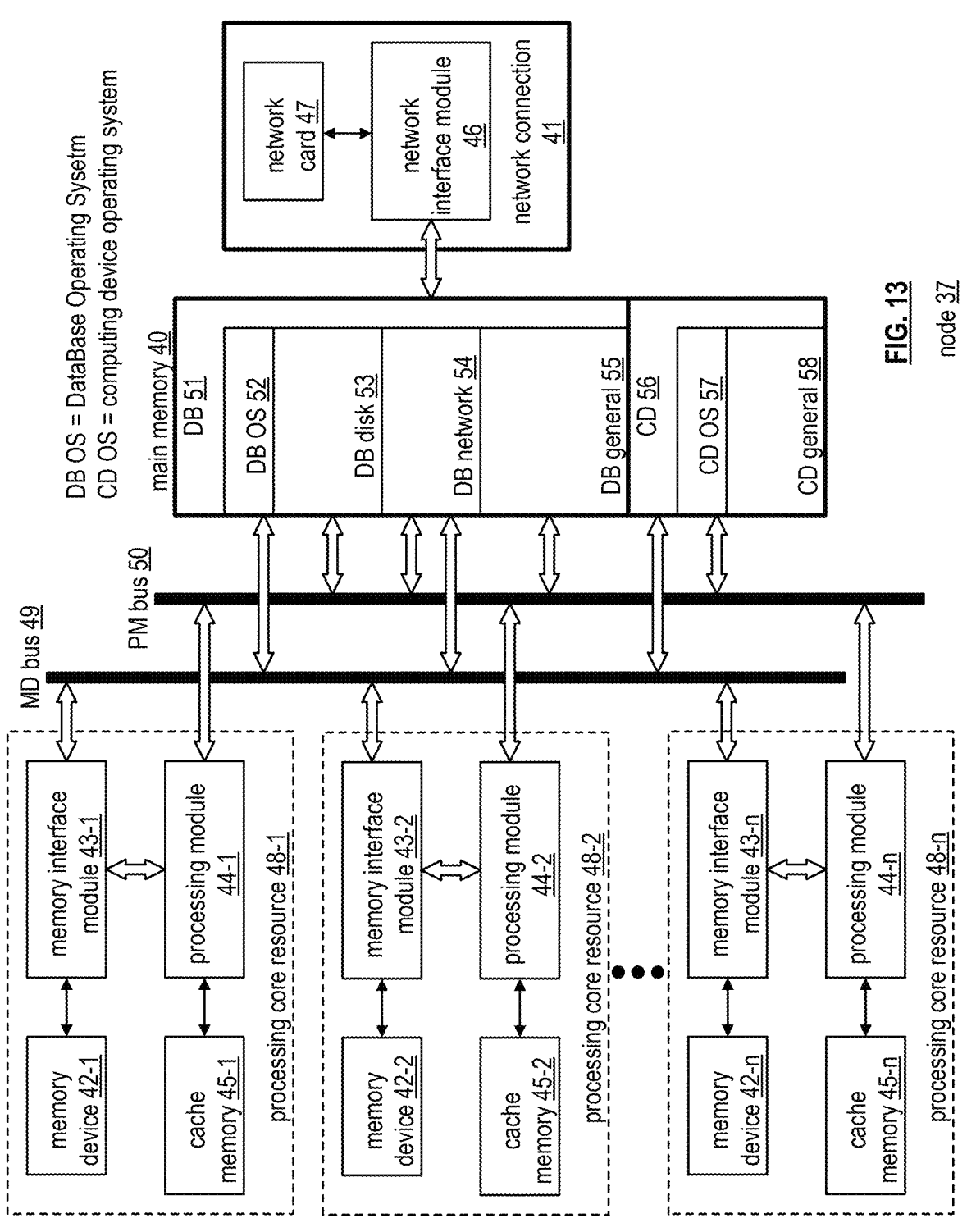
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
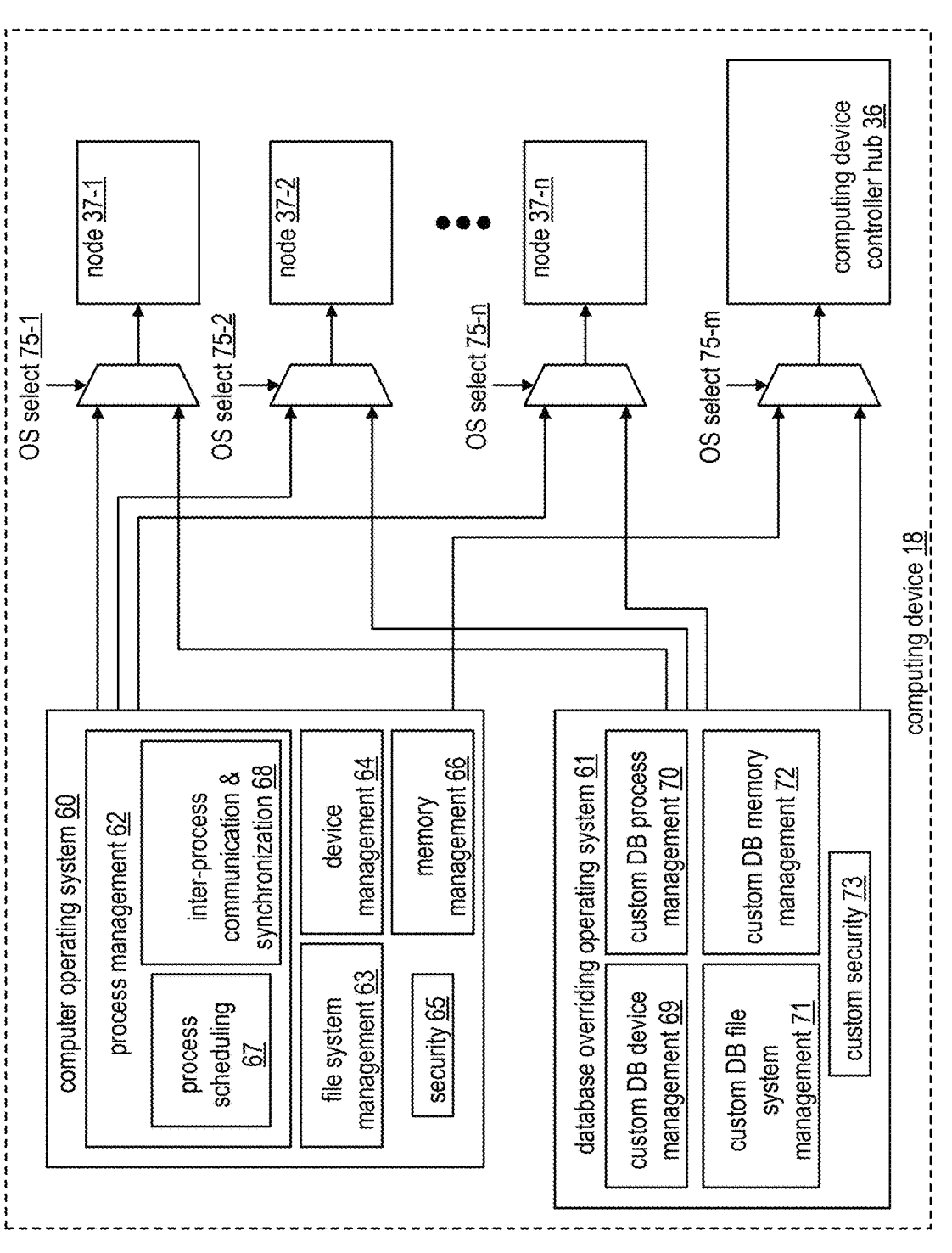
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
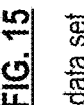
FIGS. 15-23 are schematic block diagrams of an example of processing a table or data set for storage in the database system in accordance with various embodiments.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
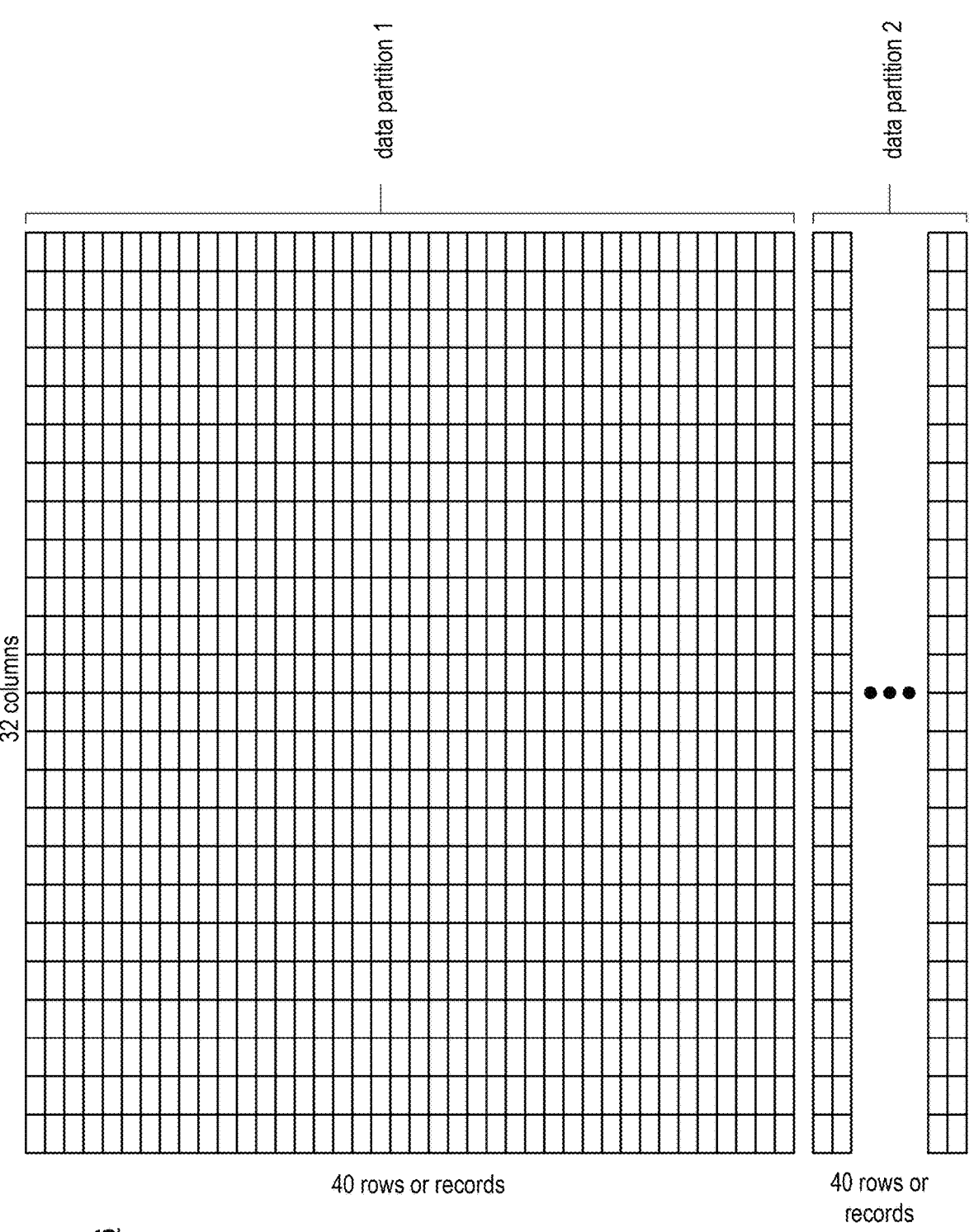

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
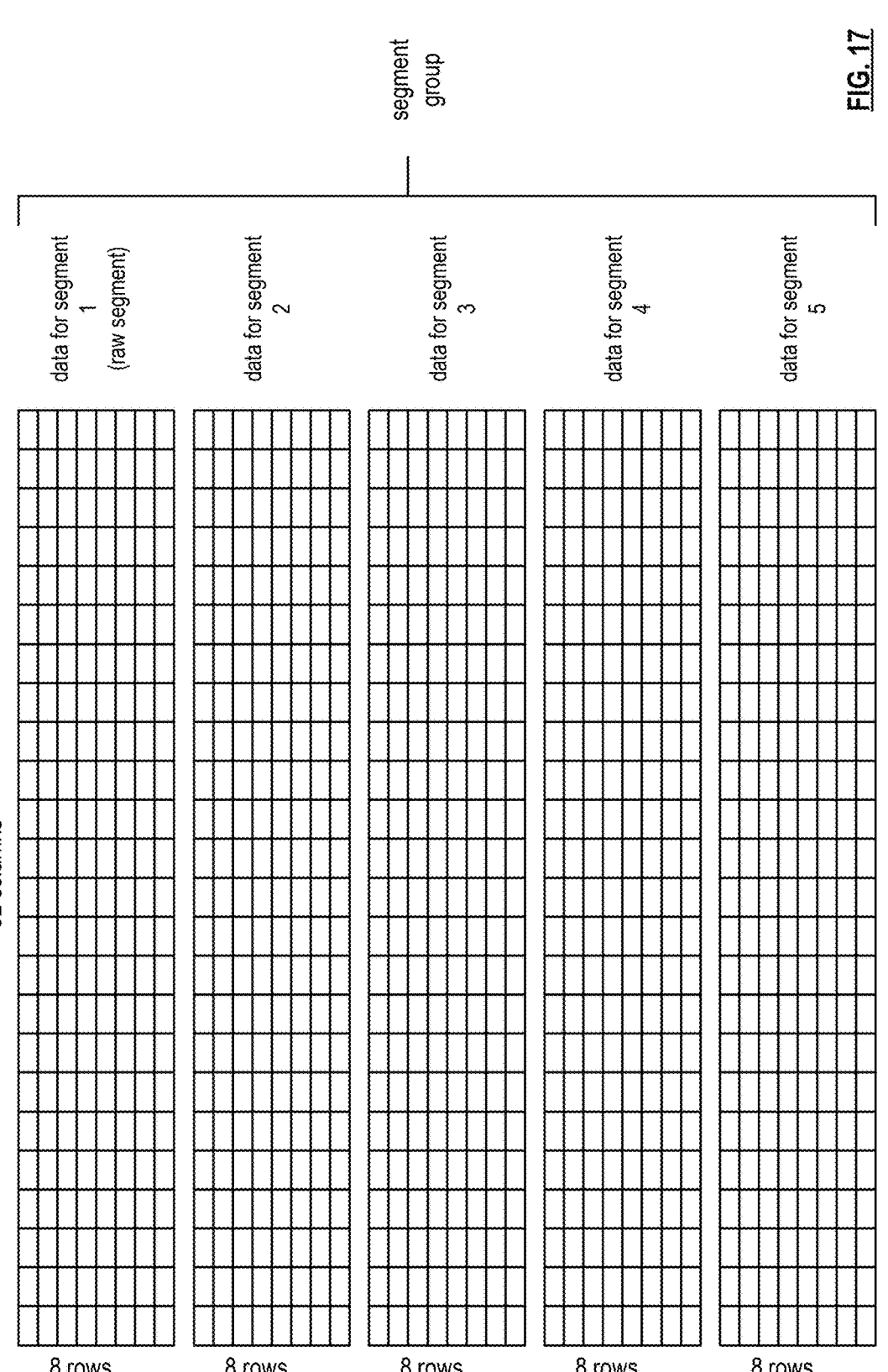

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
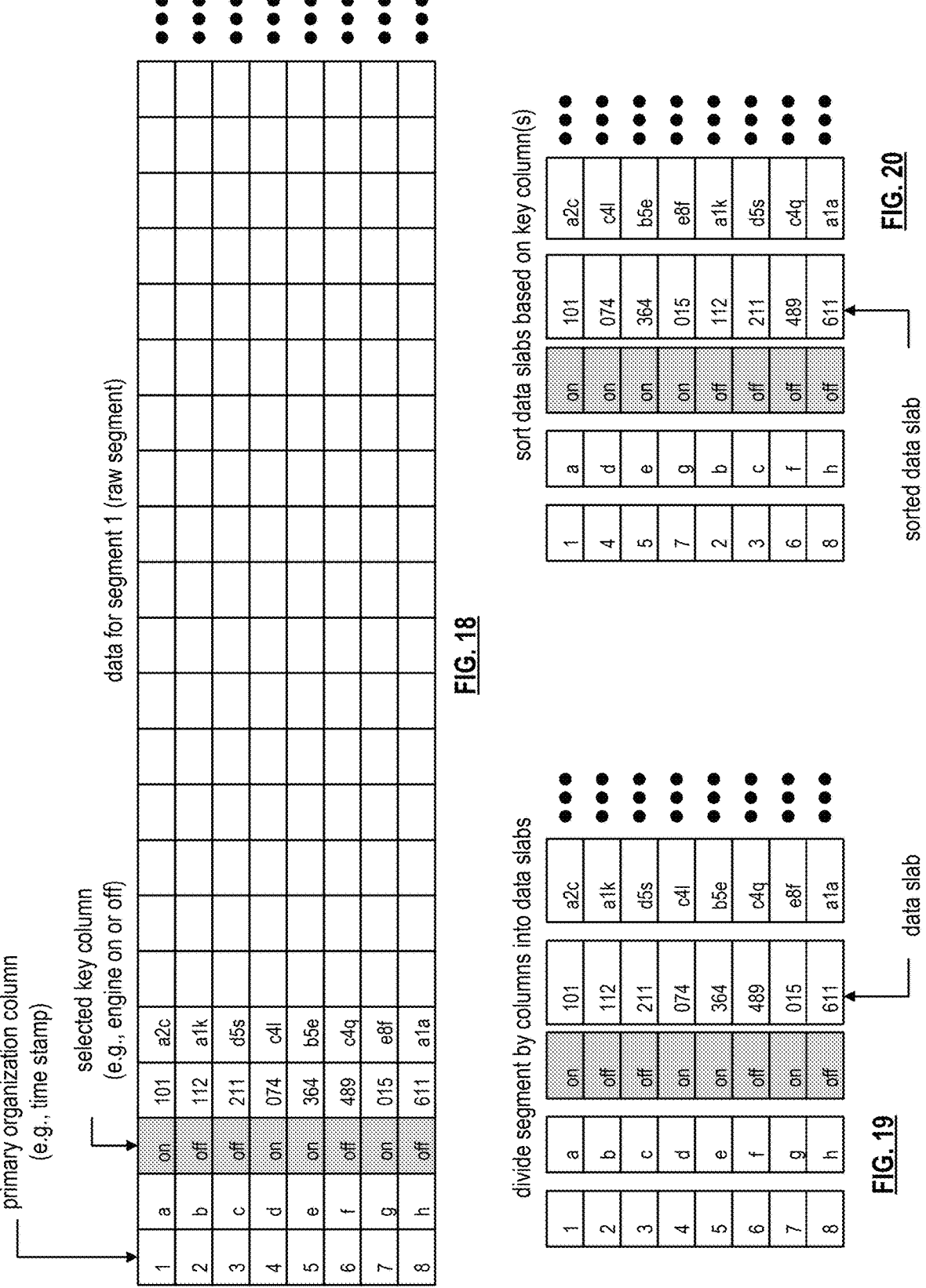

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
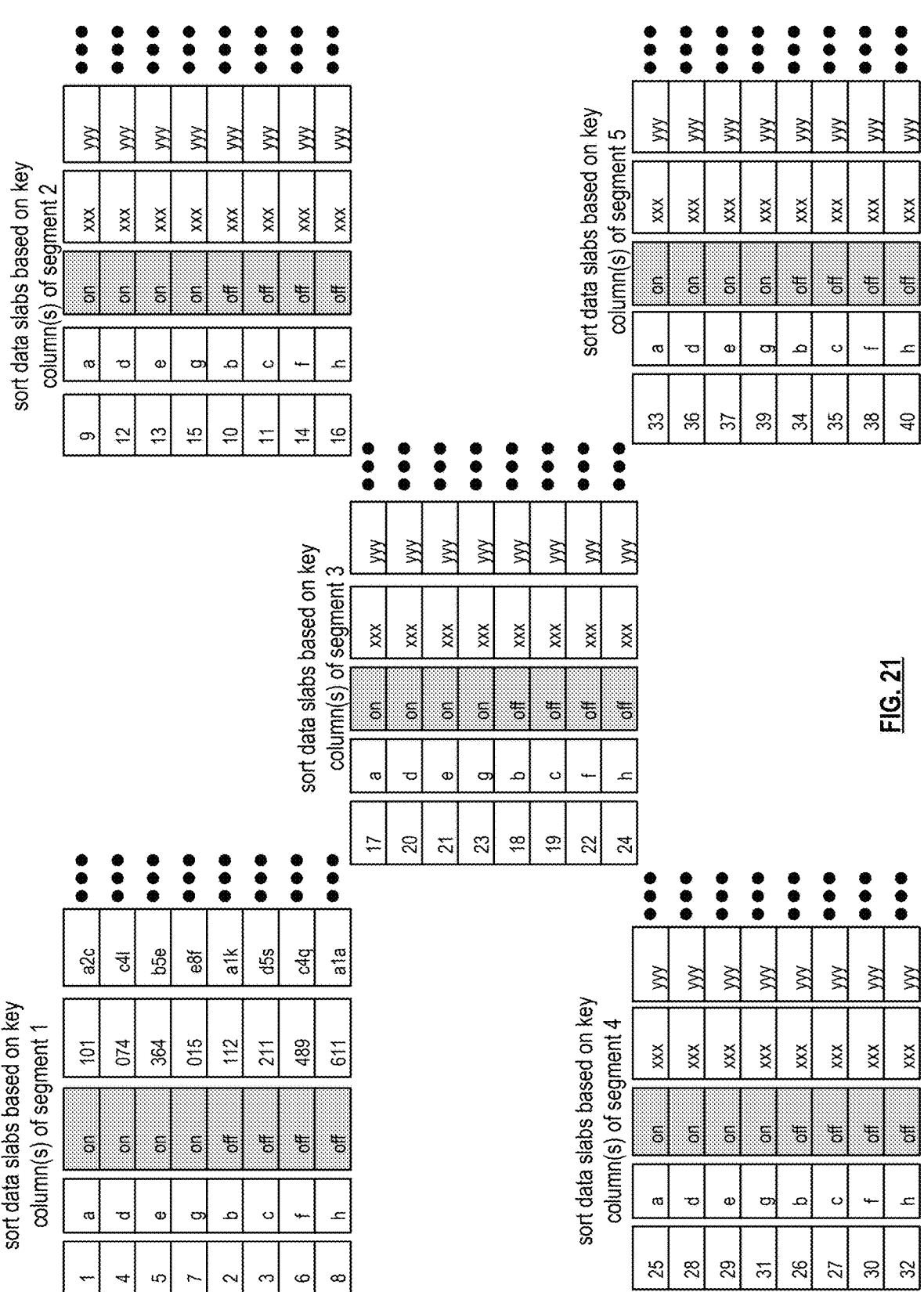

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
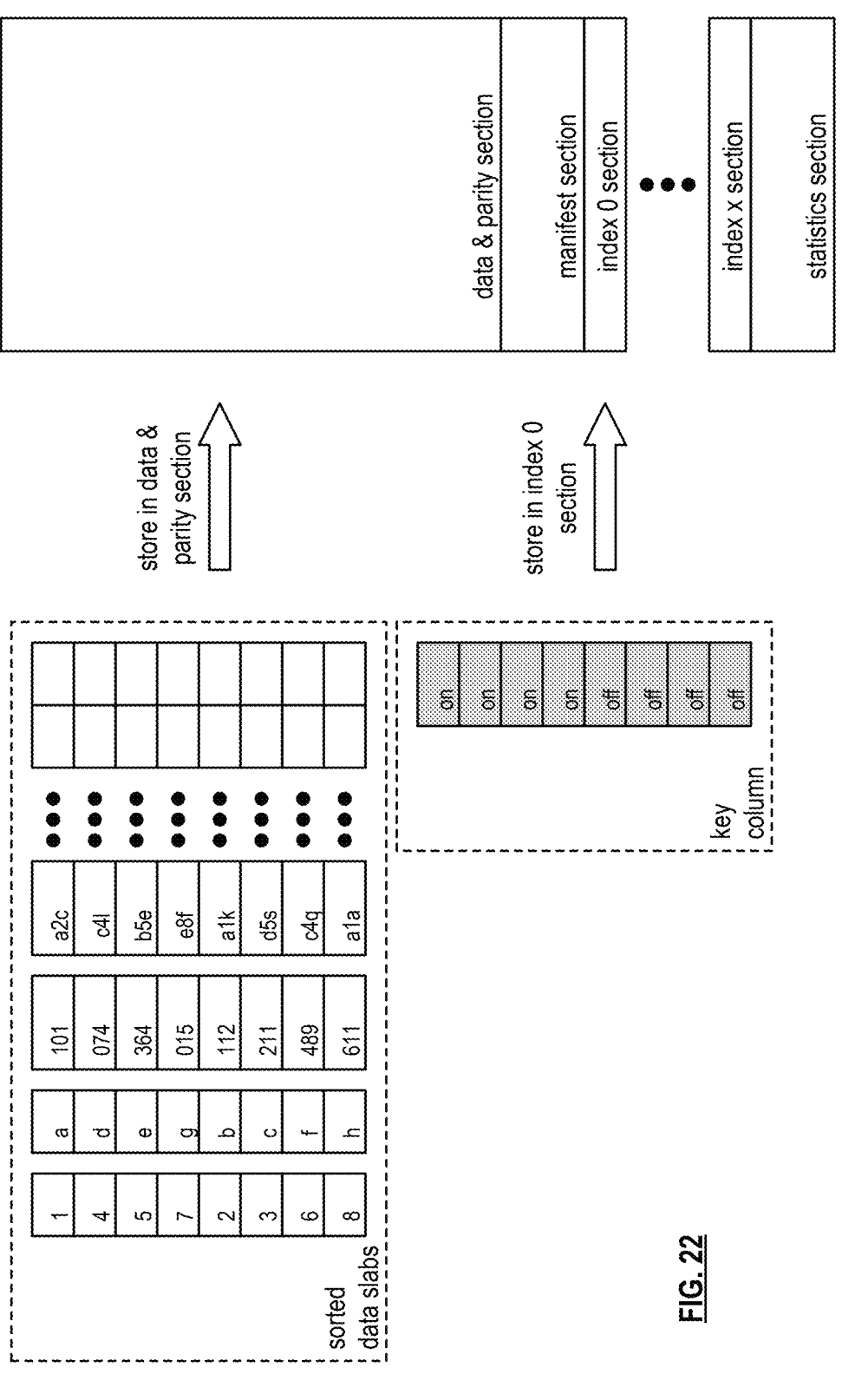

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
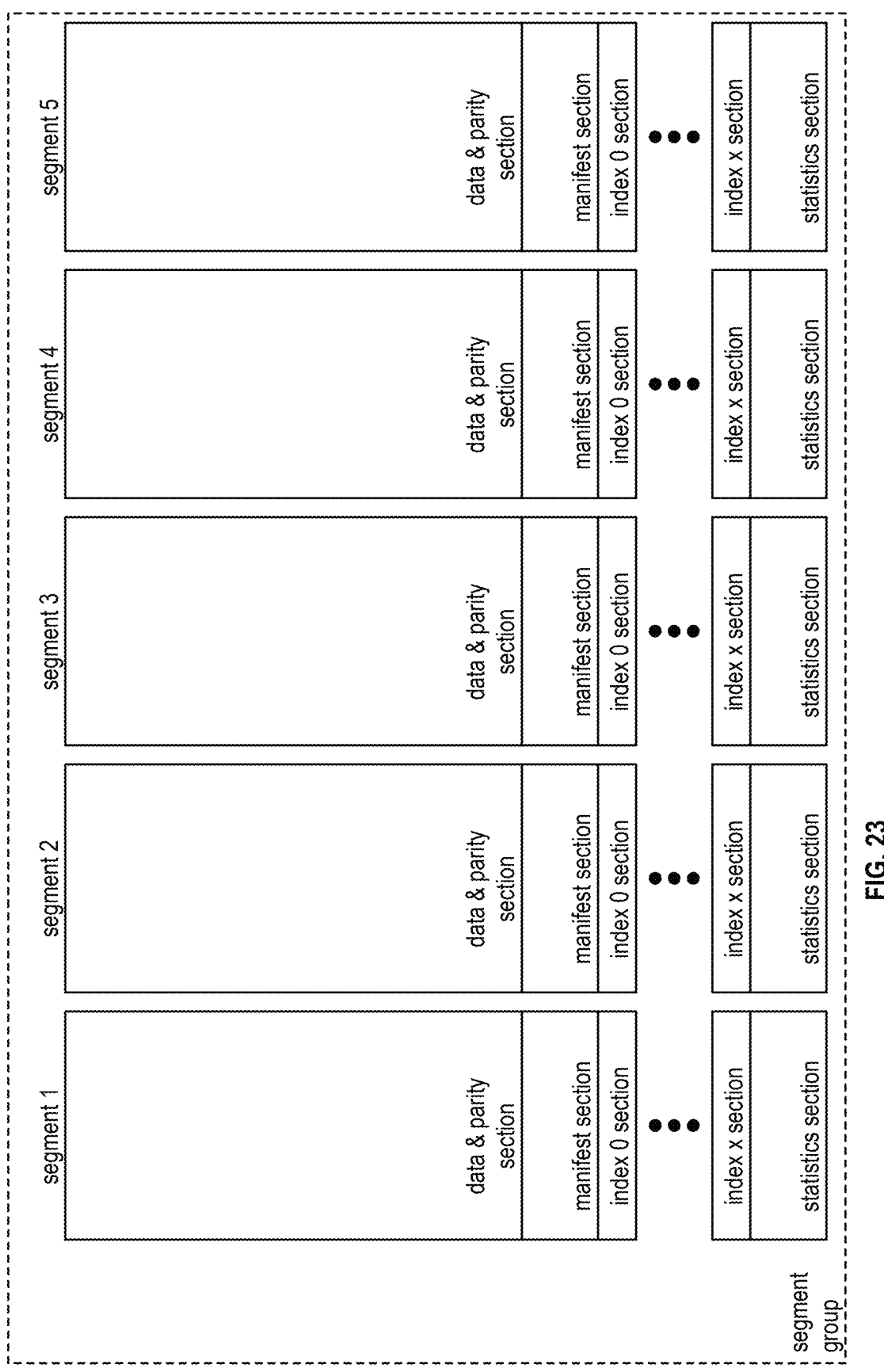

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
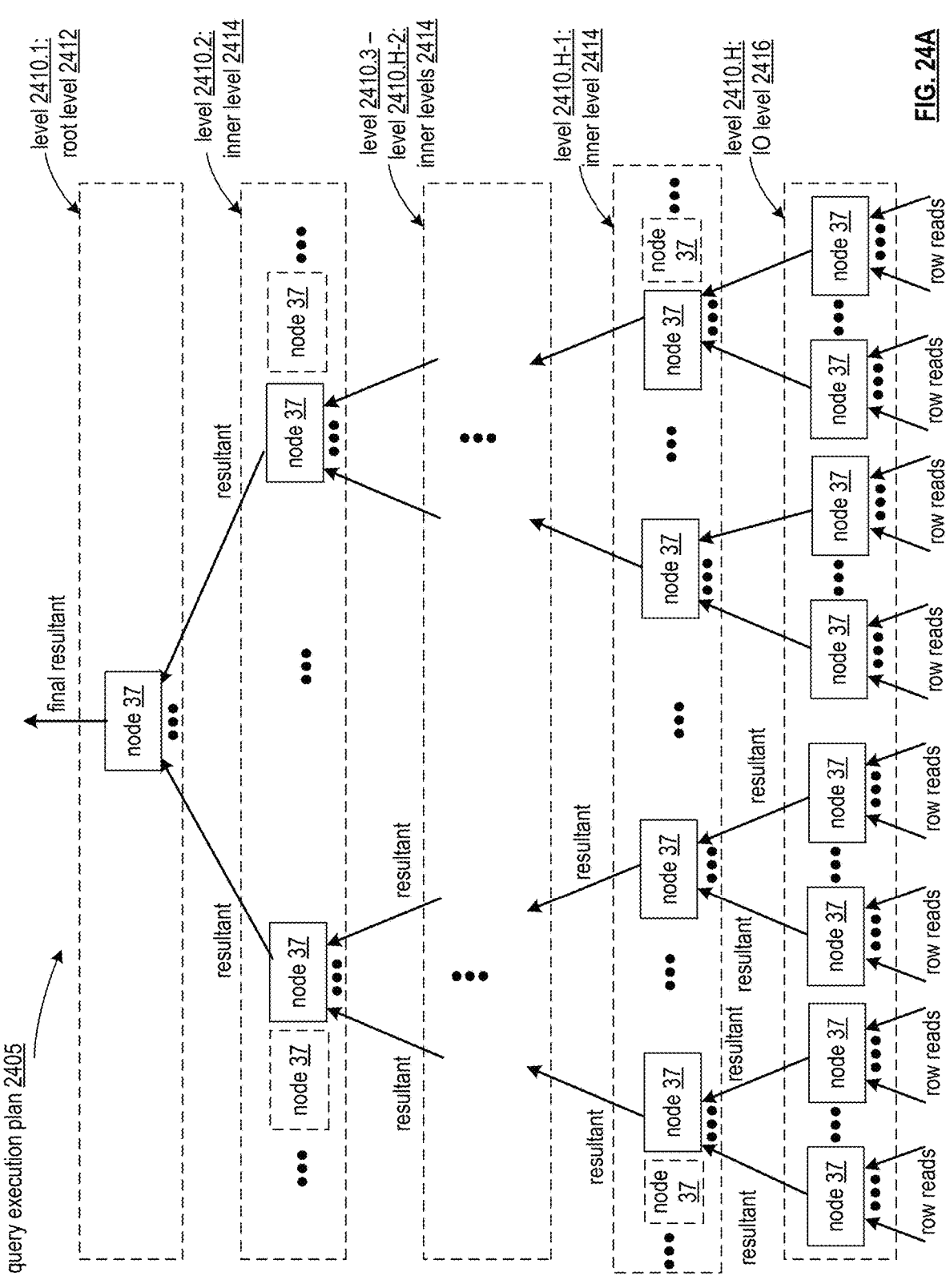
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined (e.g. as an acyclic directed graph of operators), and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree.

For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
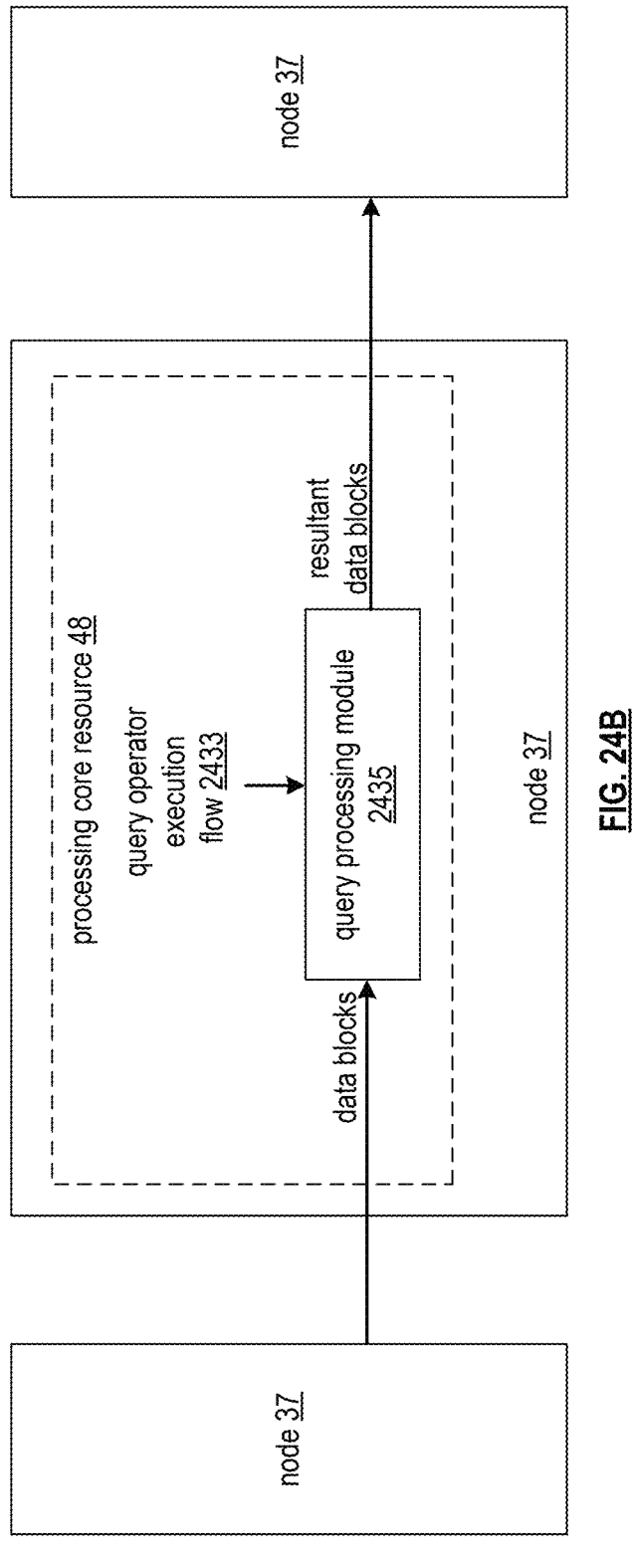
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433 (e.g. as an acyclic directed graph of operators). In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
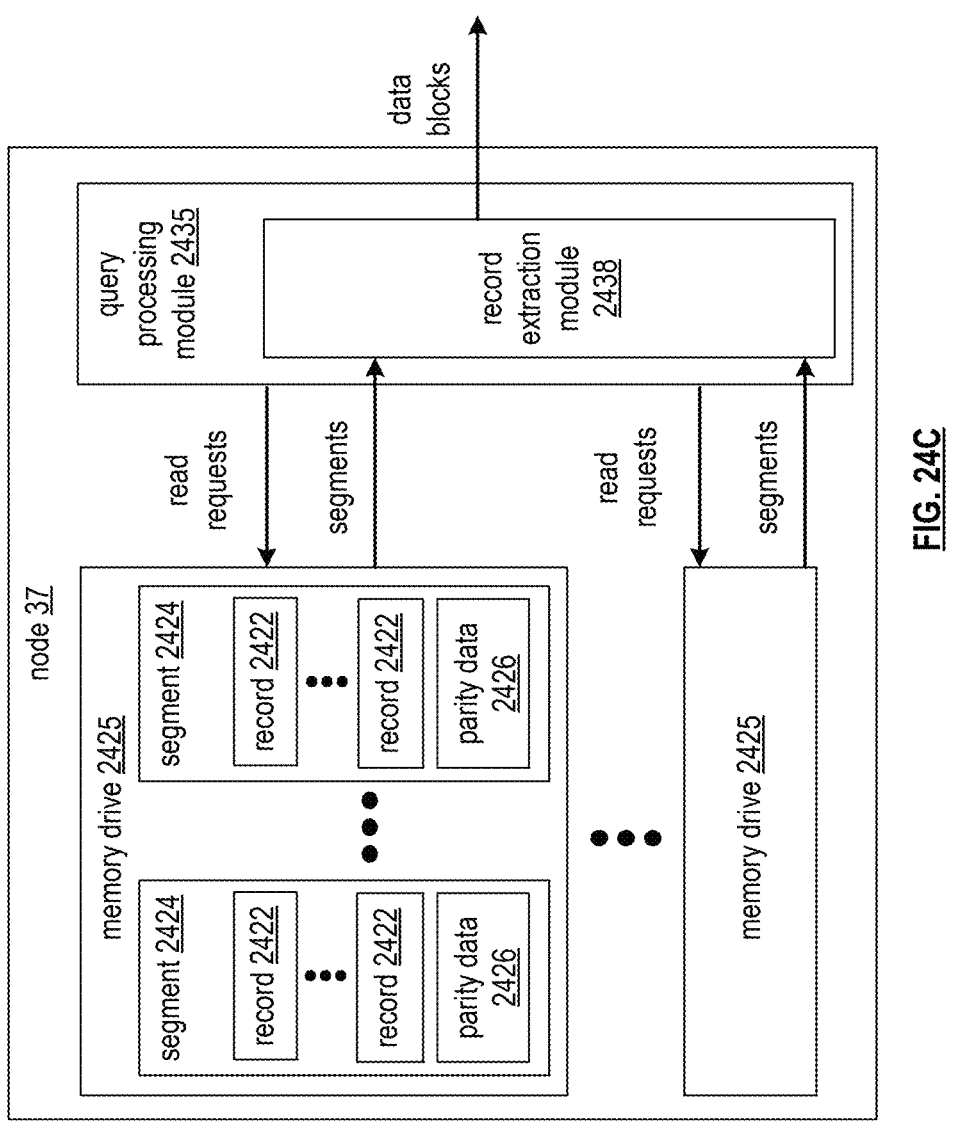

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
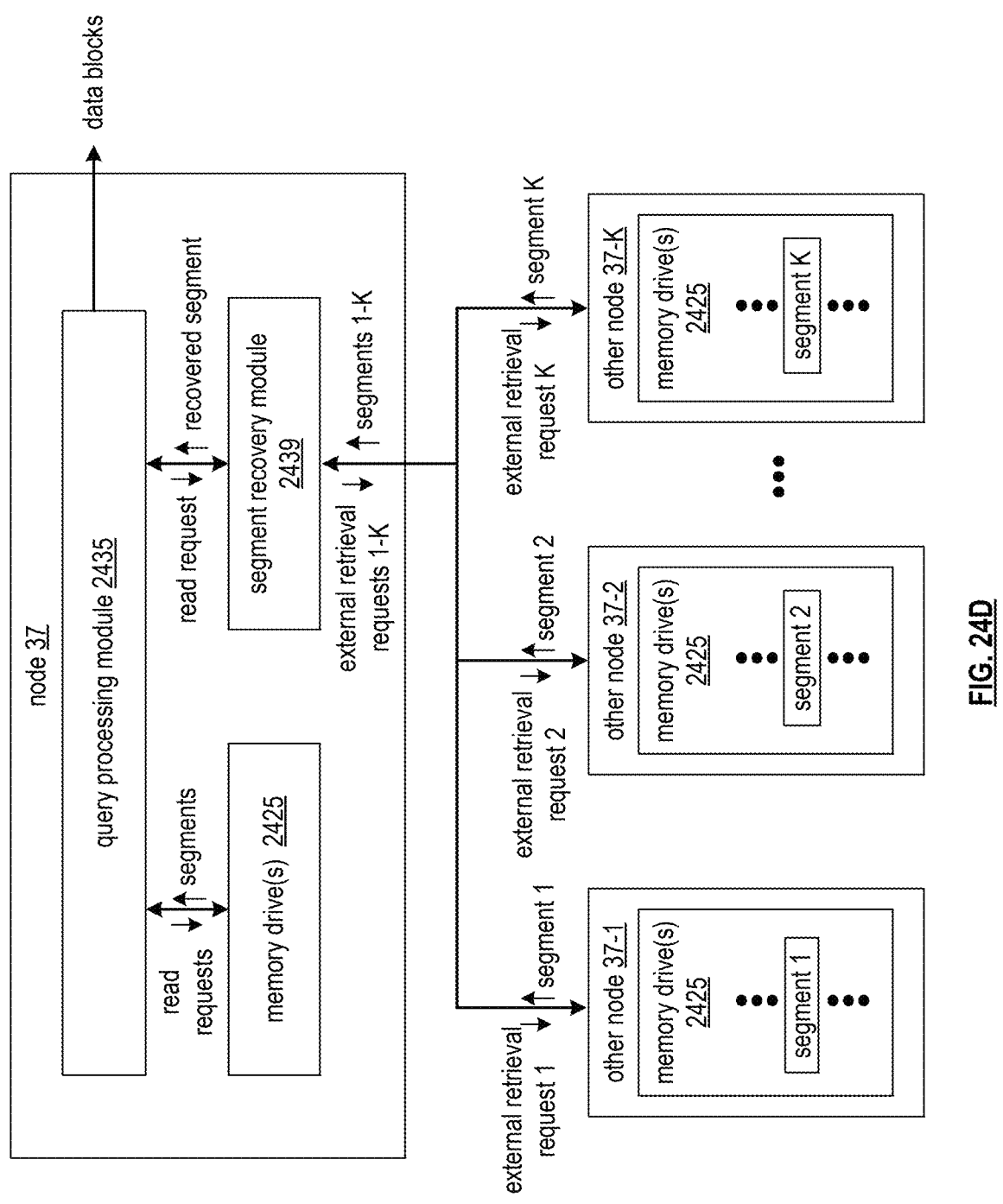

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node set 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
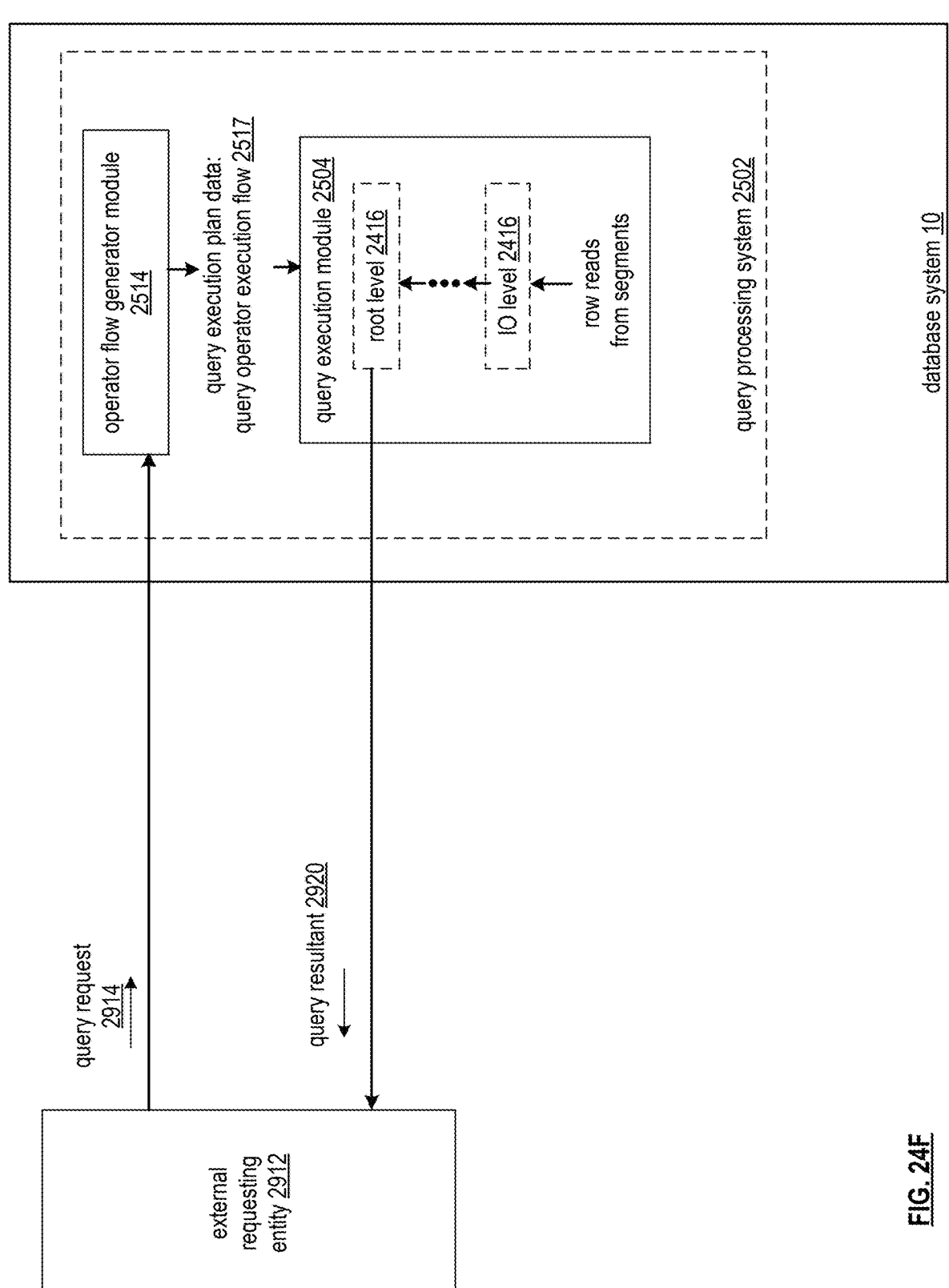
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2914. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2914 for execution via the database system 10, where the corresponding query resultant 2920 is transmitted back to the computing device, for example, for storage by the computing device and/or for display to the corresponding user via a display device.

As another example, a query is automatically generated for execution via processing resources via a computing device and/or via communication with an external requesting entity implemented via at least one computing device. For example, the query is automatically generated and/or modified from a request generated via user input and/or received from a requesting entity in conjunction with implementing a query generator system, a query optimizer, generative artificial intelligence (AI), and/or other artificial intelligence and/or machine learning techniques. The computing device generates and transmits a corresponding query request 2914 for execution via the database system 10, where the corresponding query resultant 2920 is transmitted back to the computing device, for example, for storage by the computing device, transmission to another system, and/or for display to at least one corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
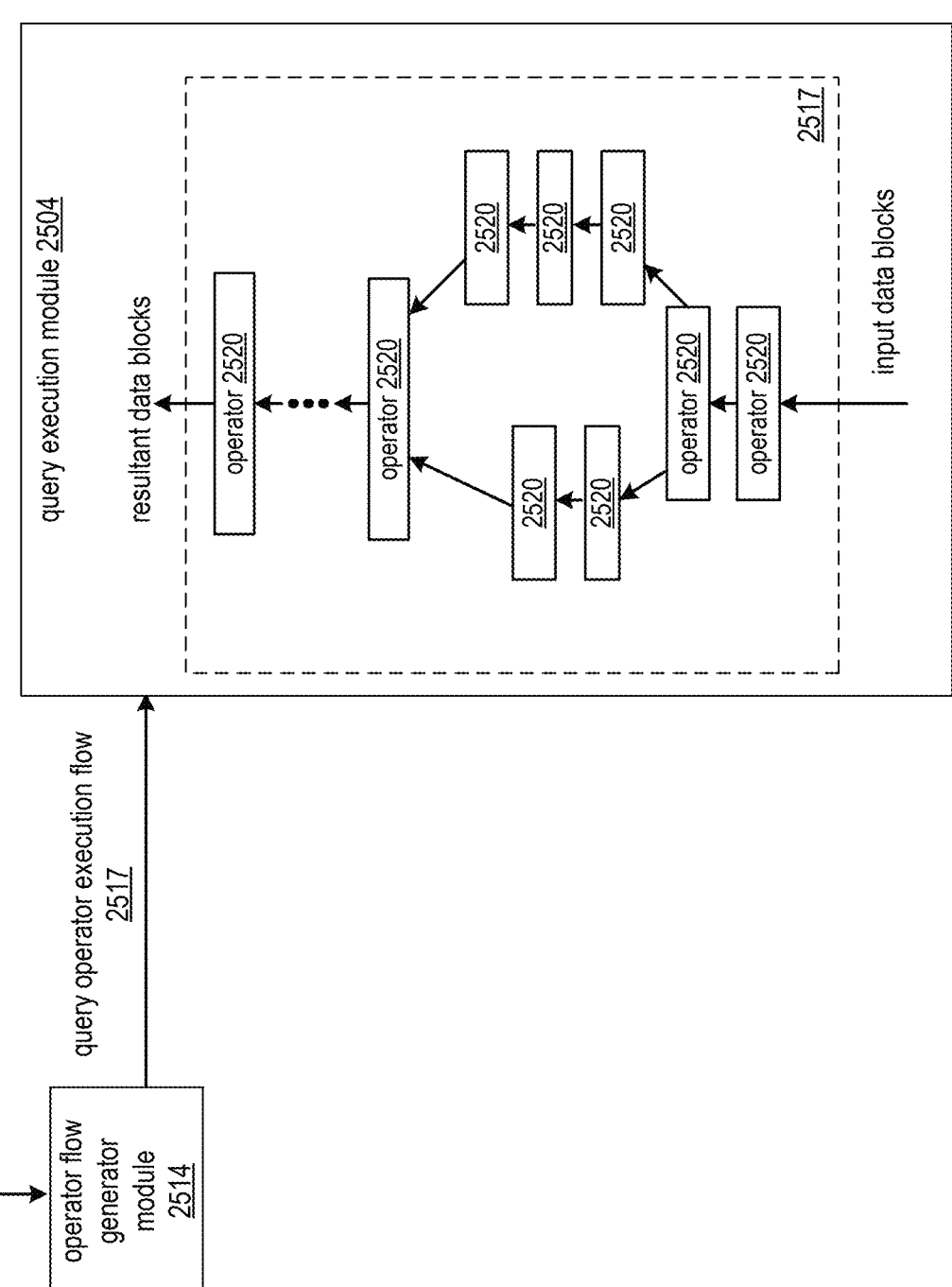
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression (e.g. as an acyclic directed graph of operators), and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by performing a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
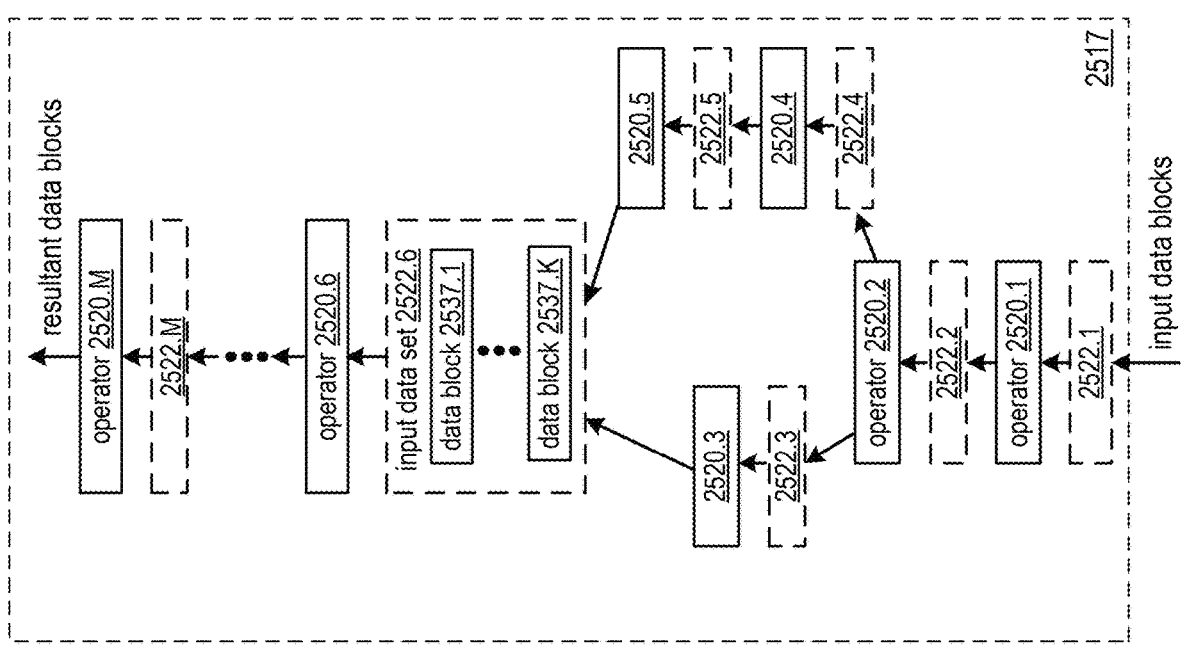
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.i this common query operator execution flow 2433 can be sent to the one or more other nodes 37 in a same shuffle node set as input data blocks to be added to the input data set 2522 the next operator 2520.i+1, with respect to the serialized ordering of the query of this common query operator execution flow 2433 of the one or more other nodes 37. For example, the output generated via a node's execution of a particular operator 2520.i is added input data set 2522 the next operator 2520.i+1 of the same node's query operator execution flow 2433 based on being serially next in the sequential ordering and/or is alternatively or additionally added to the input data set 2522 of the next operator 2520.i+1 of the common query operator execution flow 2433 of the one or more other nodes in a same shuffle node set based on being serially next in the sequential ordering.

In some cases, in addition to a particular node sending this output generated via a node's execution of a particular operator 2520.i to one or more other nodes to be input data set 2522 the next operator 2520.i+1 in the common query operator execution flow 2433 of the one or more other nodes 37, the particular node also receives output generated via some or all of these one or more other nodes' execution of this particular operator 2520.i in their own query operator execution flow 2433 upon their own corresponding input data set 2522 for this particular operator. The particular node adds this received output of execution of operator 2520.i by the one or more other nodes to the be input data set 2522 of its own next operator 2520.i+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.i+1 corresponds to and/or is utilized to implement JOIN operator and/or a custom-join operator of the query operator execution flow 2517, and where the operator 2520.i+1 thus utilizes input received from many different nodes in the shuffle node set in accordance with their performing of all of the operators serially before operator 2520.i+1 to generate the input to operator 2520.i+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
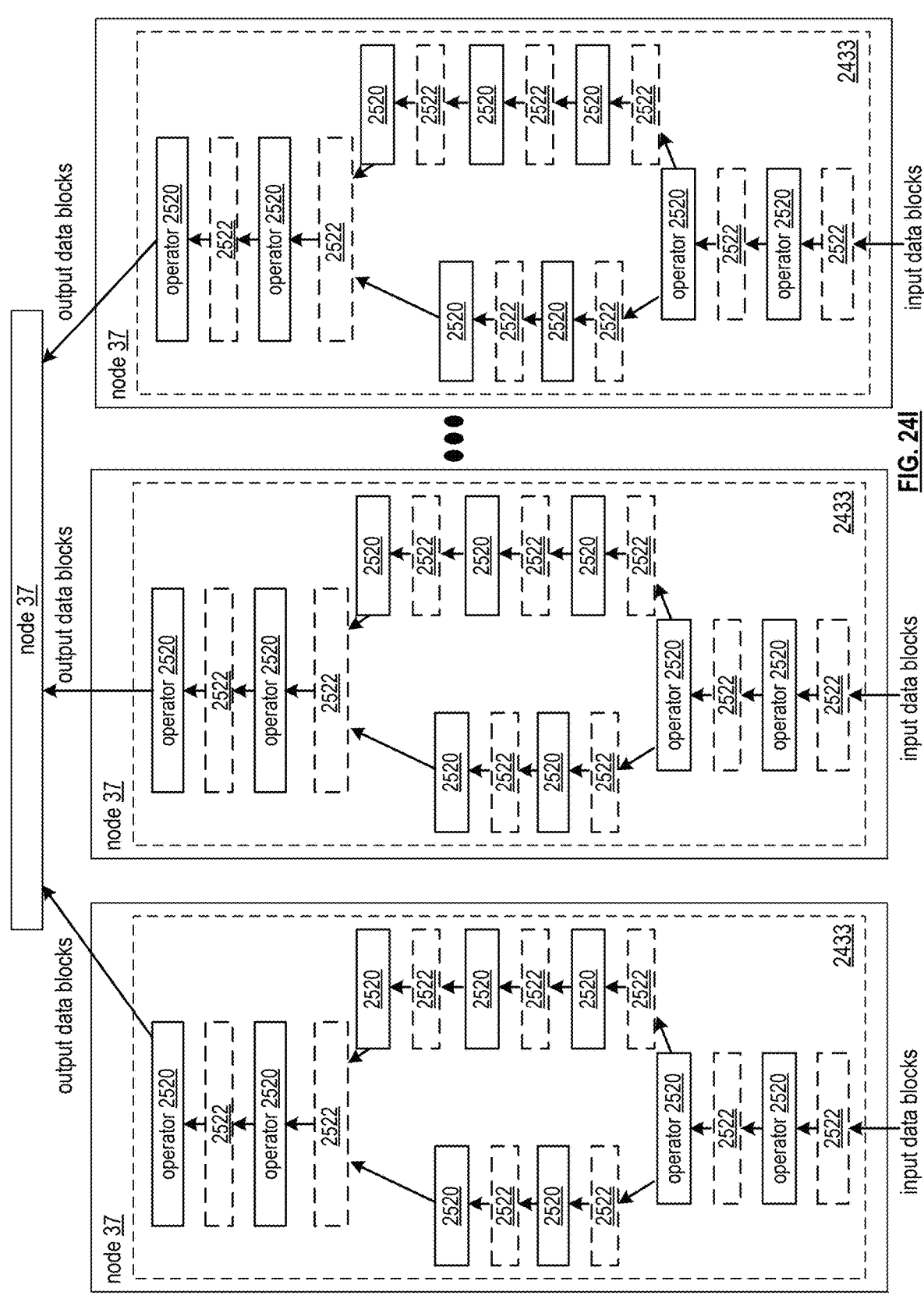
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
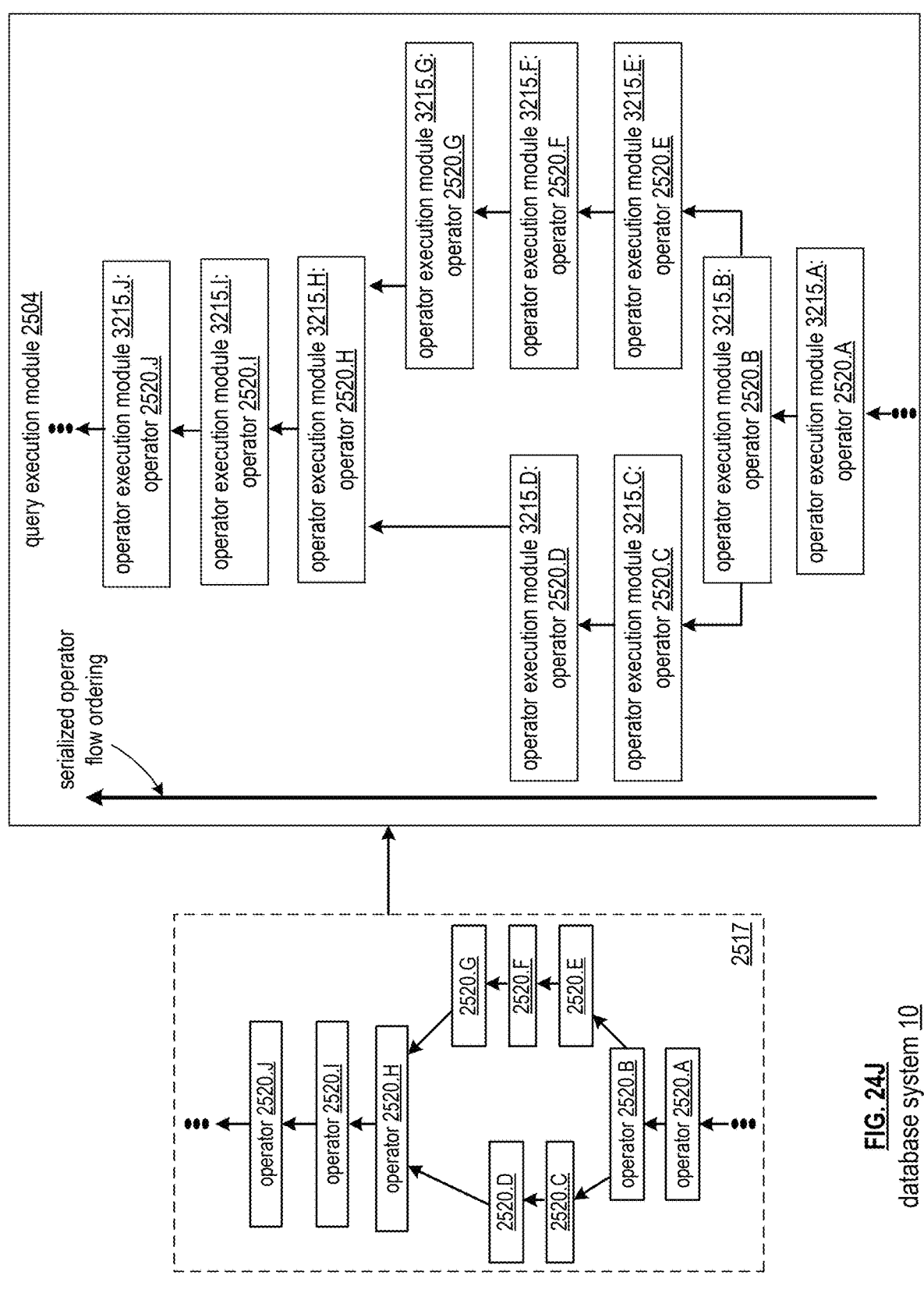
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
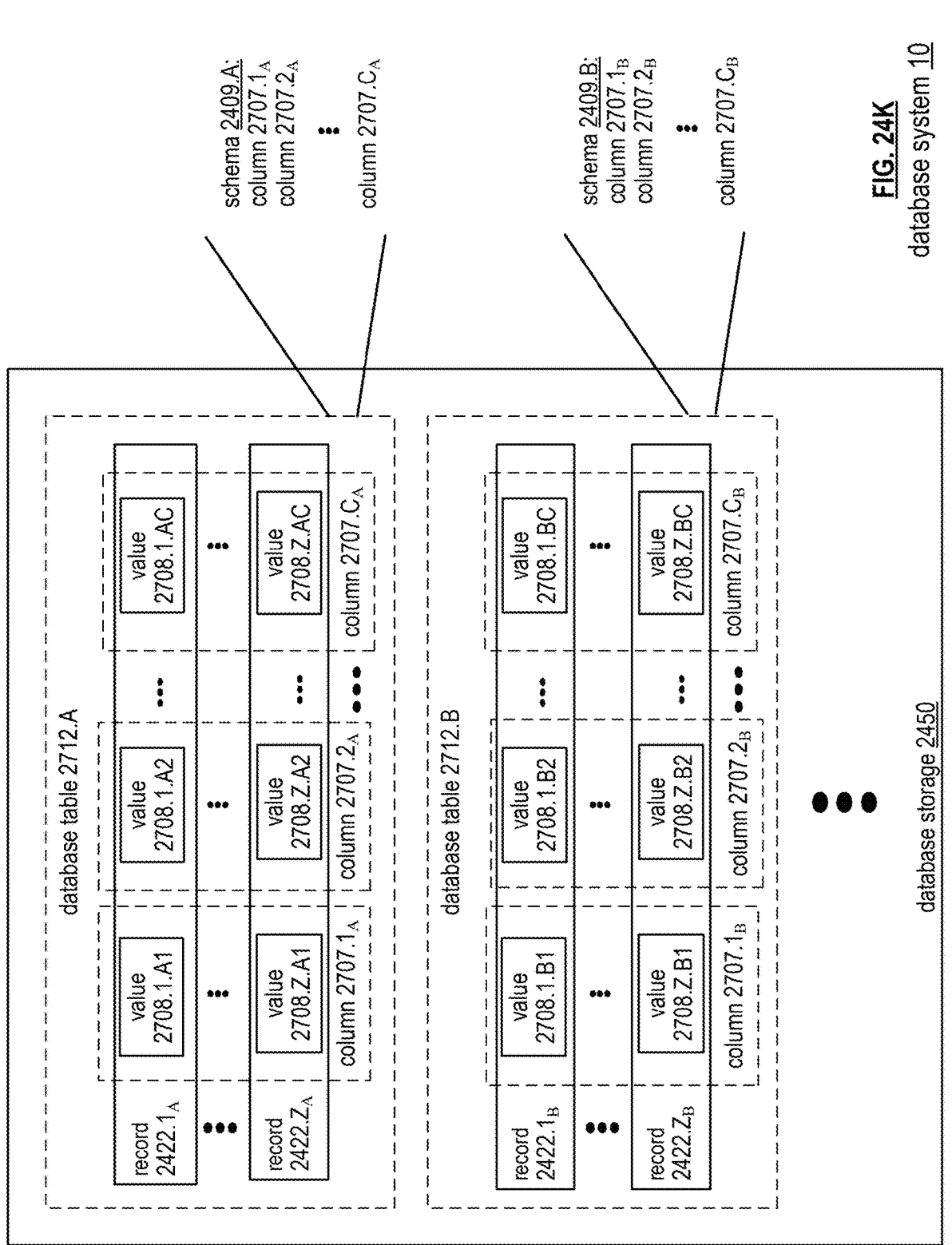
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709A for database table 2712A can have a different number of columns than and/or can have different datatypes for some or all columns of the set of columns $2707.1B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
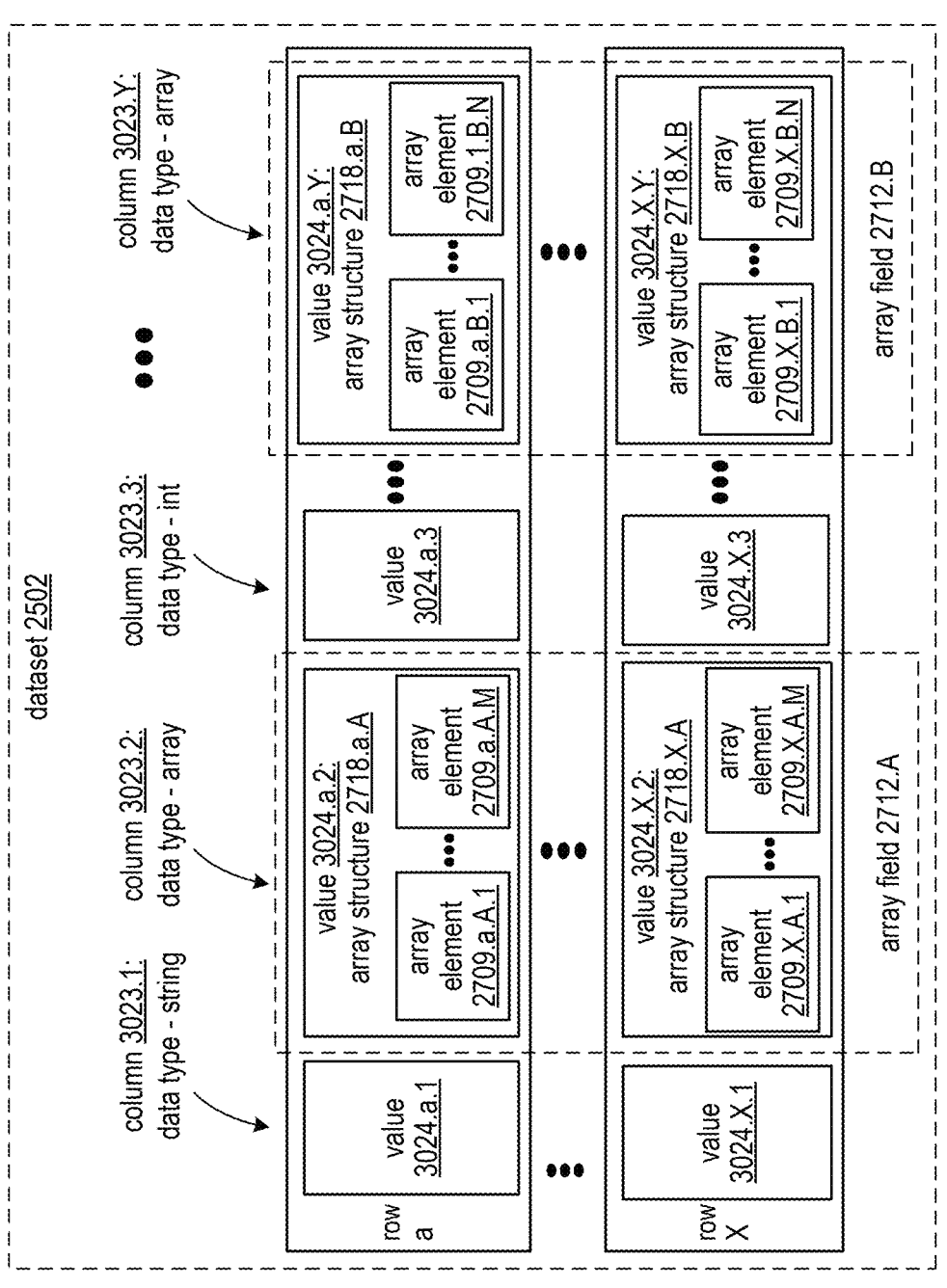
FIG. 24L illustrates an example embodiment of a dataset stored in database storage that includes at least one array field in accordance with various embodiments.

FIG. 24L illustrates an embodiment of a dataset 2502 having one or more columns 3023 implemented as array fields 2712. Some or all features and/or functionality of the dataset 2502 of FIG. 24L can be utilized to implement one or more of the database tables 2712 of FIG. 24K and/or any embodiment of any database table and/or dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 24M:
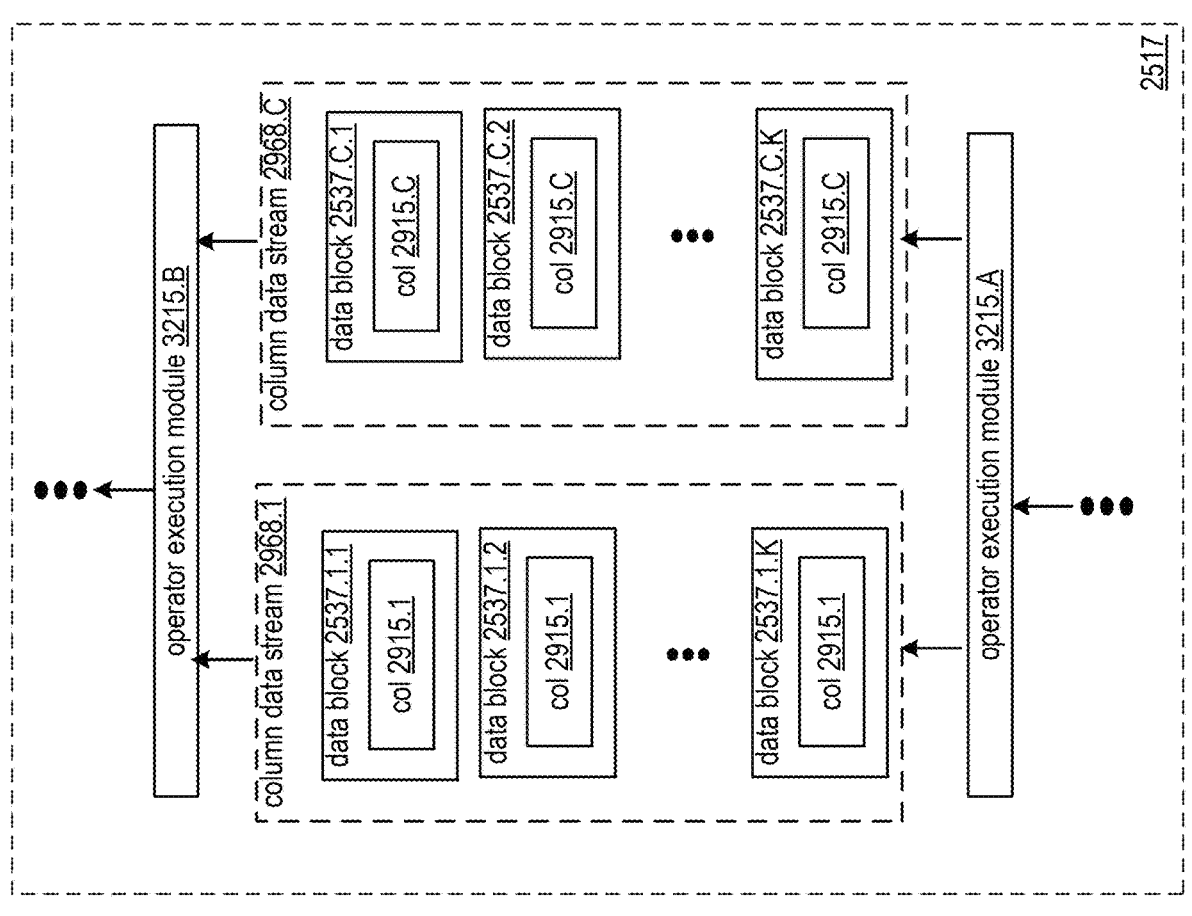
FIG. 24M is a schematic block diagram of a query execution module that implements a plurality of column data streams in accordance with various embodiments.
Figure 24N:
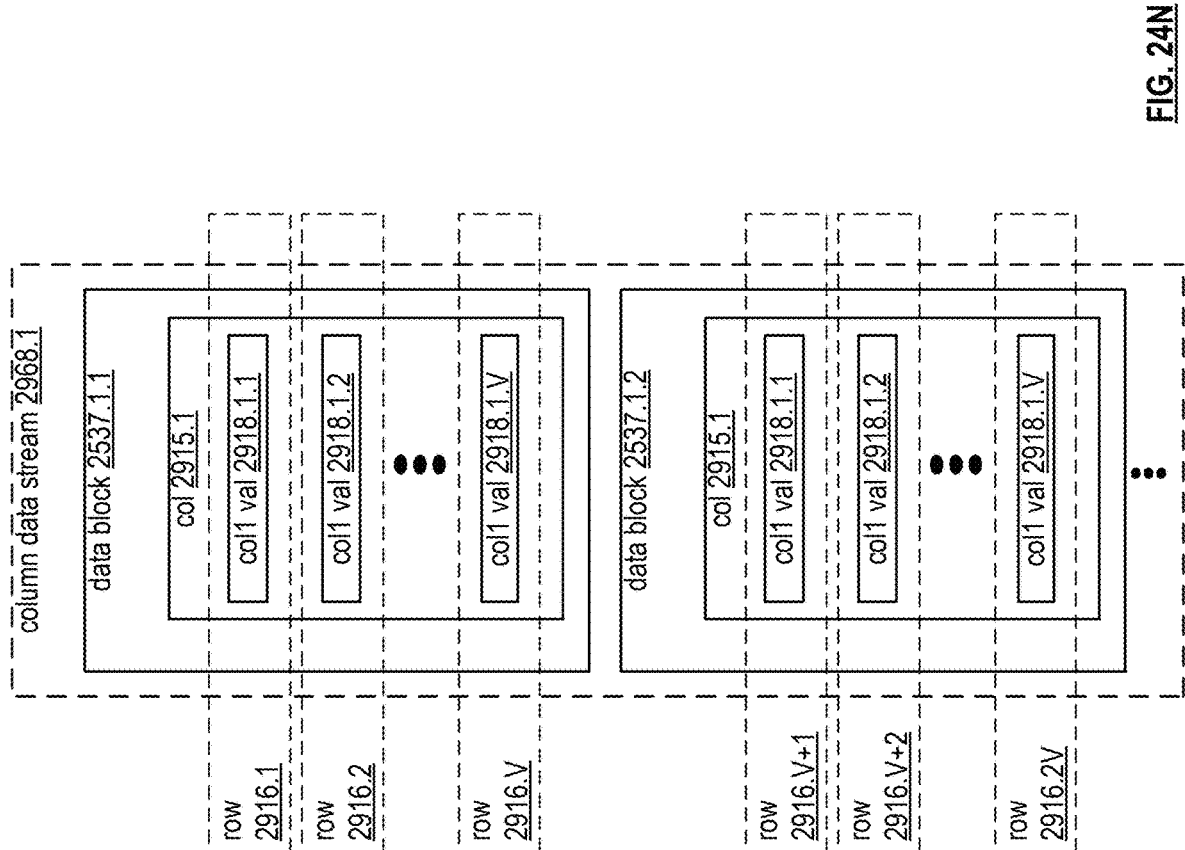
FIG. 24N illustrates example data blocks of a column data stream in accordance with various embodiments.

FIGS. 24M-24N illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24M-24N can implement any embodiment of query execution module 2504 described herein and/or any performance of query execution described herein. Some or all features and/or functionality of column data streams 2968 of FIGS. 24M-24N can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24M, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24N, each data block 2537 of a given column data stream 2968 can include values 2918 for the respective column for one or more corresponding rows 2916. In the example of FIG. 24N, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple columns can be emitted in a same multi-column data stream.

Figure 24O:
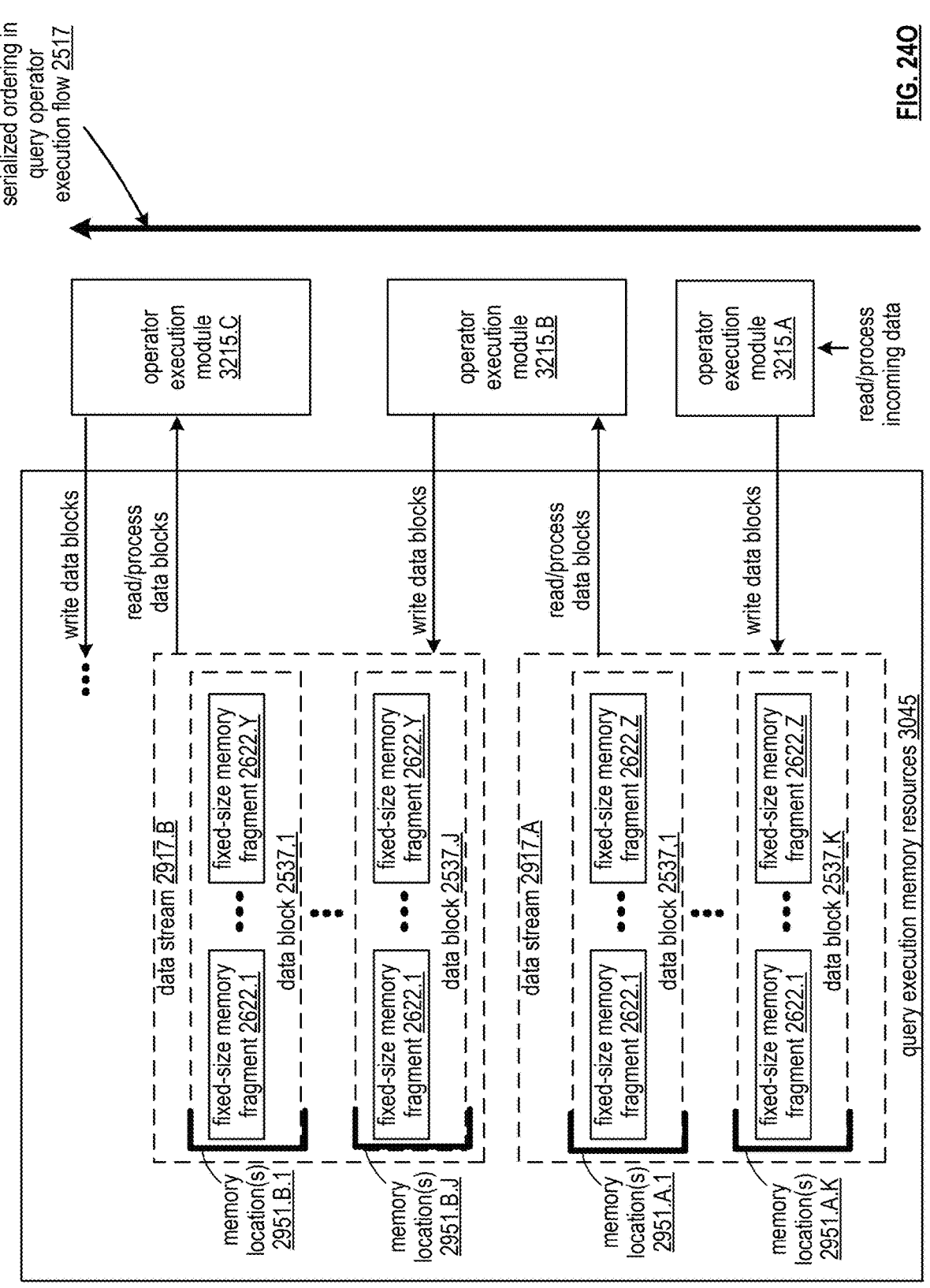
FIG. 24O is a schematic block diagram of a query execution module illustrating writing and processing of data blocks by operator execution modules in accordance with various embodiments.

FIG. 24O illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24O can implement the operator execution modules of FIG. 24J and/or can implement any query execution described herein. The data blocks 2537 can implement the data blocks of column streams of FIGS. 24M and/or 24N, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917A to contiguous or non-contiguous memory fragments 2622 at one or more corresponding memory locations 2951 of query execution memory resources 3045.

Operator execution module 3215A can generate these data blocks 2537.1-2537.K of data stream 2917A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215A can generate its own output data blocks 2537.1-2537.J of data stream 2917.B based on execution of the respective operator upon data blocks 2537.1-2537.K of data stream 2917A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24P:
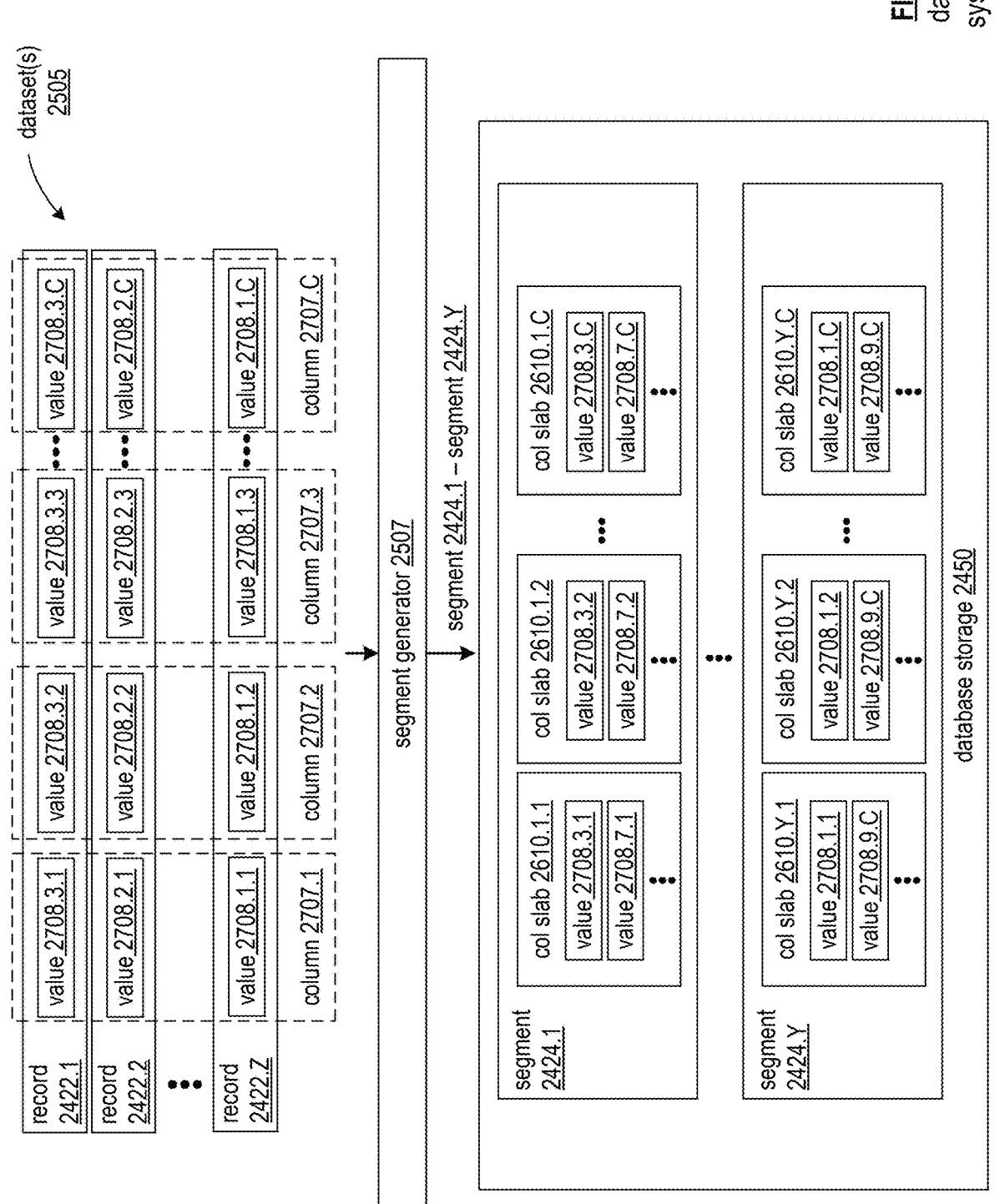
FIG. 24P is a schematic block diagram of a database system that implements a segment generator that generates segments from a plurality of records in accordance with various embodiments.

FIG. 24P illustrates an embodiment of a database system 10 that implements a segment generator 2507 to generate segments 2424. Some or all features and/or functionality of the database system 10 of FIG. 24P can implement any embodiment of the database system 10 described herein. Some or all features and/or functionality of segments 2424 of FIG. 24P can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/ data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/ read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24Q:
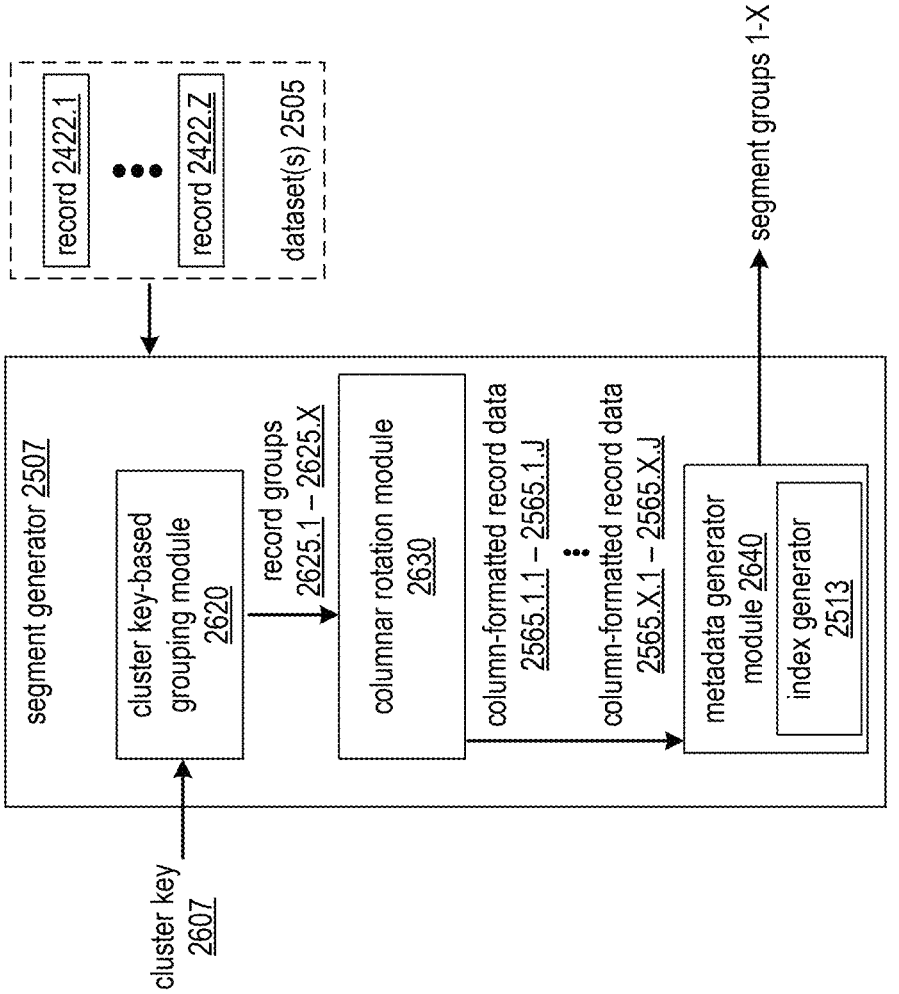
FIG. 24Q is a schematic block diagram of a segment generator that implements a cluster key-based grouping module, a columnar rotation module, and a metadata generator module in accordance with various embodiments.

FIG. 24Q illustrates an example embodiment of a segment generator 2507 of database system 10. Some or all features and/or functionality of the database system 10 of FIG. 24Q can implement any embodiment of the database system 10 described herein. Some or all features and/or functionality of the segment generator 2507 of FIG. 24Q can implement the segment generator 2507 of FIG. 24P and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985, 930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system of U.S. Utility application Ser. No. 16/985,723, U.S. Utility application Ser. No. 16/985,957, and/or U.S. Utility application Ser. No. 16/985,930.

Figure 24R:
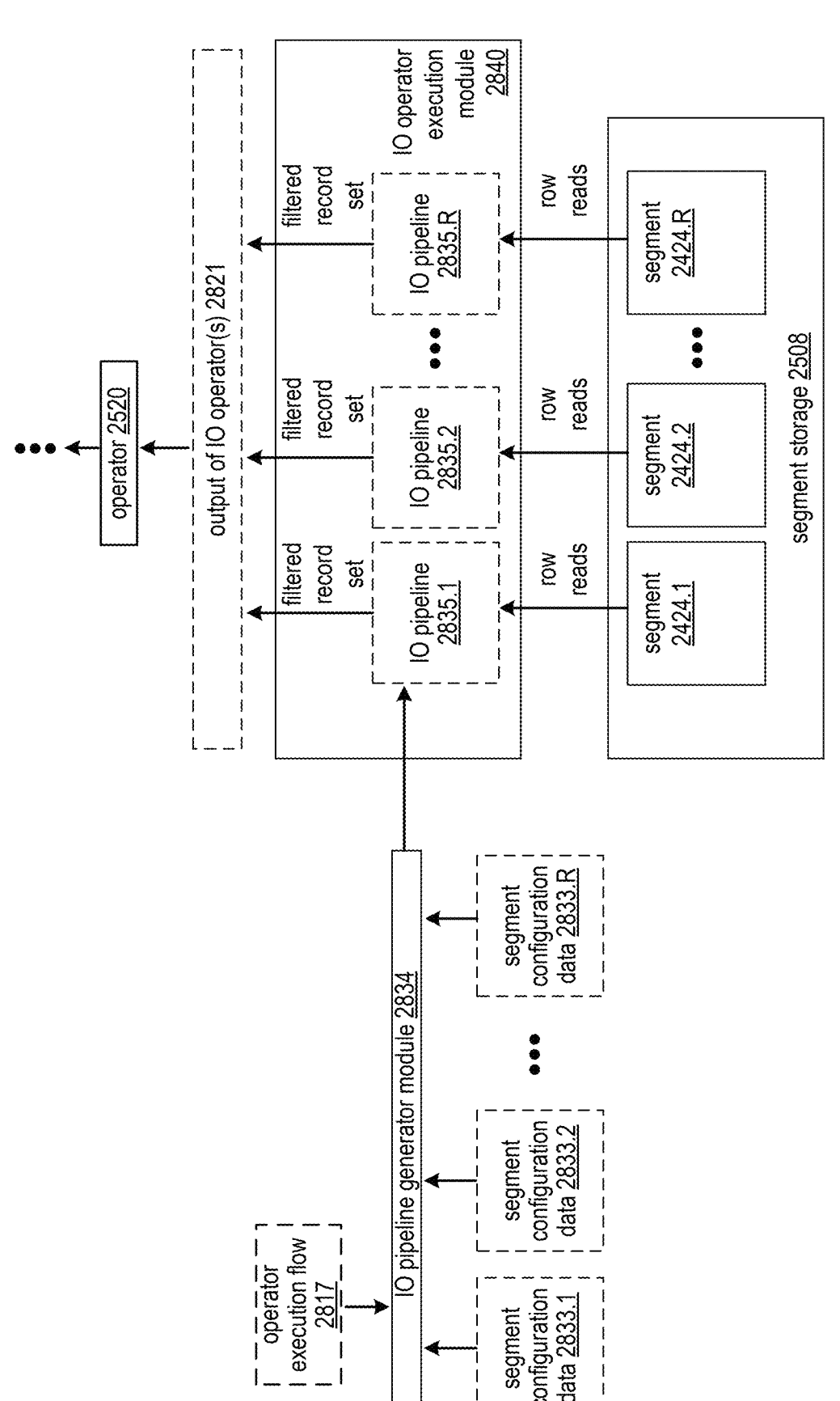
FIG. 24R is a schematic block diagram of a query processing system that generates and executes a plurality of IO pipelines to generate filtered records sets from a plurality of segments in conjunction with executing a query in accordance with various embodiments.

FIG. 24R illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24R can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24S:
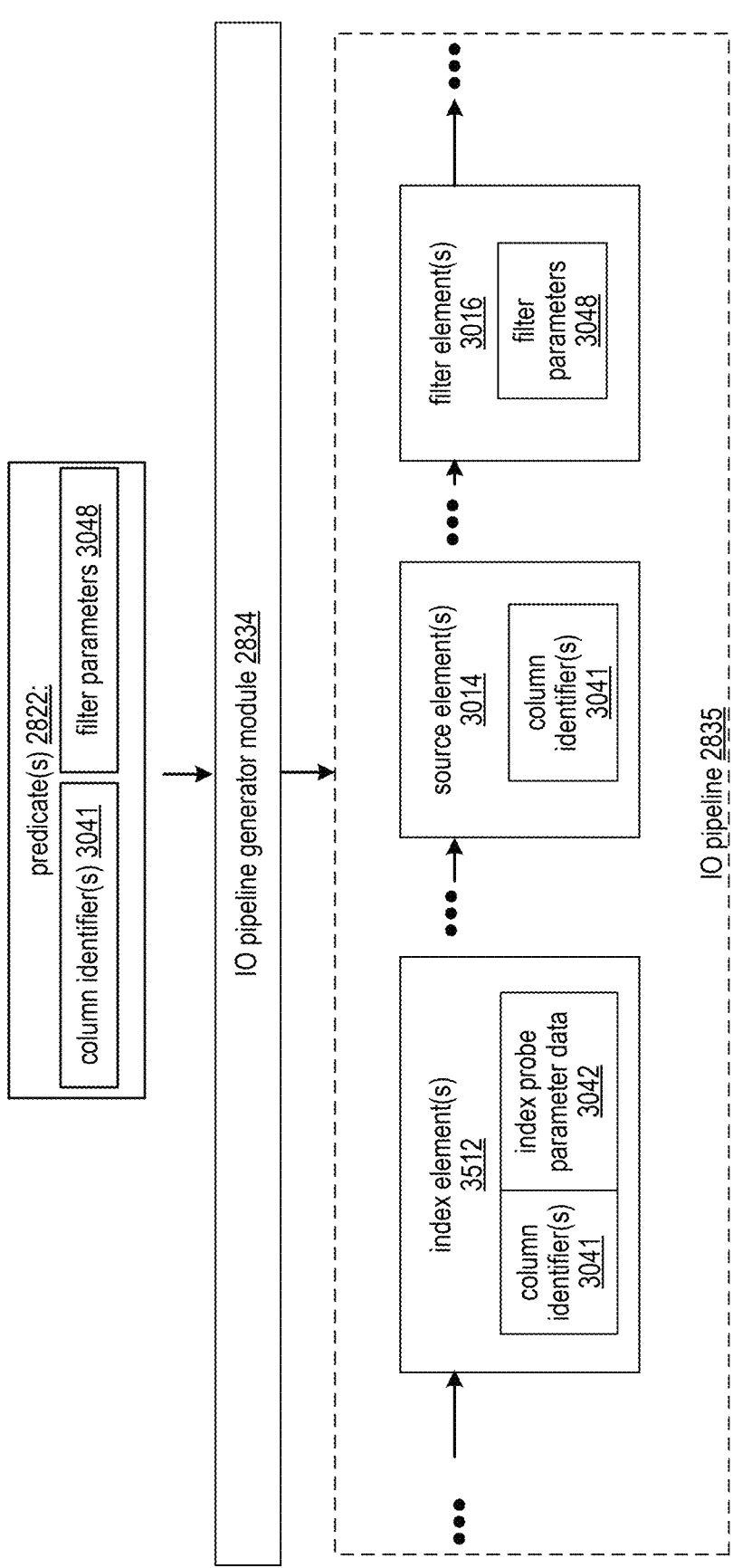
FIG. 24S is a schematic block diagram of a query processing system that generates an IO pipeline for accessing a corresponding segment based on predicates of a query in accordance with various embodiments.

FIG. 24S illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths (e.g. the IO pipeline includes an acyclic directed graph of elements). These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24S can implement the IO pipeline 2835 and/or IO pipeline generator module 2834 of FIG. 24R, and/or any embodiment of IO pipeline 2835, of IO pipeline generator module 2834, or of any query execution via accessing segments described herein.

In some embodiments, the IO pipeline generator module 2834, IO pipeline 2835, IO operator execution module 2840, and/or any embodiment of IO pipeline generation and/or IO pipeline execution described herein, implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility Patent Application for all purposes.

Figure 24T:
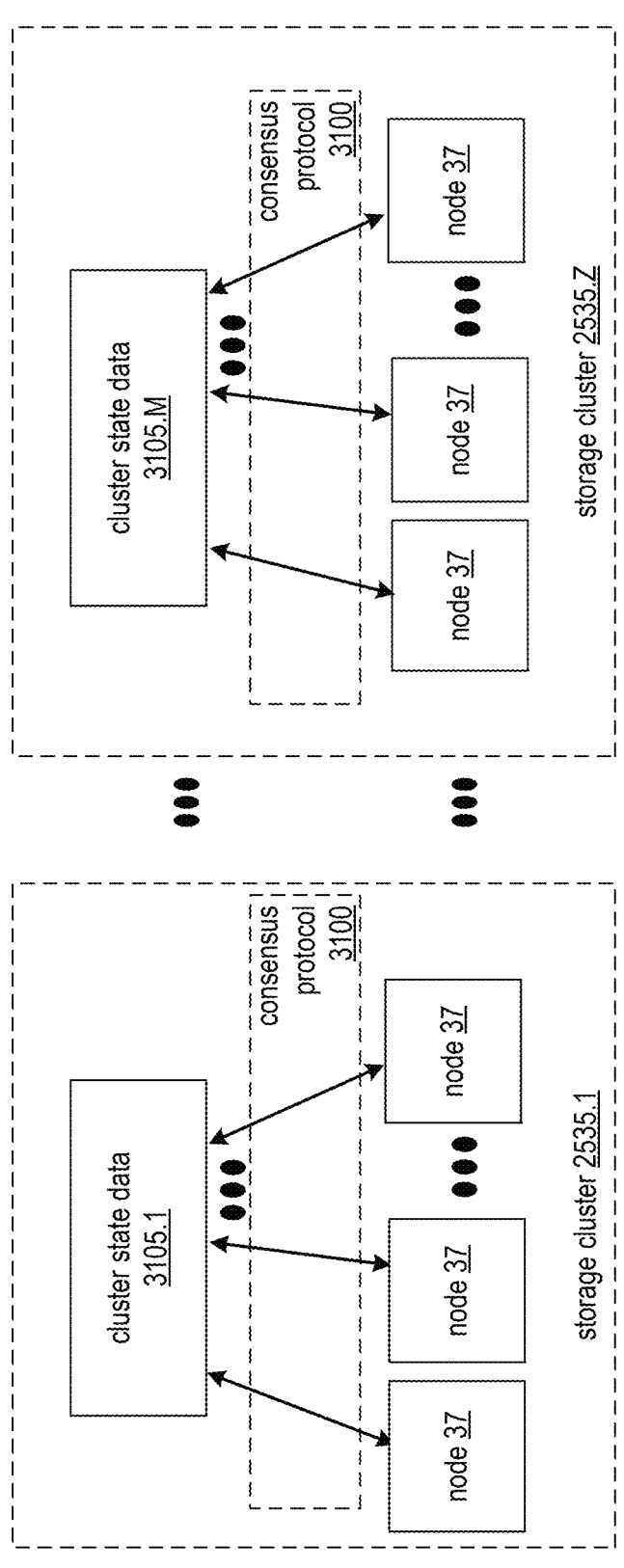
FIG. 24T is a schematic block diagram of a database system that includes a plurality of storage clusters that each mediate cluster state data via a plurality of nodes in accordance with a consensus protocol in accordance with various embodiments.

FIG. 24T presents an embodiment of a database system 10 that includes a plurality of storage clusters 2535. Storage clusters 2535.1-2535.Z of FIG. 24T can implement some or all features and/or functionality of storage clusters 35-1-35-Z described herein, and/or can implement some or all features and/or functionality of any embodiment of a storage cluster described herein. Some or all features and/or functionality of database system 10 of FIG. 24T can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster

2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

In some embodiments, updating of state data (such as configuration data, system metadata, data shared via a consensus protocol, and/or any other state data described herein), for example, utilized by nodes to perform respective functionality over time, can be performed in conjunction with an event driven model. In some embodiments, such updating of state data over time can be performed in a same or similar fashion as updating of configuration data as disclosed by: U.S. Utility application Ser. No. 18/321,212, entitled COMMUNICATING UPDATES TO SYSTEM METADATA VIA A DATABASE SYSTEM, filed May 22, 2023; and/or U.S. Utility application Ser. No. 18/310,262, entitled "GENERATING A SEGMENT REBUILD PLAN VIA A NODE OF A DATABASE", filed May 1, 2023; which are hereby incorporated herein by reference in their entirety and made part of the present U.S. Utility Patent Application for all purposes.

In some embodiments, system metadata can be generated and/or updated over time with different corresponding metadata sequence numbers (MSNs). For example, such generation/updating of metadata over time can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility Patent Application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 24U:
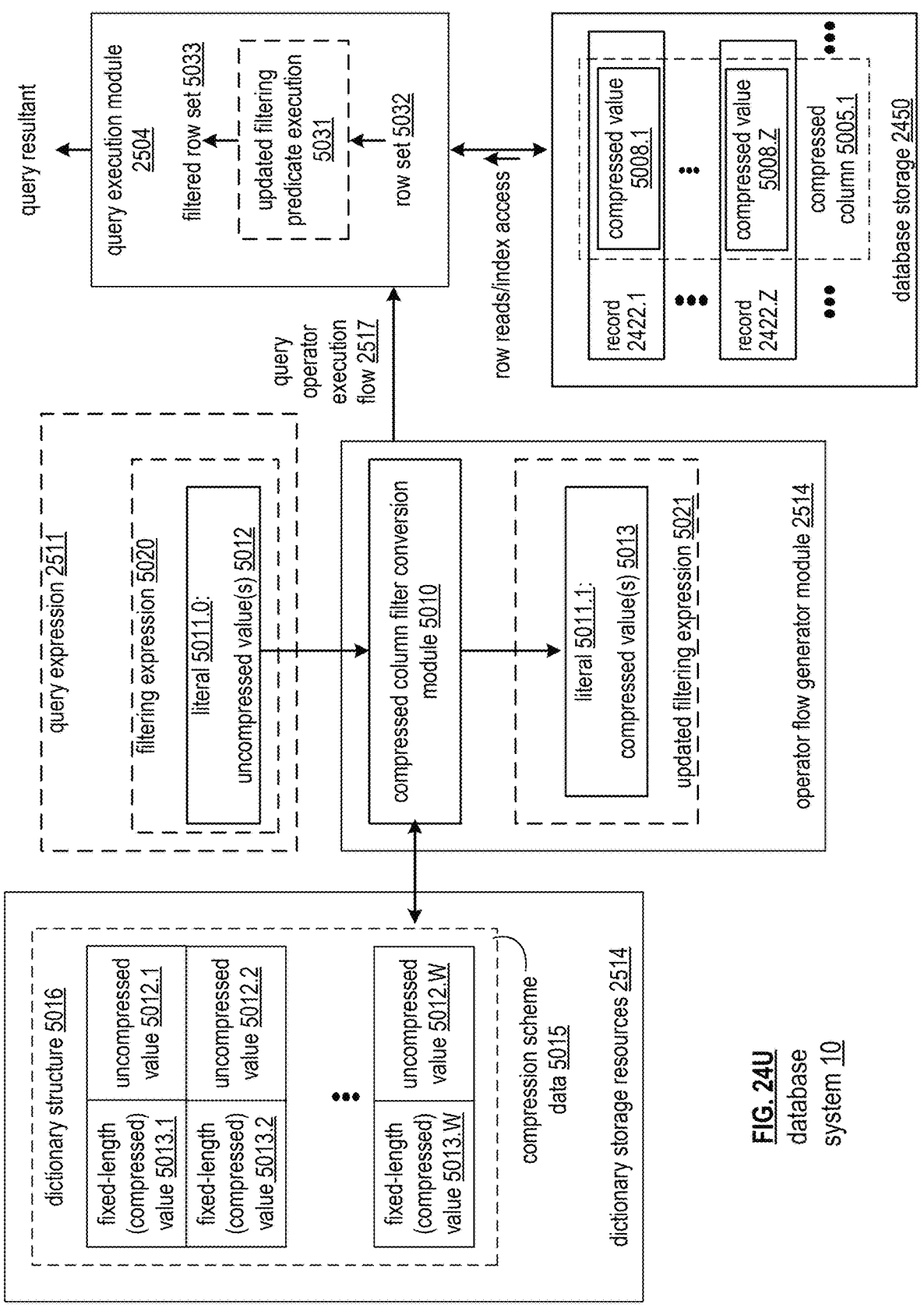
FIG. 24U is a schematic block diagram of a database system that implements a compressed column filter conversion module based on accessing a dictionary structure in accordance with various embodiments.
Figure 24V:
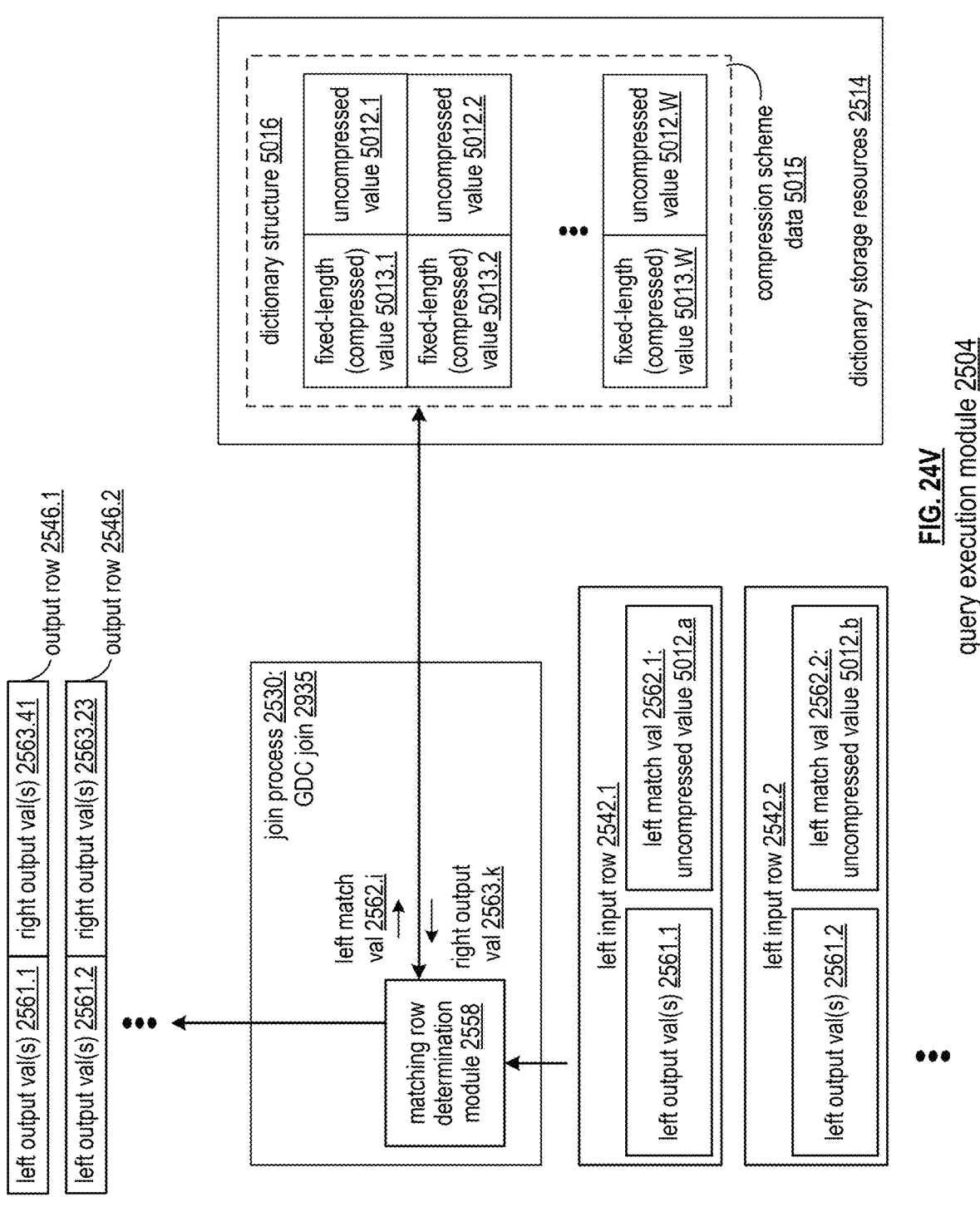
FIG. 24V is a schematic block diagram of a query execution module that implements a Global Dictionary Compression join via access to a dictionary structure in accordance with various embodiments.

FIGS. 24U and 24V illustrate embodiments of a database system 10 that utilizes a dictionary structure to store compressed columns. Some or all features and/or functionality of the dictionary structure 5016 of FIGS. 24U and/or 24V can implement any compression scheme data and/or means of generating and/or accessing compressed columns described herein. Any other features and/or functionality of database system 10 of FIG. 24U and/or 24V can implement any other embodiment of database system 10 described herein.

In some embodiments, columns are compressed as compressed columns 5005 based on a globally maintained dictionary (e.g. dictionary structure 5016), for example, in conjunction with applying Global Dictionary Compression (GDC). Applying Global Dictionary Compression can include replaces variable length column values with fixed length integers on disk (e.g. in database storage 2450), where the globally maintained dictionary is stored elsewhere, for example, via different (e.g. slower/less efficient) memory resources of a different type/in a different location from the database storage 2450 that stores the compressed columns 5005 accessed during query execution.

The dictionary structure can store a plurality of fixed-length, compressed values 5013 (e.g. integers) each mapped to a single uncompressed value 5012 (e.g. variable-length values, such as strings). The mapping of compressed values 5013 to uncompressed values 5012 can be in accordance with a one-to-one mapping. The mapping of compressed values 5013 to uncompressed values 5012 can be based on utilizing the fixed-length values 5013 as keys of a corresponding map and/or dictionary data structure, and/or can be based on utilizing the uncompressed values 5012 as keys of a corresponding map and/or dictionary data structure.

A given uncompressed value 5012 that is included in many rows of one or more tables can be replaced (i.e. "compressed") via a same corresponding compressed value 5013 mapped to this uncompressed value 5012 as the compressed value 5008 for these rows in compressed column 5005 in database storage. As new rows are received for storage over time, their column values for one or more compressed columns 5005 can be replaced via corresponding compressed values 5008 based on accessing the dictionary structure and determining whether the uncompressed value 5012 of this column is stored in the dictionary structure 5016. If yes, the compressed value 5013 mapped to the uncompressed value 5012 in this existing entry is stored as compressed value 5008 in the compressed column 5005 in the database storage 2450. If no, the dictionary structure 5016 can be updated to include a new entry that includes the uncompressed value 5012 and a new compressed value 5013 (e.g. different from all existing compressed values in the structure) generated for this uncompressed value 5012, where this new compressed value 5013 is stored as is applied as compressed value 5008 in the database storage 2450.

The dictionary structure 5016 can be stored in dictionary storage resources 2514, which can be different types of resources from and/or can be stored in a different location from the database storage 2450 storing the compressed columns for query execution. In some embodiments, the dictionary storage resources 2514 storing dictionary structure 5016 can be considered a portion/type of memory as of database storage 2450 that are accessed during query execution as necessary for decompressing column values. In some embodiments, the dictionary storage resources 2514 storing dictionary structure 5016 can be implemented as metadata storage resources, for example, implemented by a metadata consensus state mediated via a metadata storage cluster of nodes maintaining system metadata such as GDCs of the database system 10.

The dictionary structure 5016 can correspond to a given column 5005, where different columns optionally have their own dictionary structure 5016 build and maintained. Alternatively, a common dictionary structure 5016 can optionally be maintained for multiple columns of a same table/same dataset, and/or for multiple columns across different tables/different datasets. For example, a given uncompressed value 5012 appearing in different columns 5005 of the same or different table is compressed via the same fixed-length value 5013 as dictated by the dictionary structure 5016.

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data described herein.

In some embodiments, dictionary compression via dictionary structure 5016 can implement the compression scheme utilized to generate (e.g. compress/decompress the values of) compressed columns 5005 of FIG. 24U based on implementing some or all features and/or functionality of the compression of data during ingress via a dictionary as disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes.

In some embodiments, dictionary compression via dictionary structure 5016 can implement the compression scheme utilized to generate (e.g. compress/decompress the values of) compressed columns 5005 of FIG. 24U based on implementing some or all features and/or functionality of global dictionary compression as disclosed by U.S. Utility application Ser. No. 16/220,454, entitled "DATA SET COMPRESSION WITHIN A DATABASE SYSTEM", filed Dec.

14, 2018, issued as U.S. Pat. No. 11,256,696 on Feb. 22, 2022, which is hereby incorporated herein by reference in its entirety and made part of the present U.S. Utility Patent Application for all purposes.

In some embodiments, dictionary compression via dictionary structure 5016 can be utilized in performing GDC join processes during query execution to enable recovery of uncompressed values during query execution, for example, based on implementing some or all features and/or functionality of GDC joins as disclosed by U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility Patent Application for all purposes.

FIG. 24U illustrates an embodiment of database system 10 where a compressed column filter conversion module 5010 accesses a dictionary structure 5016 to generate an updated filtering expression 5021 in conjunction with query execution.

The compressed column filter conversion module 5010 can generate updated filtering expression 5021 based on updating one or more literals 5011.1 from corresponding literals 5011.0 based on replacing uncompressed values 5012 with compressed values 5013 mapped to these compressed values based on accessing dictionary structure 5016 and determining which fixed-length compressed value 5013 is mapped to each given uncompressed value 5012. Such functionality can be implemented for one or more queries executed by database system 10 to reduce access to the dictionary structure during query execution in conjunction with performing one or more optimizations of the query operator execution flow to improve query performance.

FIG. 24V illustrates an embodiment of executing a join process 2530 that is implemented as a global dictionary compression (GDC)join. This can include applying a matching row determination module 2558 via access to a dictionary structure 5016.

In some embodiments, unlike hash maps generated during query execution for access in conjunction with executing other types of JOIN operations (e.g. as described in U.S. Utility application Ser. No. 18/266,525), the dictionary structure 5016 can optionally be accessed during GDC join processes based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

For example, segments can store the fixed length values to improve storage efficiency and/or queries can access and process these fixed length values, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

Figure 24W:
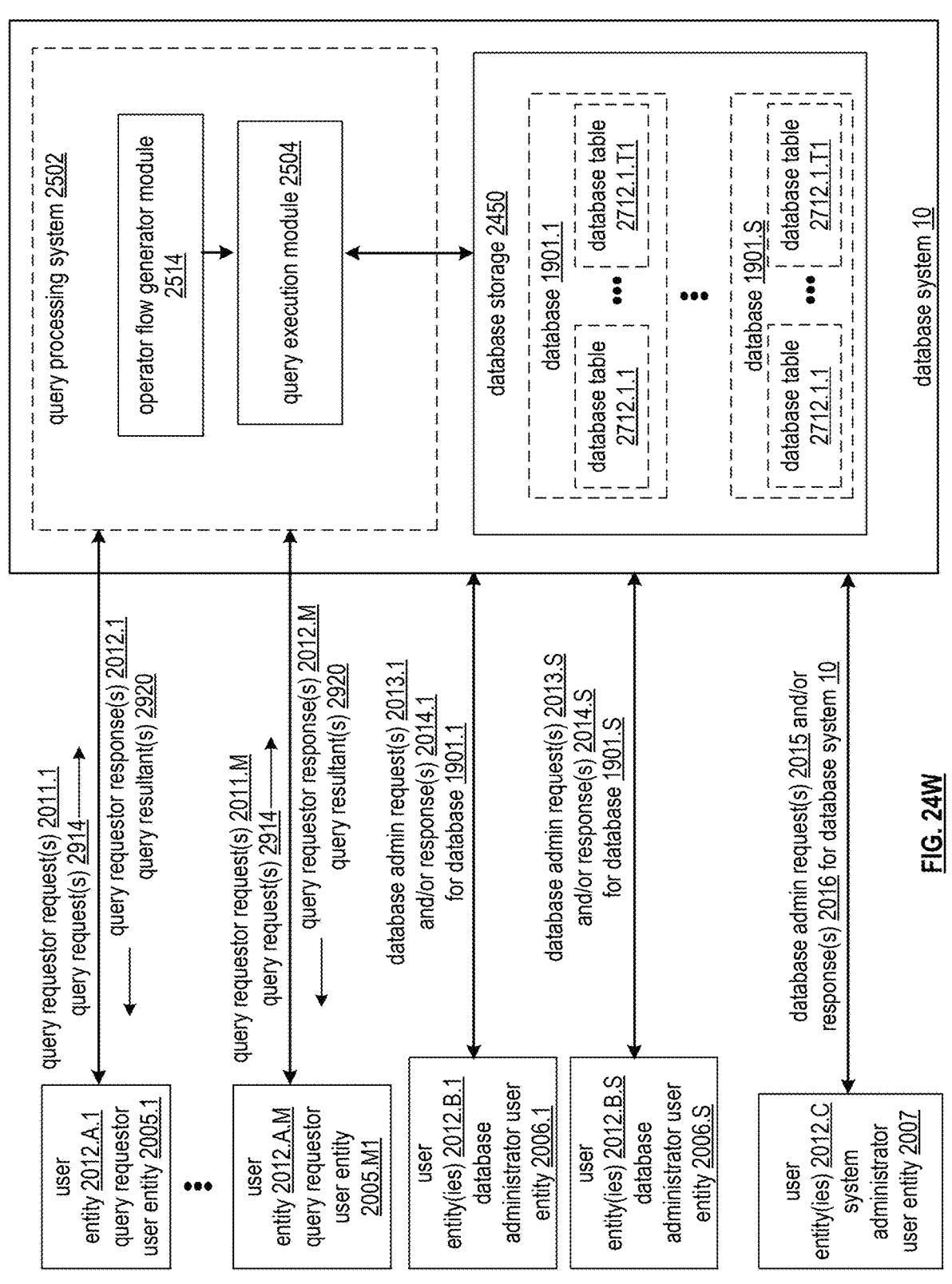
FIG. 24W is a schematic block diagram illustrating communication between database system 10 and a plurality of user entities in accordance with various embodiments.

FIG. 24W illustrates an embodiment of database system 10 operable to communicate with a plurality of user entities. Some or all features and/or functionality of FIG. 24W can implement any embodiment of database system 10 described herein.

Various users can send data to and/or receive data from database system 10 over time, for example, as corresponding requests and/or responses. Requests can indicate requests for queries to be executed, requests that include data to be loaded/stored, requests that include configuration data configuring any values/functionality utilized by database system 10 to perform its functionality, data supplied in response to a request from database system 10, and/or other requests to database system 10 for processing by database system 10. Responses can indicate query resultants of executed queries, notifications/confirmation that requests were processed successfully or rendered failure, error notifications, data supplied in response to a request from user entity 2012, and/or other information.

Some or all user entities 2012 can be implemented as user entities corresponding to humans that communicate with database system 10 (e.g. requests are configured via user input to a corresponding computing device of database system 10 or communicating with database system 10); user entities corresponding to groups of multiple people, for example, corresponding to companies/establishments that communicate with database system 10; user entities corresponding to automated entities such as one or more computing devices and/or server systems (e.g. implemented via artificial intelligence, machine learning, and/or configured instructions to cause these automated entities to send requests and/or process responses; and/or corresponding to a given person and configured to send/receive data based on user input from a corresponding person); and/or other user entities. Some or all user entities 2012 can be implemented as humans and/or devices included in/associated with database system 10 (e.g. personnel/employees of a service provided by database system 10; computing devices implementing nodes/processing modules of database system 10 that communicate via internal communication resources of database system 10, etc.). Some or all user entities 2012 can be implemented as humans and/or devices external from database system 10 (e.g. humans/companies that are customers of a service provided by database system 10; computing devices external from the computing devices/nodes/processing resources of database system 10 that communicate with database system 10 via a corresponding communication interface, etc.)

User entities 2012 can include various type of user entities 2012, which can include one or more user entities 2012A, one or more user entities 2012.B, and/or one or more user entities 2012.C. A given user entity can optionally implement multiple types of user entities 2012 (e.g. a given user entity 2012 operates as both a user entity 2012A and a user entity 2012.B). Multiple different users (e.g. different people, different devices) can implement a given user entity 2012 (e.g. different employees of a given company implement a given user entity 2012 at different times; different devices associated with a given person or company implement a given user entity 2012 at different times, etc.).

In some embodiments, some or all user entities 2012 can configure/perform functionality corresponding to workload management (WLM).

User entities 2012 can include one or more user entities 2012.A.1-2012A.M corresponding to query requestor user entities 2005.1-2005.M. Query requestor user entities 2005 can send query requests 2914 indicating queries for execution and/or receive query resultants in response 2920. User entities 2012 can optionally be implemented in a same or similar fashion as external requesting entity 2912.

User entities 2012 can include one or more user entities 2012.B.1-2012.B.S corresponding to database administrator user entities 2006 that request/configure/monitor loading/storage of/access to a corresponding database 1901 that stores a corresponding plurality of database tables 2712.1-2712-T (e.g. database administrator user entities 2006 optionally correspond to data sources that load their data to the system for use in query execution, where this data source sources data included in tables 2712 of a corresponding database 1901).

For example, in some embodiments, database system 10 can implement database storage 2450 to store various tables 2712 corresponding to multiple different databases 1902.1-1901.S, for example, each sourced by, accessible by, and/or configured via corresponding user entities 2012.B. Different databases 1901 can store same or different types of data, same or different numbers of tables 2712, etc. Some or all user entities 2012.A can correspond to a given database 1901 (e.g. based on being associated with the corresponding data source and/or user entities 2012.B) for example, where these user entities are only allowed to query against the given database 1901.

User entities 2012 can include one or more user entities 2012.C corresponding to system administrators of the database system 10 that request/configure/monitor loading/storage of/access to databases in query execution and/or otherwise configure/monitor functionality of database system 10 described herein.

Different user entities can have different corresponding permissions/privileges/access types, for example, indicated in corresponding user permissions data stored by and/or accessible by database system 10. In some embodiments, one or more given user entities can configure permissions of other user entities. Such permissions can configure types of requests that can be sent, restrictions on data included in responses, and/or which data can be accessed (e.g. in loading data and/or requesting data). For example, some users entities 2012.A can be restricted to certain types of queries/query functions be performed, access to only some databases 1902 and/or only some tables 2712, limits on how many queries be executed/how much data be returned, certain levels of query priority, certain service classes of query execution defining corresponding attributes of how queries be executed/how query execution be restricted, etc. As another example, some user entities 2012.B can be restricted to certain types/rates of data loading to a corresponding database 1901, certain permissions regarding how much configuration of database system 10 they can have power over, etc. As another example, different user entities 2012.C can have different permissions regarding how much configuration of database system 10 they can have power over, different functionalities/aspects of database system that they have permissions to configure, etc.

Figure 25A:
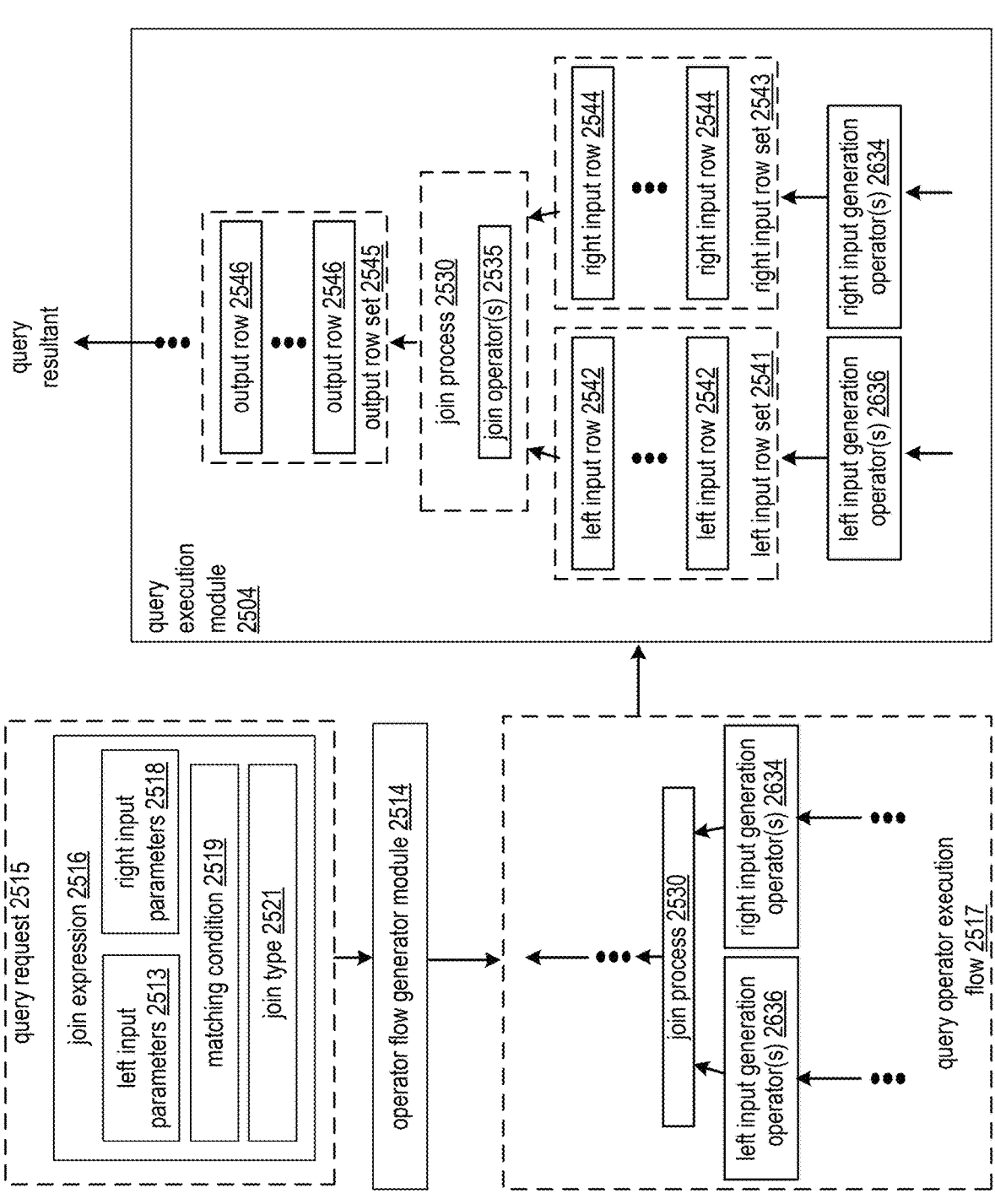
FIG. 25A is a schematic block diagram of a database system executing a join process based on a join expression of a query request in accordance with various embodiments.
Figure 25B:
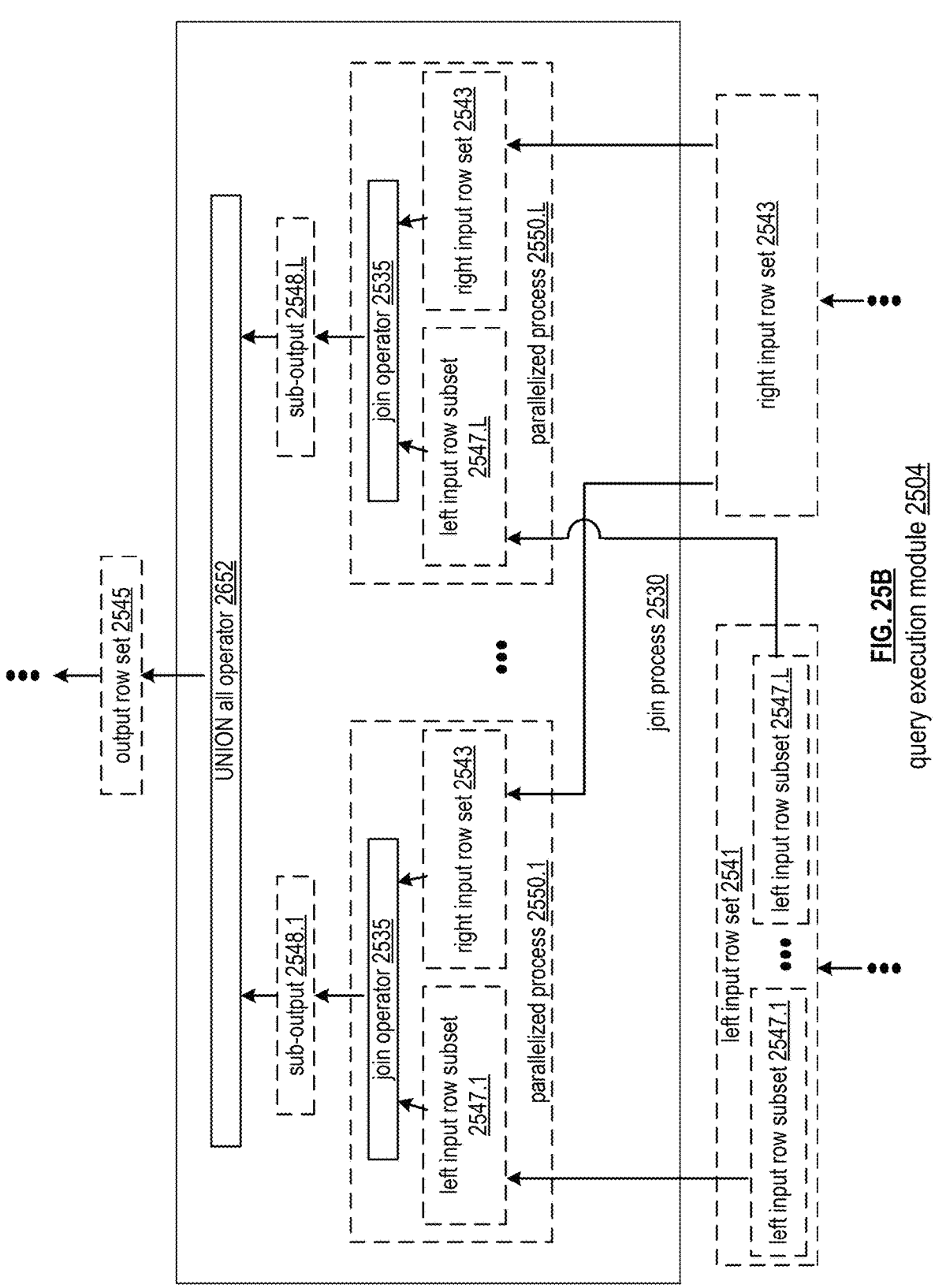
FIG. 25B is a schematic block diagram of a query execution module executing a join process via multiple parallel processes in accordance with various embodiments.
Figure 25C:
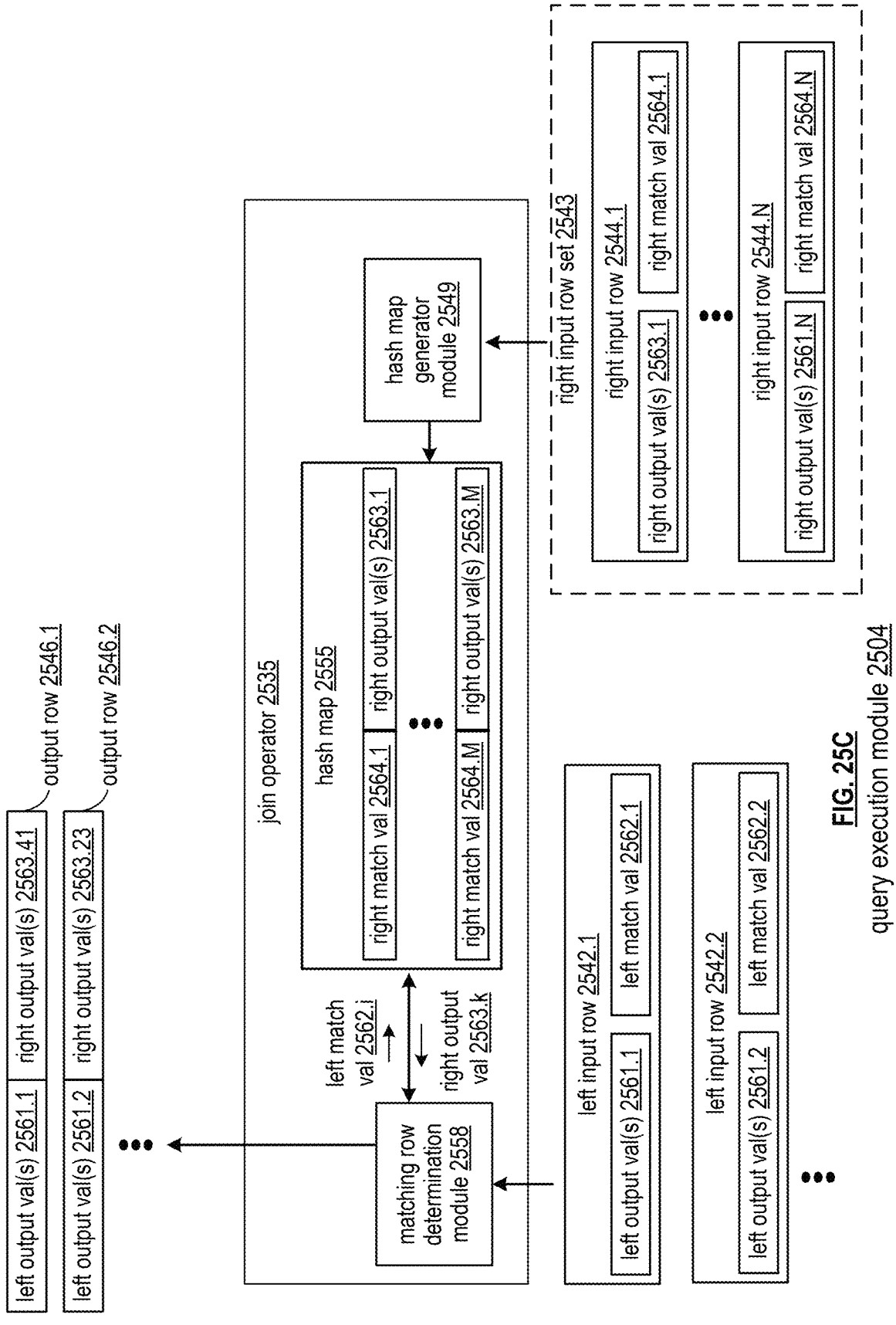
FIG. 25C is a schematic block diagram of a query execution module executing a join operator based on utilizing a hasp map generated from right input rows in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 when executing queries indicating join expressions. Some or all features and/or functionality of FIGS. 25A-25C can be utilized to implement any embodiment of the database system 10 described herein.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output row 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

FIG. 25B illustrates an embodiment of a query execution module 2504 executing a join process 2530 via a plurality of parallelized processes 2550.1-2550.L. Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. The plurality of parallelized processes 2550.1-2550.L can be implemented via any other set of parallelized and/or distinct memory and/or processing resources.

Each parallelized process 2550 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, L different nodes and/or L different subsets of nodes that each include multiple nodes generate a corresponding left input row subset 2547 at a corresponding level of the query execution plan at a level below the level of nodes implementing the plurality of parallelized processes 2550.1-2550.L. For example, each parallelized process 2550 only receives the left input rows 2542 generated by its own one or more child nodes, where each of these child nodes only sends its output data blocks to one parent. The left input row set 2541 can otherwise be segregated into the set of left input row subsets 2547.1-2547.L, each designated for a corresponding one of the set of parallelized processes 2550.1-2550.L. The plurality of left input row subsets 2547.1-2547.L can be mutually exclusive and collectively exhaustive with respect to the left input row set 2541, where each left input row 2542 is received and processed by exactly one parallelized process 2550.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, L different nodes and/or L different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2550.1, for example, based on each node of this other set of nodes sending its output data blocks to all L nodes implementing the L parallelized processes 2550, rather than a single parent. Alternatively, the right input rows 2544 generated by a given node can be sent by the node to one parent implementing a corresponding one of the plurality of parallelized processes 2550.1-2550.L, where the L nodes perform a shuffle and/or broadcast process to share received rows of the right input row set 2543 with one another via a shuffle network 2480 to facilitate all L nodes receiving all of the right input rows 2544. Each right input row 2544 is otherwise received and processed by every parallelized process 2550.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2550, and instead processing all left input rows of the right outer join by all parallelized processes 2550.

The left input row set that is segregated across all parallelized processes 2550 vs. the right input row set processed via every parallelized processes 2550 can be selected, for example, based on an optimization process performed when generating the query operator execution flow 2517. For example, for a join specified as being performed upon two sets of input rows, while the input row set segregated amongst different parallelized processes 2550 and the input row set processed via every parallelized processes 2550 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the "left" input row set 2541 that is segregated across all parallelized processes 2550 is selected to instead correspond to the right hand side designated by the query expression, and the "right" input row set 2543 that is segregated across all parallelized processes 2550 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

FIG. 25C illustrates an embodiment of a query execution module 2504 executing a join operator 2535. The embodiment of implementing the join operator 2535 of FIG. 25C can be utilized to implement the join process 2530 of FIG. 25A and/or can be utilized to implement the join operator 2535 executed via each of a set of parallelized processes 2550 of FIG. 25B.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2536. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.*i*, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544.*k*, the right output value 2563 is retrieved and/or otherwise determined based on the hash map 2555, and the respective output row 2546 is generated to include the a new row generated to include both the one or more left output values 2561.*i* of the left input row 2542.*i*, as well as the right output values 2563.*k* of the identified matching right input row 2544.*k*.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values.

In some embodiments, any performance of join operations and/or execution/optimization of query operator execution flows that include join operators described herein can be implemented via some or all features and/or functionality of performing join operations and/or implementing join operators as disclosed by: U.S. Utility application Ser. No. 18/321,906, entitled "PROCESSING LEFT JOIN OPERATIONS VIA A DATABASE SYSTEM BASED ON FORWARDING INPUT", filed May 23, 2023; U.S. Utility application Ser. No. 18/494,230, entitled "GENERATING EXECUTION TRACKING ROWS DURING QUERY EXECUTION VIA A DATABASE SYSTEM", filed Oct. 25, 2023; and/or U.S. Utility application Ser. No. 18/326,305, entitled "HANDLING NULL VALUES IN PROCESSING JOIN OPERATIONS DURING QUERY EXECUTION", filed May 31, 2023, which are all hereby incorporated herein by reference in its entirety and made part of the present U.S. Utility Patent Application for all purposes.

FIGS. 26A-26D illustrate embodiments where a query expression that includes a disjunction of query predicates is executed via a non-normalized block pushed to the IO operator for execution. The embodiments illustrated in 26A-26D can be utilized to implement one or more nodes 37 of one or more computing devices 18 implementing database system 10. Some or all features and/or functionality of FIGS. 26A-26D can be utilized to implement any embodiment of database system 10 described herein.

Figure 26A:
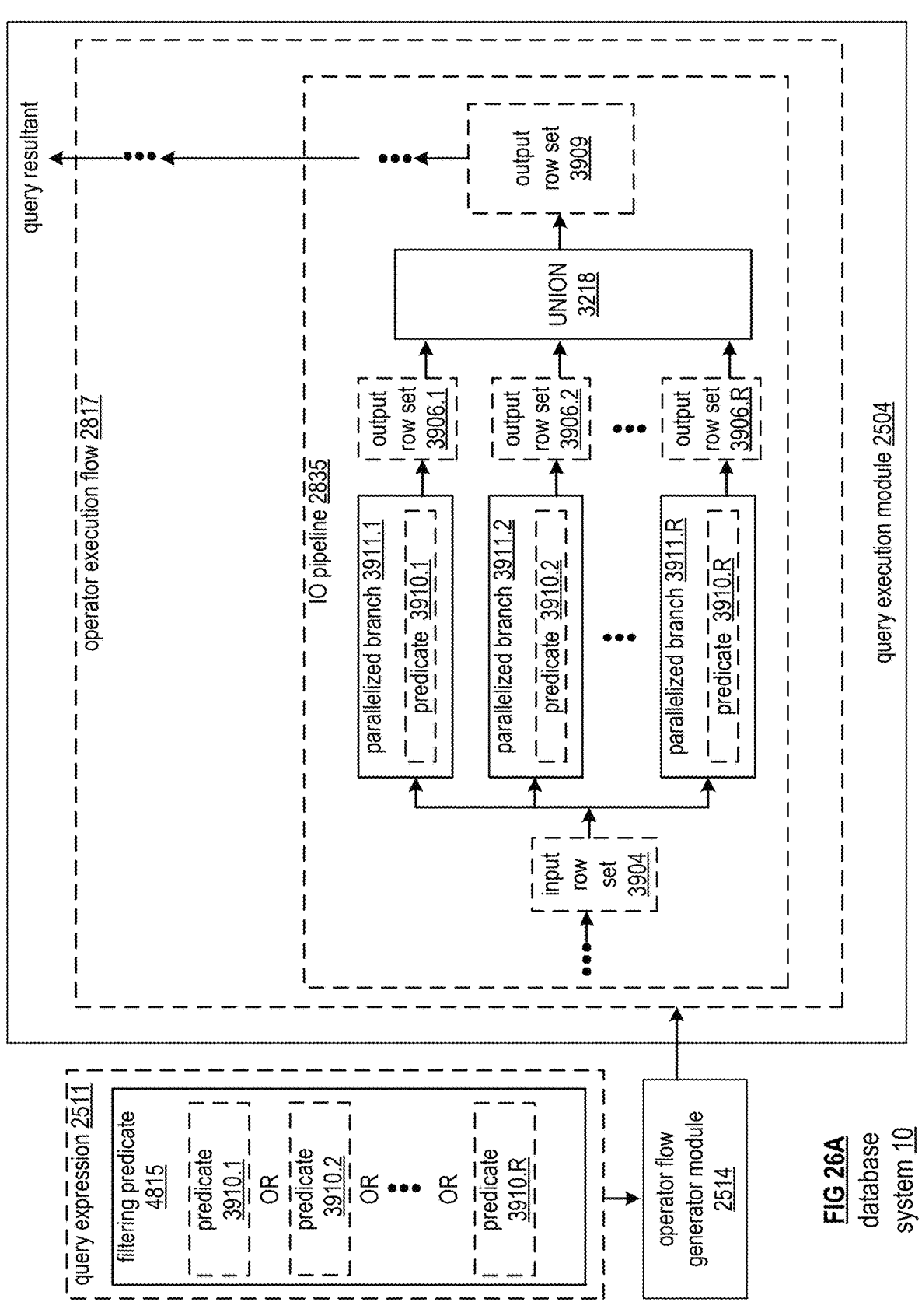
FIGS. 26A-26D illustrate embodiments of an IO pipeline executed via a query execution module in accordance with various embodiments.

FIG. 26A illustrates an embodiment of database system 10 where an operator flow generator module 2517 generates an operator execution flow 2817 that includes an IO pipeline implementing a disjunction of a plurality of query predicates 3910.1-3910.R indicated in a query expression 2511 (e.g. received in a query request or derived from another expression indicated in a query request). The predicates 3910 are optionally in conjunctive normal form (CNF), where these CNF predicates are disjuncted in filtering predicate 4815 (e.g. denoted by one or more WHERE clauses) and thus render filtering predicate 4815 in a non-normalized form (NNF), for example, that is in neither conjunctive normal form or disjunctive normal form.

This NNF predicate 4815 can be evaluated at the IO level of a query execution plan in a corresponding IO pipeline 2835 that processes an input row set 3905 via a plurality of parallelized branches 3911.1-3911.R to render generation of a plurality of output row sets 3906.1-3906.R, where each parallelized branch 3911 implements a corresponding predicate 3910. A union operation 3218 can be performed to implement the disjunction and emit output row set 3909 to include all rows of input row set 3904 included in any of the set of output row sets 3906.1-3906.R, where this output row set is materialized and/or further processed in generating a query resultant (e.g. via further processing at one or more inner levels and/or a root level of a query execution plan).

In some embodiments, some or all features and/or functionality of the operator execution flow 2817, IO pipeline 2835, query expression 2511, operator flow generator module 2514, and/or query execution module 2504 of FIG. 26A can implement any features and/or functionality of operator execution flow 2817, IO pipeline 2835, query expression 2511, operator flow generator module 2514, query execution module 2504, and/or other functionality disclosed by U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES", filed Oct. 12, 2023, which is hereby incorporated herein by reference in its entirety and made part of the present U.S. Utility Patent Application for all purposes. As a particular example, some or all features and/or functionality of FIG. 26A are implemented via same or similar features and/or functionality of FIGS. 38A-38S of U.S. Utility application Ser. No. 18/485,861.

In some embodiments, further structuring of IO pipeline 2835 is required to ensure that no duplicated rows appear in the output row set 3909. For example, if no additional measures are applied, rows of input row set 3904 meeting multiple predicates 3910 are thus included in multiple output row sets 3906, which would render an incorrect query result. Meanwhile, simply applying a union distinct operator could also yield incorrect results, for example, if multiple rows of input row set 3904 have a same set of values that should all be included in the output row set 3909, a union distinct would only emit one of these rows.

Figure 26B:
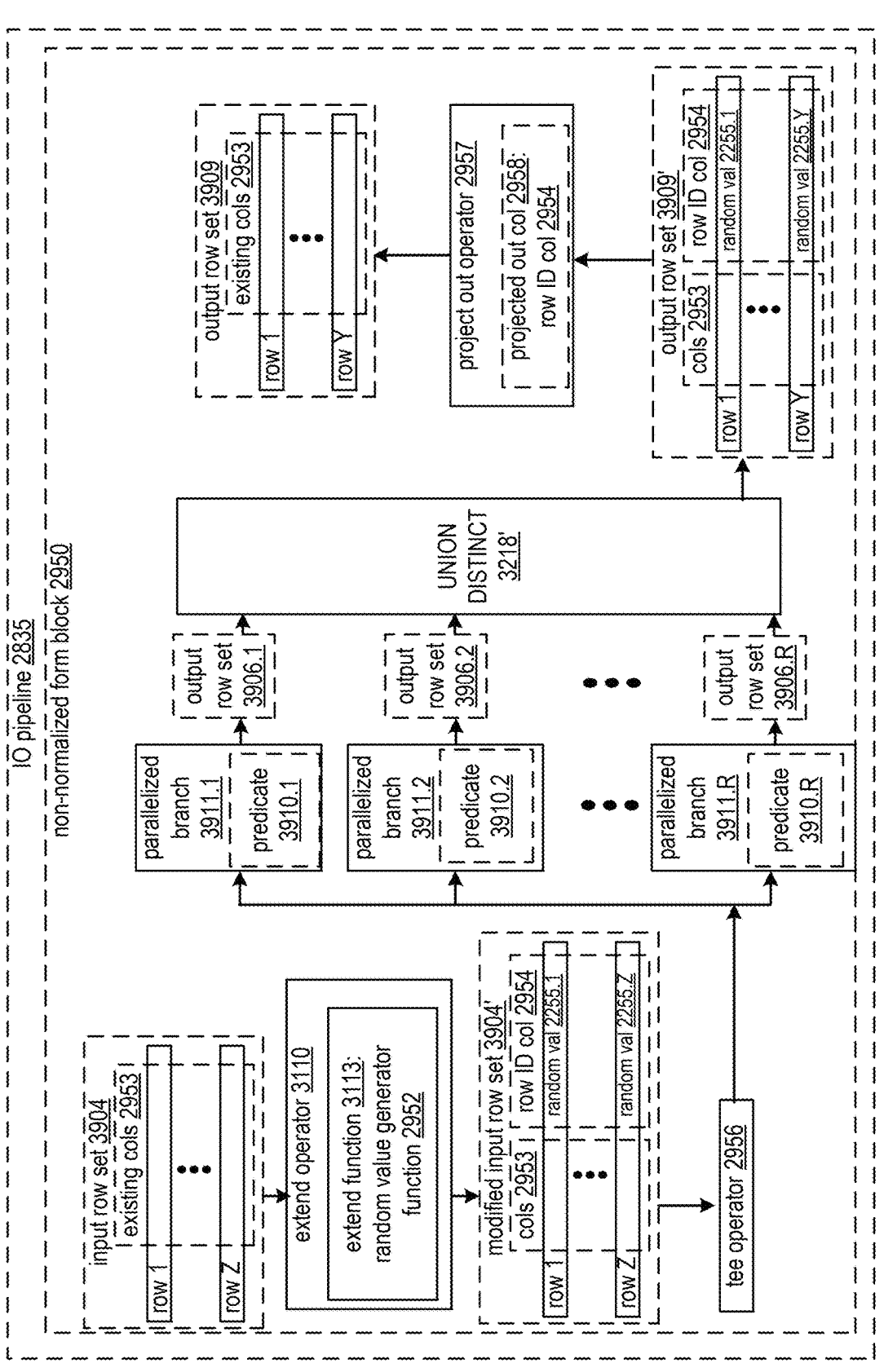

FIG. 26B illustrates an embodiment of a non-normalized form (NNF) block 2950 included in IO pipeline 2835 that ensures correct query results in these cases based on appending a row identifier column 2954 to input row set 3904 (e.g. a new column added in addition to one or more existing columns 2953) prior to processing via the plurality of parallelized branches, enabling different rows to be distinguishable by corresponding identifiers, implemented as a corresponding random value 2255 assigned to each of a set of Z rows of the input row set based on implementing an extent operator 2951 that implements/accesses a random value generator function 2952 as its respective extend function 3113 to assign a random value 2255 to each row of input row set 3904 to this new row identifier column 2954 (e.g. extend rand_bytes(16) as "rowid", where 16 random bytes are generated for each row and/or another configured number of bytes/bits is generated for each row). A tee operator 2954 can be implemented to send/assign input row set 3904 for processing via each parallelized branch to render generation of a set of output row sets 3906.1-3906.R. A union distinct operator 3218' can be implemented to emit output row set 3909' that includes Y rows (e.g. Y is less than Z based on one or more of the Z rows being filtered out due to meeting none of the predicates 3910; and/or Y is equal to Z in the case where all rows meet at least one predicate 3910). Any duplicated instances of rows appearing in multiple output row sets 3906 due to meeting multiple corresponding predicates are removed by the union distinct operator 3218 due to having the same random value 2255 assigned prior to the tee operation 2956, while any rows of input row set having identical values of the existing column(s) 2953 at meeting at least one predicate 3910 all persist in output row set 3909' due to having different random values 2255 assigned. A project out operator 2957 can project out (e.g. remove) the row ID column 2954 (e.g. based on being designated as a projected out column 2958 of the project out operator 2957) to render output row ser 3909 having all Y identified rows with the row identifier column 2954 removed. Thus, the NNF block 2950 is configured to render the desired functionality in applying the disjunction of predicates (e.g. disjunction of CNF predicates) by being guaranteed to produce the correct output.

In some embodiments, some or all features and/or functionality of FIG. 26B can be implemented via any embodiment of appending of row identifiers to input rows, applying a tee operator and processing the input rows via multiple parallelized branches, applying a union distinct to remove duplicate row instances that have the same row identifiers, and/or removing the appended identifiers as disclosed by: U.S. Utility application Ser. No. 16/720,481, entitled "SELECTING A NORMALIZED FORM FOR CONVERSION OF A QUERY EXPRESSION", filed Dec. 19, 2019, which is hereby incorporated herein by reference in its entirety and made part of the present U.S. Utility Patent Application for all purposes; and/or U.S. Utility application Ser. No. 17/448,242, entitled "IMPLEMENTING SUPER-SET-GUARANTEEING EXPRESSIONS IN QUERY EXECUTION", filed Sep. 21, 2021, which is hereby incorporated herein by reference in its entirety and made part of the present U.S. Utility Patent Application for all purposes.

As a particular example, the random values 2255 of row ID column 2954 can implement the appended row identifiers discloses by U.S. Utility application Ser. No. 16/720,481 and/or U.S. Utility application Ser. No. 17/448,242. However, rather than generating appended row identifiers as deterministic values (e.g. incrementing as each row as processed and/or generated as a deterministic hash value of value(s) of the row, such as values of its existing columns 2953), FIG. 26B presents an embodiment where extend operator 2951 is implemented to generate row ID column 2954 as a column of random values 2255 generated via random value generator 2952. Such functionality can be preferred over appending deterministic row identifiers, for example, particularly in the case where deterministic row identifiers are appended via applying a window function.

For example, in some embodiments of database system 10, some of all window function cannot be pushed to the IO level for execution in an IO pipeline, while the extend operation can be pushed to the IO level for execution in an IO pipeline, for example, based on meeting push down conditions. For example, extend operators 2951 can be implemented in an IO portion of a corresponding query operator execution flow 2815 based on database system 10 implementing some or all features and/or functionality of determining whether to push operators (such as extend operators 3110) to the IO level (e.g. as extend elements 3140 implementing a corresponding extend function 3113) and/or implementing such pushed down operators (such as extend operators) via the IO level accordingly as disclosed by: U.S. Utility application Ser. No. 18/310,177, entitled "OPTIMIZING AN OPERATOR FLOW FOR PERFORMING AGGREGATION VIA A DATABASE SYSTEM", filed May 1, 2023, which is hereby incorporated herein by reference in its entirety and made part of the present U.S. Utility Patent Application for all purposes; and/or U.S. Utility application Ser. No. 18/309,897, entitled "OPTIMIZING AN OPERATOR FLOW FOR PERFORMING FILTERING BASED ON NEW COLUMNS VALUES VIA A DATABASE SYSTEM", filed May 1, 2023, which is hereby incorporated herein by reference in its entirety and made part of the present U.S. Utility Patent Application for all purposes.

Thus, implementing an extend operator that generates random values as row identifiers for the purpose of deduplicating rows after being processed in multiple parallelized paths of an NNF block can improve query efficiency over implementing a window function that generates deterministic values as these row identifiers for this purpose due to the use of the extend operation enabling pushing down of these operations to the leaf level, rendering greater decentralized query processing and improving query efficiency over using the window function that cannot be pushed to the IO level for this purpose (e.g. due to the fan in window not being configured for execution at the leaf level, thus rendering serialized and/or slow execution of the window function vs. the parallelized and/or fast execution of the extend function).

The random number generator function can optionally be configured to guarantee that collisions (e.g. two different rows being inadvertently assigned the same random value) do not occur, for example, up to a configured probability.

This can dictate the size of the random value (e.g. the random value is configured to be generated as a 128 bit value for each row, minimizing such collisions and/or making collisions near impossible). The size of the random value can optionally be configured as a function of the number of input rows (e.g. the size is larger when more input rows are present).

Figure 26C:
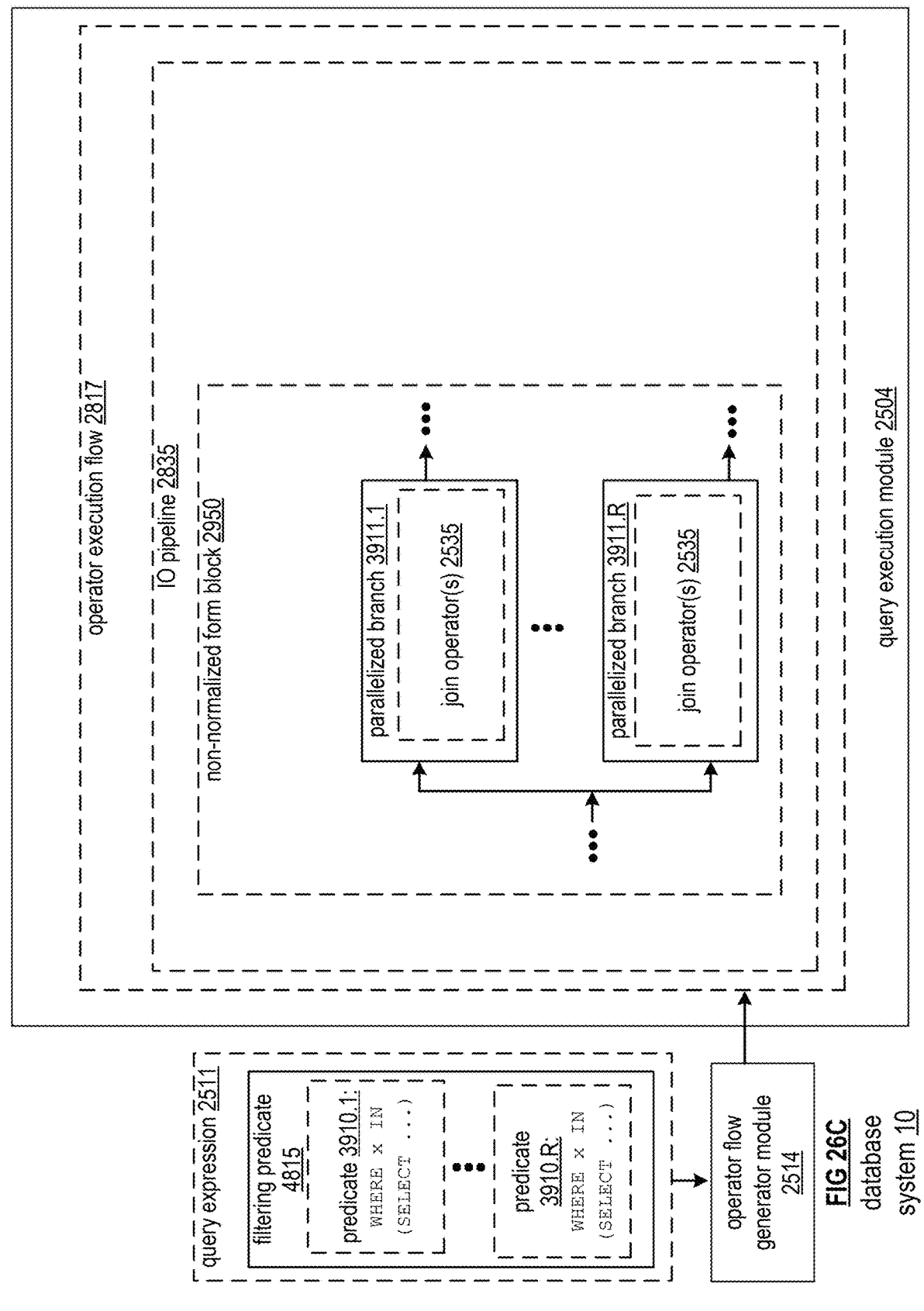

FIG. 26C illustrates an embodiment of an NNF block 2950 of IO pipeline 2835 where some or all parallelized branches 3911.1-3911.R implement one or more join operators 2535, such as one or more semi join operators, to implement the respective predicate 3910.

For example, a given predicate 3910 is expressed as WHERE×IN (SELECT . . . ), for example, where 'x' denotes a particular column(s) of input row set that must have values included in the argument of the IN function, which can be specified as the output of the SELECT function. As a particular example, the query expression 2511 indicates the disjunction of predicates as predicate 4815 indicating a statement and/or corresponding logic of: "WHERE x1 IN (SELECT . . . ) OR WHERE x2 IN (SELECT . . . )". Different predicates 3910 can have different columns/parameters for 'x' and/or different values specified as arguments of the IN function (e.g. based on having different SELECT arguments rendering identification of different sets of rows/corresponding values). Such predicates can be implemented via performance of a semi join operation implemented via one or more join operators 2535 (e.g. semi join x on (output of SELECT statement)).

Figure 26D:
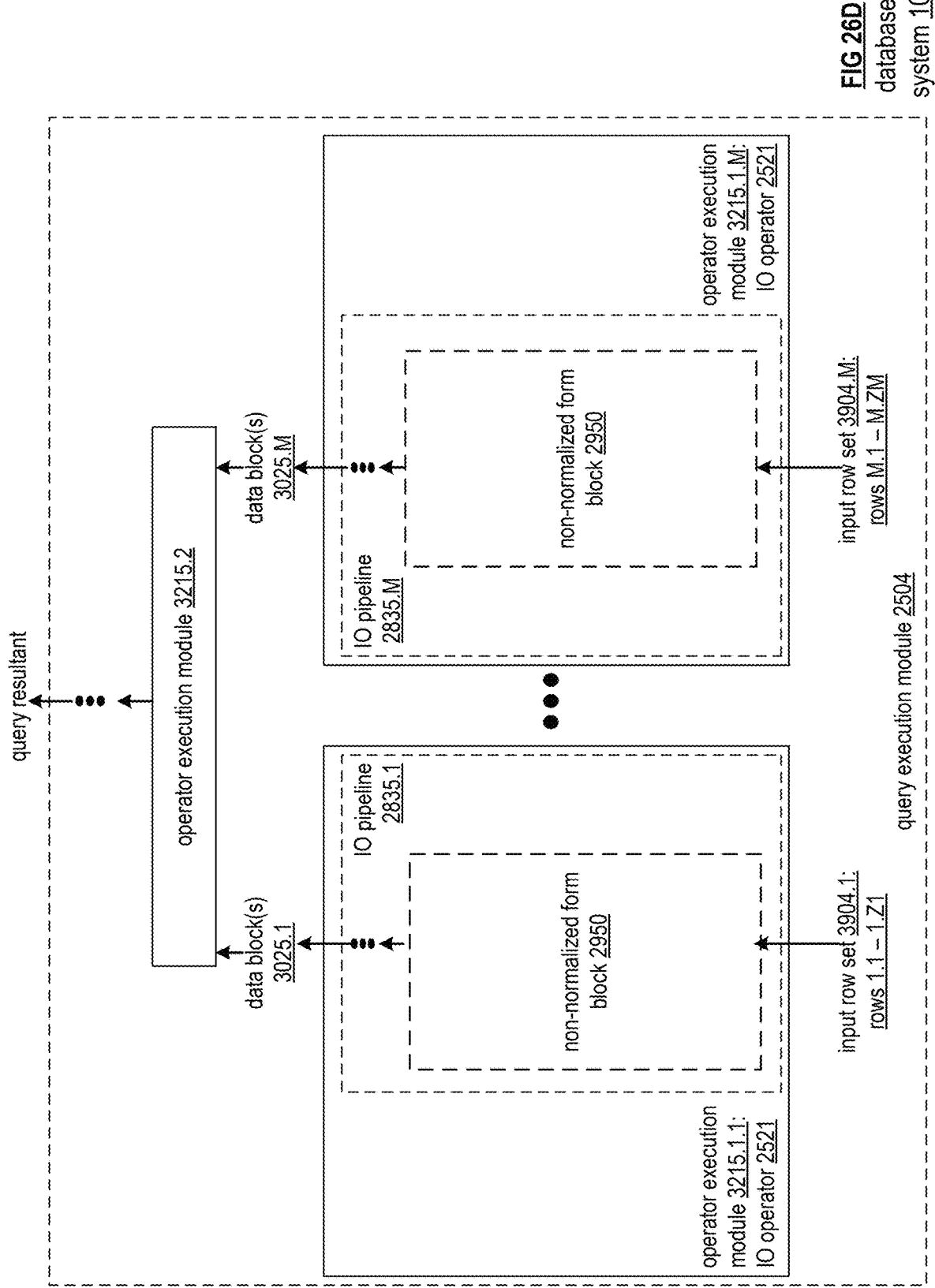

FIG. 26D illustrates an embodiment of a query execution module 2504 applying a plurality of operator execution module 3215.1-3215.M to implement a plurality of parallelized instances of IO operator 2521 upon different input row sets 3904 to generate corresponding output data blocks, which can all be processed via another operator execution module 3215 (e.g. at an upper level of query execution plan), where the query resultant is ultimately generated based on processing all data blocks 3035.1-3035.M. Thus, the NNF block 2950 of IO pipeline 2835 can be applied in parallel in executing the plurality of parallelized instances of IO operator 2521. The plurality of parallelized instances of IO operator 2521 can be implemented via a plurality of different nodes 37 (e.g. participating at the IO level of a query execution plan) and/or a plurality of processing core resources 48.

The IO pipeline and/or corresponding non-normalized form block 2950 can optionally be implemented for accessing different segments, for example, to account for differences in their secondary indexing (e.g. one or more parallelized branches and/or other portions of an IO pipeline for one segment identify rows via accessing an index structure, while the one or more parallelized branches and/or other portions of an IO pipeline for another segment identify rows via accessing the rows directly, for example, based on a corresponding column being indexed for the one segment and not the other segment).

Figure 26E:
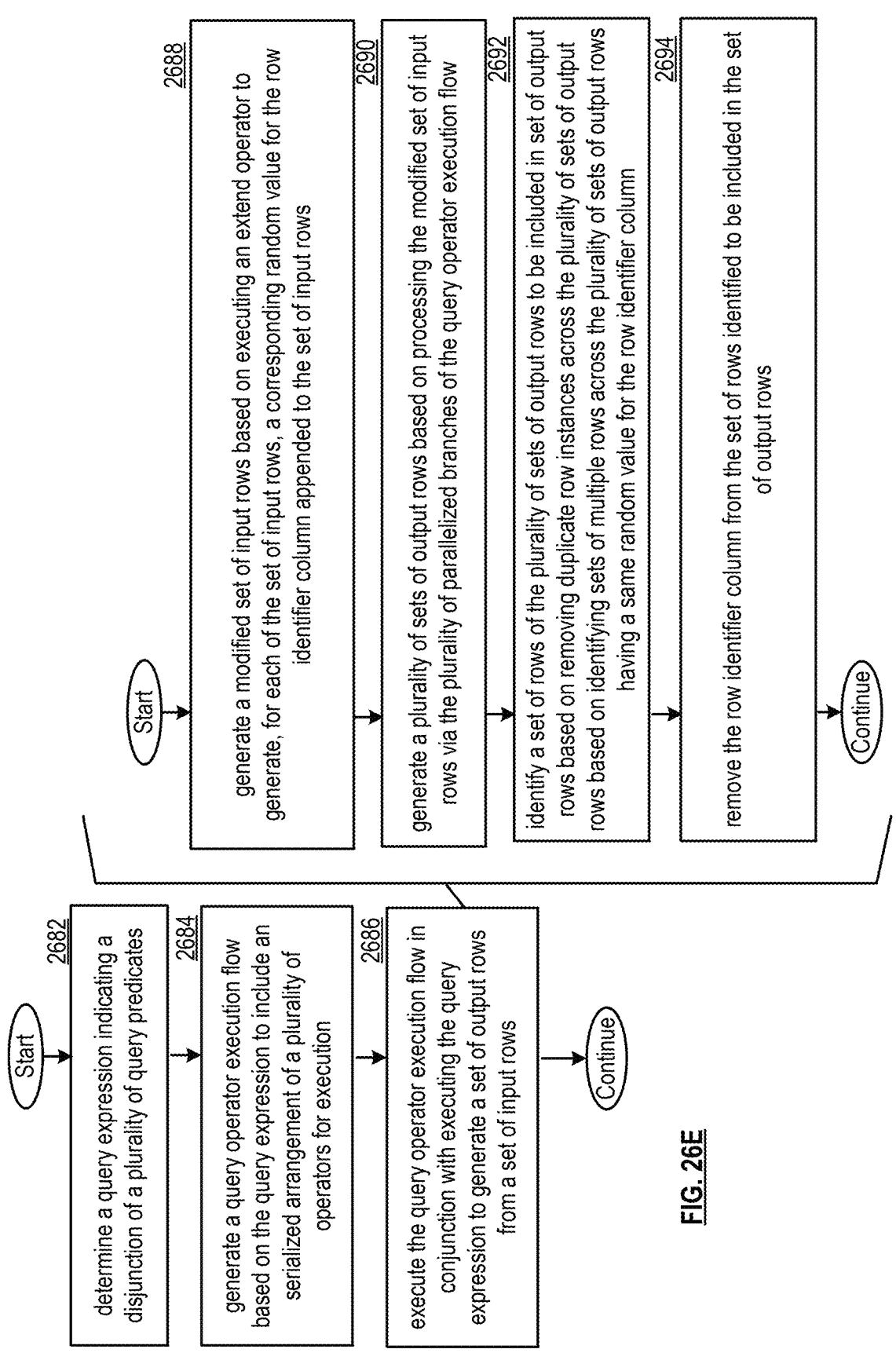
FIG. 26E is a logic diagram illustrating a method for execution in accordance with various embodiments.

FIG. 26E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26E, for example, based on participating in execution of a query being executed by the database system 10. Some or all of the method of FIG. 26E can be performed by nodes executing a query in conjunction with a query execution, for example, via one or more nodes 37 implemented as nodes of a query execution module 2504 implementing a query execution plan 2405. Some or all of the steps of FIG. 26E can optionally be performed by any other one or more processing modules of the database system 10.

Some or all steps of FIG. 26E can be performed in parallel and/or concurrently via a plurality of parallelized processing resources (e.g. implemented via a plurality of nodes 37 and/or a plurality of processing core resources 48). For example, multiple instances of any given step of FIG. 26E can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 26E can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 26E can be performed to implement some or all of the functionality of the database system 10 as described in conjunction with FIGS. 26A-26D, for example, by implementing some or all of the functionality of query execution module 2504 and/or operator flow generator module 2514. For example, some or all of the steps of FIG. 26E are based on executing a non-normalized form block 2950, for example, via execution a corresponding IO pipeline and/or multiple IO pipelines in parallel. Some or all steps of FIG. 26E can be performed by database system 10 in accordance with other embodiments of the database system 10 and/or nodes 37 discussed herein. Some or all of the steps of FIG. 26E can be performed in conjunction with performing some or all steps of any other method described herein.

Step 2682 includes determining a query expression indicating a disjunction of a plurality of query predicates. Step 2684 includes generating a query operator execution flow based on the query expression to include a serialized arrangement of a plurality of operators for execution. In various examples, the serialized arrangement of the plurality of operators includes, based on the query expression indicating the disjunction of the plurality of query predicates: an extend operator operable to generate a row identifier column of random values; a plurality of parallelized branches serially after the extend operator, where each parallelized branch of the plurality of parallelized branches has a corresponding flow of operators of the plurality of operators configured to apply a corresponding one of the plurality of query predicates; and/or a plurality of additional operators serially after the plurality of parallelized branches Step 2686 includes executing the query operator execution flow in conjunction with executing the query expression to generate a set of output rows from a set of input rows.

In various examples, performing step 2686 includes performing step 2688, step 2690, step 2692, and/or step 2694. Step 2688 includes generating a modified set of input rows based on executing the extend operator to generate, for each of the set of input rows, a corresponding random value for the row identifier column appended to the set of input rows. Step 2690 includes generating a plurality of sets of output rows based on processing the modified set of input rows via the plurality of parallelized branches of the query operator execution flow. In various examples, the each parallelized branch of the plurality of parallelized branches generates a corresponding set of output rows of the plurality of sets of output rows via execution corresponding flow of operators upon the modified set of input rows. Step 2692 includes identifying a set of rows of the plurality of sets of output rows to be included in set of output rows based on removing duplicate row instances across the plurality of sets of output rows based on identifying sets of multiple rows across the plurality of sets of output rows having a same random value for the row identifier column. Step 2694 includes removing the row identifier column from the set of rows identified to be included in the set of output rows.

In various examples, a query resultant for the query expression is generated based on the set of output rows.

In various examples, the query operator execution flow includes an IO portion that includes a first set of operators of the plurality of operators serially before all other operators of the plurality of operators. In various examples, the IO portion is configured to apply the disjunction of the plurality of query predicates based on including the extend operator and the plurality of parallelized branches.

In various examples, the query operator execution flow is executed via a plurality of nodes of a hierarchical query execution plan. In various examples, the IO portion of the query operator execution flow is executed in parallel via a set of nodes of the plurality of nodes assigned to process the query at bottom-most level of the hierarchical query execution plan based on each node in the set of nodes executing the IO portion of the query operator execution flow upon corresponding subset of the set of input rows based on the corresponding subset of the set of input rows being accessible to the each node for processing in query execution. In various examples, the query resultant is generated via a root node of the plurality of nodes based on executing a final portion of the query operator execution flow serially after the IO portion of the query operator execution flow.

In various examples, the corresponding subset of the set of input rows is accessible to the each node for processing in query execution based on being stored in drive memory resources of the each node and/or based on having an index structure stored in drive memory resources of the each node.

In various examples, generating the query operator execution flow includes performing an optimizing step to push all of the disjunction of the plurality of query predicates for execution in the IO portion of the query operator execution flow based on the extend operator meeting push-down conditions for operators executable via the IO portion of the query operator execution flow.

In various examples, at least one join operator in included in the plurality of parallelized branches, and wherein pushing all of the disjunction of the plurality of query predicates for execution in the IO portion of the query operator execution flow includes further pushing the at least one join operator for execution in the IO portion of the query operator execution flow.

In various examples, performing the optimization step includes pushing the extend operator and the plurality of parallelized branches for execution serially before at least one other operator of the query operator execution flow not included in the IO portion of the query operator execution flow.

In various examples, the query expression indicates the set of input rows as rows belonging to an identified relational database table. In various examples, the set of output rows is identified as a filtered subset of the rows belonging to the identified relational database table based on meeting the disjunction of the plurality of query predicates.

In various examples, the each parallelized branch is operable to filter the set of input rows based on being executed upon the modified set of input rows. In various examples, the corresponding set of output rows generated via the each parallelized branch is identified to include only rows of the set of input rows satisfying the corresponding one of the plurality of query predicates.

In various examples, the query operator execution flow is generated to apply the disjunction of the plurality of query predicates in accordance with non-normalized form. In various examples, the extend operator, the plurality of parallelized branches serially after the extend operator, and/or at least some of the plurality of additional operators serially after the plurality of parallelized branches are all included in a non-normalized form block of the query operator execution flow configured to implement the disjunction of the plurality of query predicates.

In various examples, the plurality of additional operators includes a tee operator, and wherein processing the modified set of input rows via the plurality of parallelized branches of the query operator execution flow is based on executing the tee operator to assign the set of input rows for separate processing via the each parallelized branch of the plurality of parallelized branches.

In various examples, the plurality of additional operators includes a union distinct operator. In various examples, removing the duplicate row instances across the plurality of sets of output rows is based on executing the union distinct operator.

In various examples, the plurality of additional operators includes a project out operator applied to the row identifier column. In various examples, removing the row identifier column from the set of rows identified to be included in the set of output rows is based on executing the project out operator.

In various examples, at least one join operator is included in at least one of the plurality of parallelized branches. In various examples, generating the plurality of sets of output rows includes executing the at least one join operator.

In various examples, the at least one join operator includes a plurality of semi join operators, a first one of the plurality of parallelized branches indicates a first semi join operator configured to apply a first corresponding one of the plurality of query predicates based on executing the first semi join upon the modified set of input rows. In various examples, a second one of the plurality of parallelized branches indicates a second semi join operator configured to apply a second corresponding one of the plurality of query predicates based on executing the second semi join upon the modified set of input rows.

In various examples, the set of rows includes at least a first column and a second column. In various examples, the first semi join is performed to identify ones of the modified set of input rows having values of the first column matching any of a first set of values. In various examples, the second semi join is performed to identify ones of the modified set of input rows having values of the second column matching any of a second set of values. In various examples, the first set of values correspond to values of a first corresponding column of a first set of rows indicated in a first SELECT statement of a first query predicate of the disjunction of the plurality of query predicates, where the first set of rows are overlapping with or distinct from the set of input rows. In various examples, the second set of values correspond to values of a second corresponding column of a second set of rows indicated in a second SELECT statement of a second query predicate of the disjunction of the plurality of query predicates, where the second set of rows are overlapping with or distinct from the set of input rows and/or the first set of rows, and/or where the second corresponding column is different from the first corresponding column.

In various examples, the first set of values are specified via a first IN operator of a first WHERE clause of the query expression. In various examples, the second set of values are specified via a second IN operator of a second WHERE clause of the query expression.

In various examples, the corresponding random value for the row identifier column is generated as a random 128 bit value.

In various examples, the corresponding random value is randomly selected from a predetermined set of possible values. In various examples, a number of possible values included in the predetermined set of possible values is configured based on a probability of two different ones of the set of input rows being assigned a same one of the set of possible values being lower than a predetermined threshold.

In various embodiments, any one of more of the various examples listed above are implemented in conjunction with performing some or all steps of FIG. 26E. In various embodiments, any set of the various examples listed above can be implemented in tandem, for example, in conjunction with performing some or all steps of FIG. 26E, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26E, for example, in conjunction with further implementing any one or more of the various examples described above.

In various embodiments, the operational instructions, when executed by the at least one processor, cause the database system to: determine a query expression indicating a disjunction of a plurality of query predicates; generate a query operator execution flow based on the query expression to include a serialized arrangement of a plurality of operators for execution. In various embodiments, the serialized arrangement of the plurality of operators for execution includes, based on the query expression indicating the disjunction of the plurality of query predicates: an extend operator operable to generate a row identifier column of random values; a plurality of parallelized branches serially after the extend operator, wherein each parallelized branch of the plurality of parallelized branches has a corresponding flow of operators of the plurality of operators configured to apply a corresponding one of the plurality of query predicates; and/or a plurality of additional operators serially after the plurality of parallelized branches. In various embodiments, the operational instructions, when executed by the at least one processor, further cause the database system to execute the query operator execution flow in conjunction with executing the query expression to generate a set of output rows from a set of input rows based on: generating a modified set of input rows based on executing the extend operator to generate, for each of the set of input rows, a corresponding random value for the row identifier column appended to the set of input rows; generating a plurality of sets of output rows based on processing the modified set of input rows via the plurality of parallelized branches of the query operator execution flow, wherein the each parallelized branch of the plurality of parallelized branches generates a corresponding set of output rows of the plurality of sets of output rows via execution corresponding flow of operators upon the modified set of input rows; identifying a set of rows of the plurality of sets of output rows to be included in set of output rows based on removing duplicate row instances across the plurality of sets of output rows based on identifying sets of multiple rows across the plurality of sets of output rows having a same random value for the row identifier column; and/or removing the row identifier column from the set of rows identified to be included in the set of output rows. In various embodiments, a query resultant for the query expression is generated based on the set of output rows.

Figure 27A:
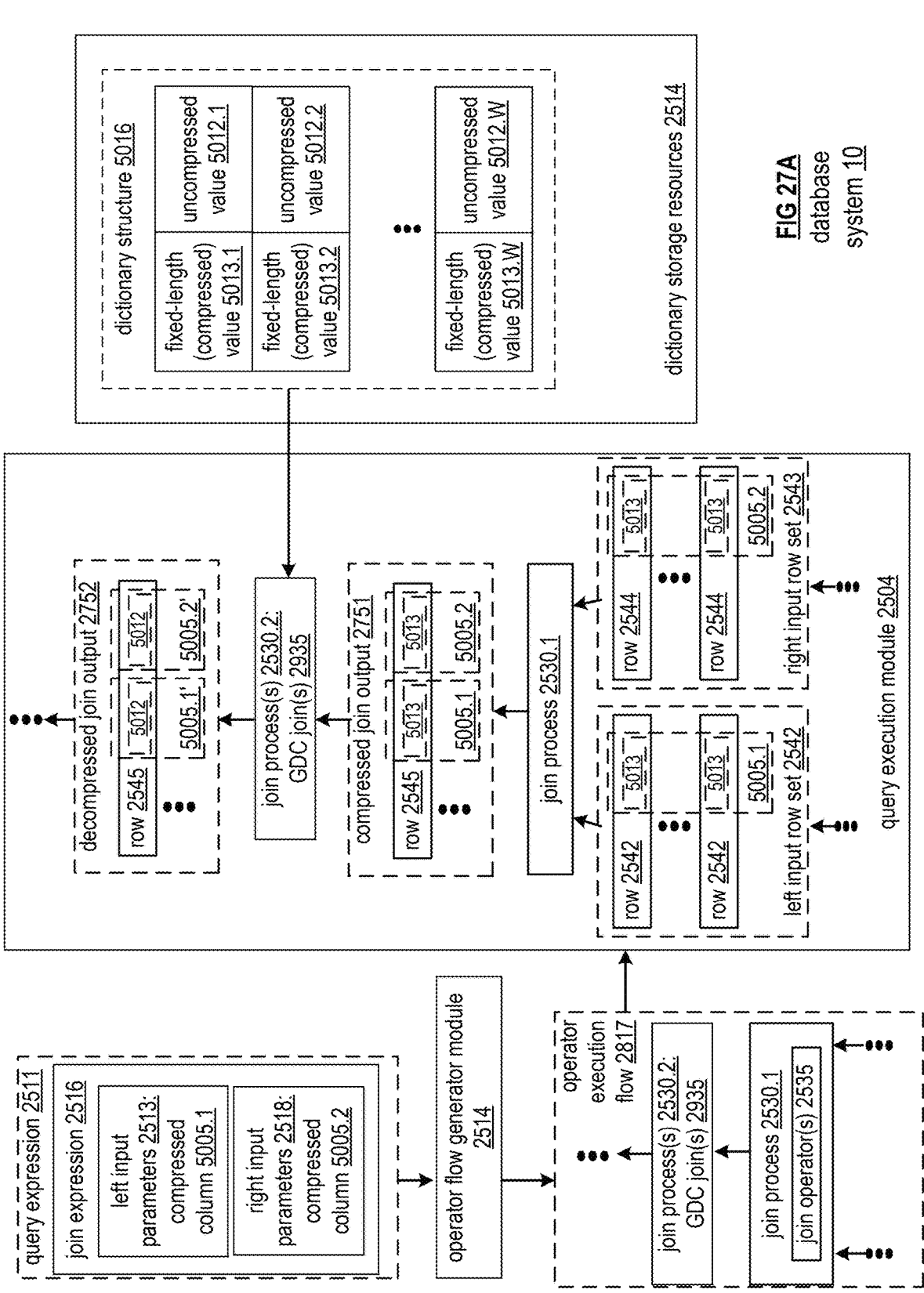
FIGS. 27A-27C illustrate embodiments of a query operator execution flow executed via a query execution module that implements execution of a first join process prior to execution of at least one GDC join in accordance with various embodiments.
Figure 27B:
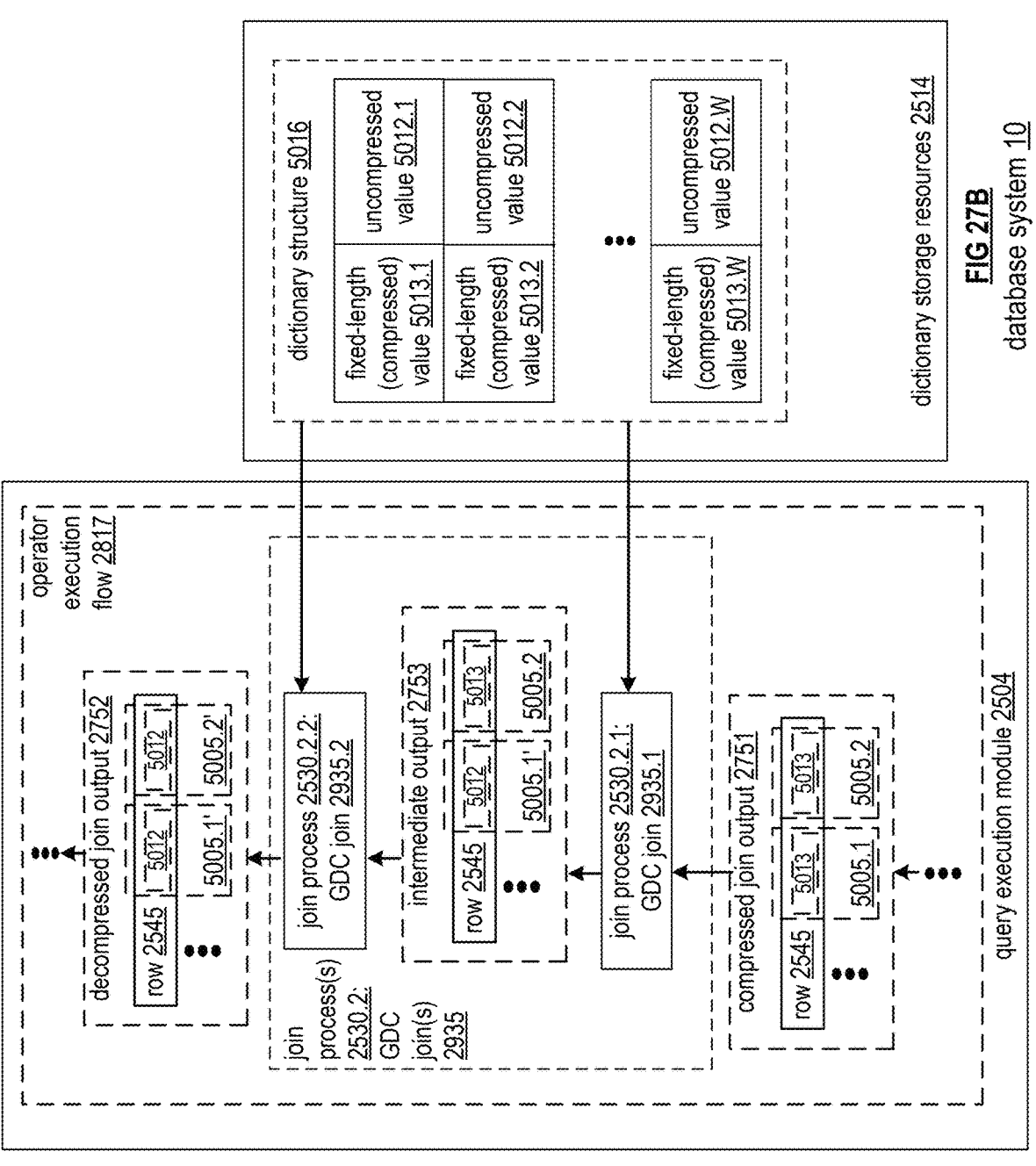
Figure 27C:
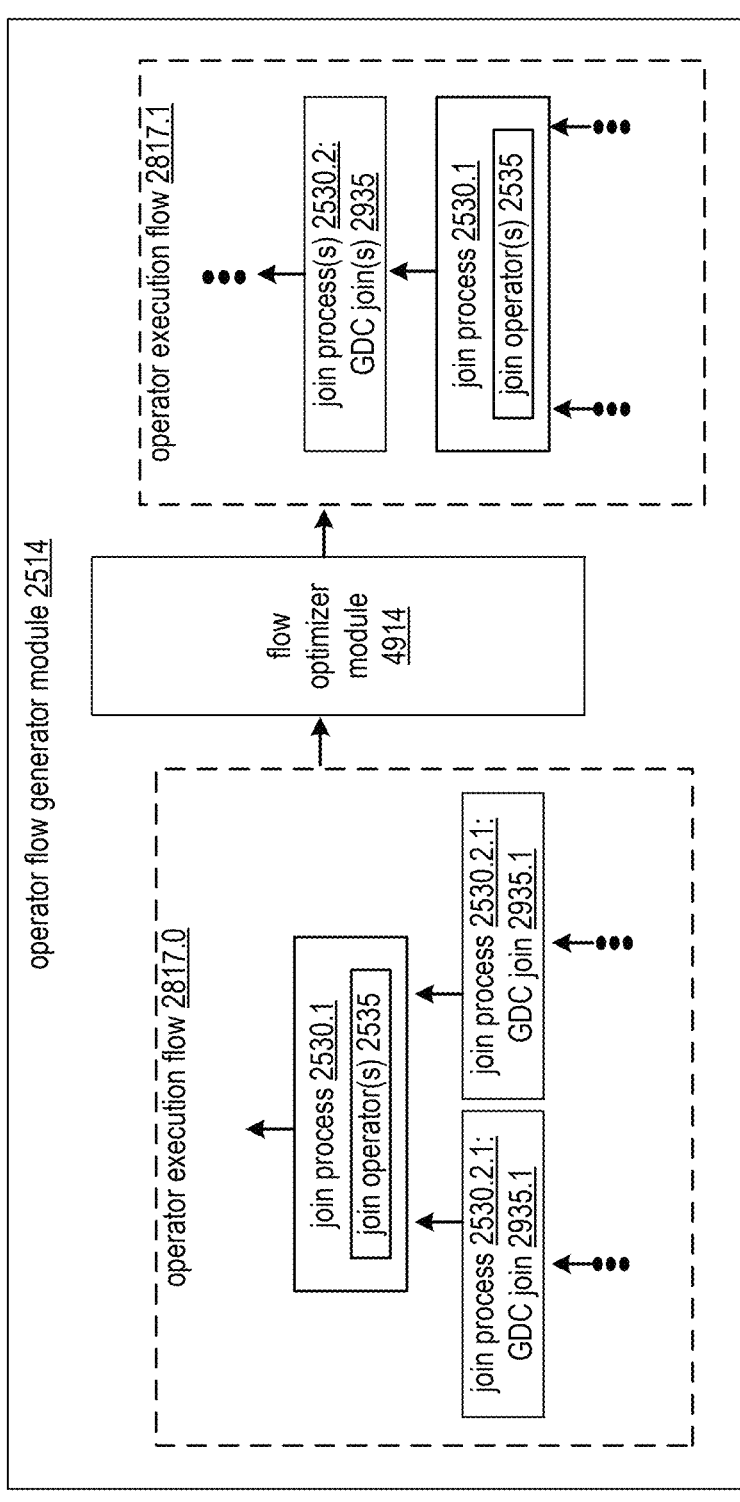

FIGS. 27A-27C illustrate embodiments where a query expression that indicates execution of a join operation on compressed columns is executed via performing a join operation on the compressed columns to generate compressed join output and then performing at least one decompression facilitating join operation (e.g. at least one GDC join operation) upon the compressed join output to generate decompressed join output. The embodiments illustrated in 27A-27C can be utilized to implement one or more nodes 37 of one or more computing devices 18 implementing database system 10. Some or all features and/or functionality of FIGS. 27A-27C can be utilized to implement any embodiment of database system 10 described herein.

In some embodiments of executing join operations, for example, upon compressed columns, the respective join can be pushed below GDC joins when the parent join references the decompressed column(s) (e.g. the compressed columns after decompression is performed).

Consider an example where database system stores two tables t1 and t2 (e.g. GDC tables with some or all columns compressed via global dictionary compression via some or all features and/or functionality of global dictionary compression described herein), table t1 stores a first corresponding GDC column 5005.1 and table t2 stores a second corresponding GDC column 5005.2 (e.g. both tables store GDC column 'x', where t1.x corresponds to column 5005.1 and t2.x corresponds to column 5005.2), where these columns 5005.1 and 5005.2 share the same GDC map (e.g. same fixed length values are mapped to same variable length values via a common dictionary structure 5016). In some embodiments, the join is optionally performed upon a same table, where a same or different column of this table are utilized as the multiple input of the join.

In some embodiments of executing a query involving these example columns, if a join operation (e.g. a hash join or any other type of join) is performed (e.g. on 5005.1=5005.2, such as on t1.x=t2.x), this join is performed after the respective columns are decompressed (e.g. first each column is decompressed via a corresponding GDC join to render decompressed versions of column 5005.1 and 5005.2, and the decompressed versions of these columns emitted via the respective GDC joins are processed via a join operation to identify decompressed values of these columns satisfying the join (e.g. decompressed values of 5005.1 equal to decompressed values of 5005.2). An example embodiment of a corresponding query operator execution flow implementing this functionality is illustrated in FIG. 27C as operator execution flow 2817.0.

In some embodiments, in the case where database system 10 established a priori that these columns 5005.1 and 5005.2 share the same GDC map (e.g. in processing the corresponding query expression and/or in optimizing the respective query), the fact that there's a 1-1 correspondence between compressed and decompressed values for both columns due to sharing of the same GDC map can be leveraged. In particular, this relationship means that joining (e.g. hash joining) on the compressed column values corresponds to the same predicate as when performed on the decompressed values, where performing the respective join on the compressed column values before decompression will thus render the equivalent output as performing the respective join on the decompressed column values after decompression.

In some embodiments, database system 10 is operable to execute such query expressions indicating a join on decompressed values of columns compressed via a same GDC mapping via this strategy of performing the join on compressed values prior to decompression. Employing this strategy of decompressing after the underlying join is performed upon the compressed values can improve the technology of database systems based on rendering faster execution of these queries. In particular, any rows that are ultimately thrown out in the hash join are needlessly decompressed under this strategy, where decompression would be performed upon all rows regardless of whether they appear in the join output in the case where decompression is performed prior to the join, rendering faster query execution in the case where the join is performed upon compressed values prior to decompression. Additionally, in some embodiments, hashing and/or otherwise comparing compressed values is significantly faster than hashing and/or otherwise comparing compressed values, further rendering faster query execution in the case where the join is performed upon compressed values prior to decompression.

In some embodiments, the GDC mapping (e.g. implemented via dictionary structure 5016) represents NULL as 0. In some embodiments, hash joins are configured to discard nulls, so guaranteeing equivalent results in the case where the join is performed upon the compressed values (e.g. where these null values are instead expressed as 0) can require filtering out compressed NULLs after the hash join (e.g. via a corresponding filtering operator).

FIG. 27A illustrates an embodiment of executing a query expression 2511 that indicates a join expression 2516 having left input parameters 2513 indicating a first compressed column 5005.1 and having right input parameters 2518 indicating a second compressed column 5005.2 (e.g. the join expression has a matching condition 2519 requiring the decompressed values of these respective columns be equal). Operator flow generator module 2514 can generate a corresponding operator execution flow 2817 indicating a join process 2530.1, for example, implementing a hash join and/or any type of join described herein upon two or more columns under the same GDC mapping (e.g. implemented via one or more join operators via any embodiments of implementing a join process and/or corresponding join operation described herein) be performed serially before one or more additional join processes 2530.2 that implement one or more respective GDC joins 2935 (e.g. implemented via some or all functionality of GDC join 2935 of FIG. 24V and/or implementing any functionality of decompressing a compressed column described herein).

Query execution module 2504 can execute this query operator execution flow 2504 via executing join process 2530.1 upon a left input row set 2542 (e.g. rows of table t1, where compressed values 5013 of column 5005.1 are processed) and a right input row set 2543 (e.g. rows of table t2, where compressed values 5013 of column 5005.2 are processed) to generate compressed join output 2751 (e.g. via performing some or all features and/or functionality of join processes discussed in conjunction with FIGS. 25A-25C and/or otherwise discussed herein). The compressed join output can indicate output rows 2545 joined from left input row set 2542 and right input row set 2543 (e.g. that include and/or were generated based on rows 2542 and 2543 having values 5013 for columns 5005.1 and 5005.2 that are equal, or otherwise meet the matching condition for the respective join process (e.g. as indicated in the query expression). The additional one or more join processes 2530.2 implementing one or more GDC joins 2935 can then be performed to decompress the compressed values 5013 included in the compressed join output 2751 to generate corresponding decompressed join output 2752 indicating the respective decompressed values 5012 (e.g. the variable length values mapped to respective fixed length values in the respective mapping stored in dictionary structure 5016, where join processes 2530 are performed via accessing dictionary structure 5016). Decompressed join output 2752 can thus include the same rows as compressed join output 2751, with decompressed values rather than compressed values. In some embodiments, decompressed join output 2752 includes fewer rows than compressed join output in the case where a filtering operator is applied to compressed join output 2751 to remove any rows containing null values (e.g. containing the respective compressed value for null, such as the integer value 0).

FIG. 27B illustrates an embodiment of performing the one or join processes 2530.2 implementing the decompression. A first join process 2530.2.1 can be performed upon the compressed join output 2751 (e.g. as left input to the join process 2530.2.1) to implement a first GDC join 2935.1 upon the first column 5005.1 to generate intermediate output 2753, where the first column 5005.1 is decompressed as column 5005.1' storing the respective uncompressed values 5012 mapped to the compressed values 5013, identified via access to dictionary structure 5016 (e.g. implemented as a corresponding hash map representing right input to the join process 2530.2.1). A second join process 2530.2.2 can be performed upon this intermediate output 2753 (e.g. as left input to the join process 2530.2.2) to implement a second GDC join 2935.2 upon the second column 5005.2 to generate the decompressed join output 2752, where the second column 5005.2 is similarly decompressed as column 5005.2' storing the respective uncompressed values 5012 mapped to the compressed values 5013, identified via access to dictionary structure 5016 (e.g. implemented as a corresponding hash map representing right input to the join process 2530.2.2).

In some embodiments, one or more rename operators can be included in the query operator execution flow, for example, to rename respective columns (e.g. the decompressed column 5005.1' is named differently from the compressed column 5005.1; the GDC is named differently as input to the different join processes 2530.2.1 and 2530.2.2;

etc.), for example, when an optimizer implemented via database system 10 is not configured to handle duplicate column names. For example, a rename operator is performed to the right and/or left input to some or all join processes 2530.1, 2530.2.1, and/or 2530.2.2 before being processed via the respective join process 2530.1, 2530.2.1, and/or 2530.2.2.

In some embodiments, the multiple join processes 2530 are not performed, for example, in the case where the join is performed under an equality condition for multiple compressed columns 5005.1 and 5005.2, where the set of compressed values 5013 for these columns in a given row 2545 are thus guaranteed to be equal and due to the 1-to-1 mapping, their decompressed values 5012 are also guaranteed to be equal. For example, rather than performing the different GDC joins to decompress each column separately, only one of the columns is decompressed and these respective values are applied to the other column due to being known to hold equivalent values that will thus decompress to the same value.

FIG. 27C illustrates an embodiment where the operator execution flow 2817 indicating performance of an underlying join 2530.1 prior to respective decompression is generated as an updated operator execution flow 2817.1 via implementing a flow optimizer module 4914 to rearrange an initial operator execution flow 2817.0 in conjunction with optimizing the corresponding query for execution. For example, the flow optimizer module 4914 is configured to generate operator execution flow 2817.1 that is guaranteed to render equivalent output as operator execution flow 2817.0 (e.g. due to being logically equivalent and/or semantically equivalent), based on selecting operator execution flow 2817.1 for performance over operator execution flow 2817.0 (e.g. based on determining that operator execution flow 2817.1 will render faster execution than operator execution flow 2817.0; based on determining that determining that operator execution flow 2817.1 will render greater energy efficiency than operator execution flow 2817.0; based on determining that determining that operator execution flow 2817.1 will render consumption of less memory than operator execution flow 2817.0; etc.).

In this case, the flow optimizer module 4914 can be operable to generate the operator execution flow 2817.1 based on pushing the join process 2530.1 (e.g. parent join) of operator execution flow 2817.0 under the join processes 2530.2.1 and 2530.2.2 implementing respective GDC joins 2935.1 and 2935.2, for example, based on determining these GDC joins apply a same GDC mapping due to respective columns applied as input to join process 2530.1 being compressed under the same GDC mapping, thus guaranteeing equivalent results while rendering improved runtime as discussed previously.

Figure 27D:
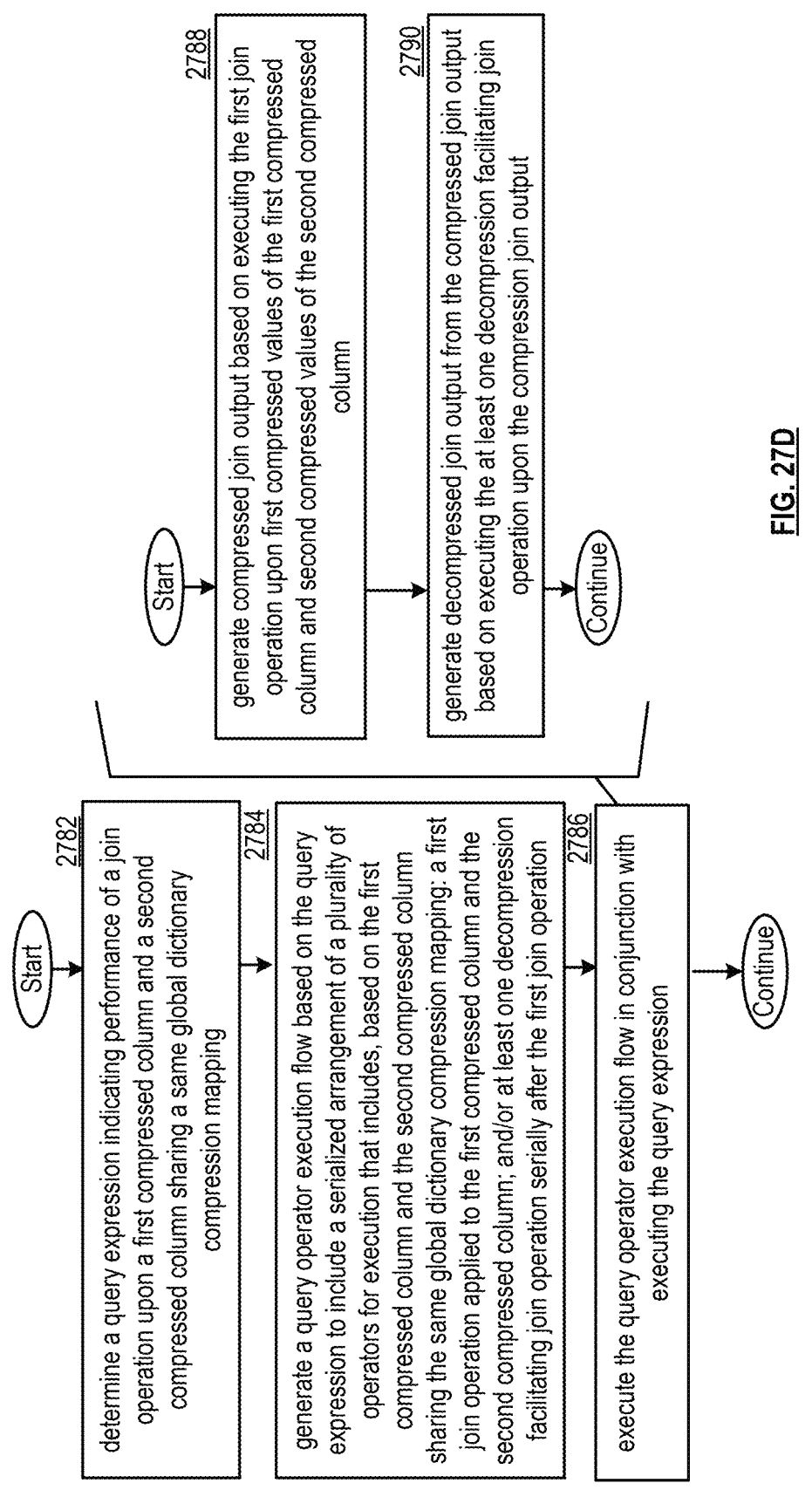
FIG. 27D is a logic diagram illustrating a method for execution in accordance with various embodiments.

FIG. 27D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27D, for example, based on participating in execution of a query being executed by the database system 10. Some or all of the method of FIG. 27D can be performed by nodes executing a query in conjunction with a query execution, for example, via one or more nodes 37 implemented as nodes of a query execution module 2504 implementing a query execution plan 2405. Some or all of the steps of FIG. 27D can optionally be performed by any other one or more processing modules of the database system 10.

Some or all steps of FIG. 27D can be performed in parallel and/or concurrently via a plurality of parallelized processing resources (e.g. implemented via a plurality of nodes 37 and/or a plurality of processing core resources 48). For example, multiple instances of any given step of FIG. 27D can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 27D can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 27D can be performed to implement some or all of the functionality of the database system 10 as described in conjunction with FIGS. 27A-27C, for example, by implementing some or all of the functionality of query execution module 2504 and/or operator flow generator module 2514. For example, some or all of the steps of FIG. 27D are based on executing a join process 2530 and/or at least one GDC join 2935. Some or all steps of FIG. 27D can be performed by database system 10 in accordance with other embodiments of the database system 10 and/or nodes 37 discussed herein. Some or all of the steps of FIG. 27D can be performed in conjunction with performing some or all steps of any other method described herein.

Step 2782 includes determining a query expression indicating performance of a join operation upon a first compressed column and a second compressed column sharing a same global dictionary compression (GDC) mapping. Step 2784 generating a query operator execution flow based on the query expression to include a serialized arrangement of a plurality of operators for execution. In various examples, the serialized arrangement of the plurality of operators for includes, based on the first compressed column and the second compressed column sharing the same global dictionary compression mapping: a first join operation applied to the first compressed column and the second compressed column; and/or at least one decompression facilitating join operation (e.g. at least one GDC join operation) serially after the first join operation. Step 2786 includes executing the query operator execution flow in conjunction with executing the query expression to generate a set of output rows from a set of input rows.

Performing step 2786 can include performing step 2788 and/or step 2790. Step 2788 includes generating compressed join output based on executing the first join operation upon first compressed values of the first compressed column and second compressed values of the second compressed column. Step 2790 includes generating decompressed join output from the compressed join output based on executing the at least one decompression facilitating join operation upon the compression join output.

In various examples, a query resultant for the query expression is generated based on the decompressed join output.

In various examples, the at least one decompression facilitating join operation includes a first decompression facilitating join operation (e.g. a first GDC join operation) and a second decompression facilitating join operation (e.g. a second GDC join operation). In various examples, generating the decompressed join output from the compressed join output is based on: decompressing the first compressed values in the compressed join output based on executing the first decompression facilitating join operation; and/or decompressing the second compressed values in the compressed join output based on executing the second decompression facilitating join operation.

In various examples, the first decompression facilitating join operation is performed based on accessing a dictionary structure to identify, for each first compressed value in the compressed join output, a corresponding decompressed value mapped to the each first compressed value in the dictionary structure. In various examples, the second decompression facilitating join operation is performed based on accessing the dictionary structure to further identify, for each second compressed value in the compressed join output, a corresponding decompressed value mapped to the each second compressed value in the dictionary structure.

In various examples, the compressed join output includes a set of rows generated from a first set of input rows having the first compressed column and a second set of input rows having the second compressed column.

In various examples, the set of rows is generated based on identifying ones of the first compressed values of the first compressed column equal to any second compressed values of the second compressed column.

In various examples, a first subset of compressed values of the first compressed column in the first set of input rows are not being equal to any values of the second compressed column in the second set of input rows. In various examples, the set of rows is generating based on filtering out the first set of rows having the first subset of compressed values in the first compressed column. In various examples, none of the first subset of compressed values are decompressed via the at least one decompression facilitating join operation based on being filtered out in executing the first join operation.

In various examples, a second subset of compressed values of the second compressed column in the second set of input rows are not equal to any values of the first compressed column in the first set of input rows. In various examples, the set of rows is generating based on filtering out the second set of rows having the second subset of compressed values in the second compressed column. In various examples, none of the second subset of compressed values are decompressed via the at least one decompression facilitating join operation based on being filtered out in executing the first join operation.

In various examples, the a query operator execution flow is generated to further include, based on implementing the first join operation upon compressed values prior to decompression, a filtering operator serially after the first join operation configured to remove ones of the set of rows having null values compressed in at least one of: the first compressed column or the second compressed column.

In various examples, the filtering operator is included serially before the at least one decompression facilitating join operation. In various examples, executing the filtering operation includes filtering out rows having a null-representing compressed value for the first compressed column and/or the second compressed column. In various examples, none of a filtered set of rows generated via the filtering operator include the null-representing compressed value for the first compressed column and/or the second compressed column. In various examples, the decompressed join output is generated from only rows of the set of rows of the compressed join output included in the filtered set of rows.

In various examples, the null-representing compressed value is an integer value equal to zero. In various examples, executing the filtering operation includes filtering out rows having values for the first compressed column equal to zero. In various examples, executing the filtering operation includes filtering out rows having values for the second compressed column equal to zero.

In various examples, the filtering operator is included serially after the at least one decompression facilitating join operation. In various examples, executing the filtering operation includes filtering out rows having a null value in the decompressed join output.

In various examples, executing the first join operation includes building a hash map from the second set of input rows, wherein a plurality of keys of the hash map correspond to the second compressed values of the second compressed column. In various examples, executing the first join operation includes, after building the hash map via completing processing of all of the second set of input rows, processing each of the first set of input rows to determine whether a corresponding first compressed value of the first compressed column is included in the plurality of keys of the hash map. In various examples, at least one corresponding output row is added to the set of rows when the corresponding first compressed value of the first compressed column is one of the plurality of keys of the hash map based on at least one value mapped to the one of the plurality of keys in the hash map.

In various examples, the first join operation is executed via a plurality of parallelized processes. In various examples, the plurality of parallelized processes collectively generate a plurality of sub-output. In various examples, each of the plurality of parallelized processes performs a join operator upon a corresponding proper subset of the first set of input rows and upon all of the second set of input rows to generate corresponding sub-output of the plurality of sub-output. In various examples, different ones of the plurality of parallelized processes perform the join operator upon different corresponding proper subsets of the first set of input rows and upon the all of the second set of input rows. In various examples, the compressed join output corresponds to a union of the plurality of sub-output.

In various examples, the query expression is executed via a plurality of nodes each assigned to participate in at least one level of a hierarchical query execution plan implementing the query operator execution flow.

In various examples, the first compressed column belongs to a first relational database table and/or the second compressed column belongs to a second relational database table distinct from the first relational database table.

In various examples, generating the query operator execution flow includes performing an optimizing step to push the first join operation before the at least one decompression facilitating join operation based on the first join operation meeting push-down conditions for operators executable upon compressed values prior to decompression.

In various examples, the first join operation is implemented as a hash join operation.

In various examples, the query operator execution flow further includes at least one rename operation to rename at least one column name to prevent any duplicate instances of any column names. In various examples, executing the query operator execution flow includes executing the at least one rename operator.

In various examples, the first compressed values and the second compressed values are all fixed-length integer values mapped to corresponding variable length values in accordance with the same global dictionary compression mapping based on the first compressed column compressing a first variable length column and based on the second compressed column compressing a second variable length column.

In various examples, the query expression indicates a disjunction of a plurality of query predicates. In various examples, the query operator execution flow is generated to further include, based on the disjunction of the plurality of query predicates: an extend operator operable to generate a row identifier column of random values; a plurality of parallelized branches serially after the extend operator, where each parallelized branch of the plurality of parallelized branches has a corresponding flow of operators of the plurality of operators configured to apply a corresponding one of the plurality of query predicates; and/or a plurality of additional operators serially after the plurality of parallelized branches.

In various embodiments, any one of more of the various examples listed above are implemented in conjunction with performing some or all steps of FIG. 27D. In various embodiments, any set of the various examples listed above can be implemented in tandem, for example, in conjunction with performing some or all steps of FIG. 27D, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27D, for example, in conjunction with further implementing any one or more of the various examples described above.

In various embodiments, the operational instructions, when executed by the at least one processor, cause the database system to: determine a query expression indicating performance of a join operation upon a first compressed column and a second compressed column sharing a same global dictionary compression mapping. In various embodiments, the operational instructions, when executed by the at least one processor, further cause the database system to generate a query operator execution flow based on the query expression to include a serialized arrangement of a plurality of operators for execution that includes, based on the first compressed column and the second compressed column sharing the same global dictionary compression mapping: a first join operation applied to the first compressed column and the second compressed column; and/or at least one decompression facilitating join operation serially after the first join operation. In various embodiments, the operational instructions, when executed by the at least one processor, further cause the database system to execute the query operator execution flow in conjunction with executing the query expression based on: generating compressed join output based on executing the first join operation upon first compressed values of the first compressed column and second compressed values of the second compressed column; and/or generating decompressed join output from the compressed join output based on executing the at least one decompression facilitating join operation upon the compression join output. In various embodiments, a query resultant for the query expression is generated based on the decompressed join output.

FIGS. 28A-28G illustrate embodiments of a database system 10 that maintains a set of hash values for a hash set structure in implementing set operations, which is spilled to a plurality of hash buckets when spilling a corresponding hash set structure to disk. The embodiments illustrated in 28A-28G can be utilized to implement any embodiment of query processing system 2502 described herein. The embodiments illustrated in 28A-28G can be implemented via one or more nodes 37 of one or more computing devices 18 implementing database system 10, and/or can be implemented via any other memory and/or processing resources. Some or all features and/or functionality of FIGS. 28A-28G can be utilized to implement any embodiment of database system 10 described herein.

In some embodiments, set operations with row matching and row deduplication are implemented for executing corresponding query expression (e.g. SQL expressions). These set operations can include distinct operators over a single child, logical set operations (union, intersect, and/or except), semi and/or anti joins, and/or union all.

For example, single-child distinct operations and multi-child union distinct operations are optionally logically equivalent, where the operator must emit all input rows from any child that are not equivalent to any rows that have already been emitted.

As another example, semi equi-join operations emit any rows from their left child that have at least 1 match in each of their 1 to n right children (note: if there are additional non-equijoin predicates, then the semi join is optionally processed like a standard hash join).

As another example, anti equi-join operations emit any rows from their left child that have 0 matches in any of their 1 to n right children (note: if there are additional non-equijoin predicates, then the anti join is optionally processed like a standard hash join)

As another example, intersect distinct operations can be considered a semi join with the additional constraint that the rows from the left child must be distinct/deduplicated.

As another example, except distinct operations can be considered an anti-join with the additional constraint that the rows from the left child must be distinct/deduplicated.

As another example, intersect all operations can be considered a semi join with the additional constraint that one of the equivalent matched right hand side (rhs) rows on each child must be invalidated/discarded for every matched and emitted left hand side (lhs) row (e.g. if a distinct row appears 6 times on the rhs, 3 times on a middle child, and 8 times on the lhs then it will only be emitted 3 times).

As another example, except all operations can be considered an anti join with the additional constraint that one of the equivalent of matched rhs rows on any child must be invalidated/discarded for every matched and discarded lhs row (e.g. if a distinct row appears 6 times on the rhs and 8 times on the lhs then it will only be emitted twice).

Some or all set operations can be implemented via some or all embodiments of join operations described herein. Some or all set operations can be implemented via some or all embodiments of any other operation 2420 described herein.

In some embodiments, some or all of these operations are implemented based on keeping the full set of rows (e.g. row blob) for every emitted row in memory. This can pose serious memory inefficiencies. The embodiments of FIGS. 28A-28G present embodiments with improved memory efficiency where not all rows require storage during execution of these set operations based on storing hash values (e.g. 128 bit hashes) for rows in a hash set structure rather than all raw value of the rows (e.g. keeping entire row blobs for each distinct row isn't necessary if it's assumed that probability of collisions between 128 bit hashes is vanishingly small).

FIG. 28A illustrates an embodiment where an operator execution module 3215 implements execution of a set operation 3535 (e.g. on a particular node, where the operation is executed in parallel across a plurality of parallelized nodes) based on processing an input row set 2543 that includes input rows 2544.1-2544.K utilized to build a hash set structure 3555 (e.g. a hash table, hash map, or other set structure maintaining the set of hash values, for example, exactly once with no duplicates) that stores a set of hash values 3654.1-3564.M, corresponding to a maintained set of hash values 3556, in non-disk memory resources 3511 utilized by the query execution module to execute the set operation 3535 (e.g. prior to any spill to disk condition being met an a corresponding spill to disk being facilitated). As a new input row 2544.$i$ is processed, their hash value 3654.$i$ is generated, for example, as a deterministic function fo (e.g. a hash function) of the value of the corresponding input row 2544.$i$, and/or is stored as a new value in hash set structure 3555 in the case where the hash value 3654.$i$ is not yet stored (e.g. based on another previously processed row having the same value and thus having the same hash value 3654.$i$).

Input row set 2543 can be implemented in a same or similar fashion as right input row set 2543, where input rows 2544 are implemented in a same or similar fashion as right input rows. Hash values 3564 can be implemented in a same or similar fashion as match values 2564 (e.g. can be the hash value generated from a corresponding match value).

The operator execution module 3215 can generate output rows from this input row set 2543 as it is processed for some set operations (e.g. union distinct operations, where a row is emitted when its hash value is not yet included in the set of hashed values). In some embodiments, the input row set 2543 is implemented, as right input row set 2543, where a left input row set is processed after processing all right input rows of the right input row set to generate output rows.

For example, for union distinct operations, the operator maintains the set of hash values 3556 (e.g. hashset of 128 bit row hashes and can emit an incoming row if its hash is not present in the set. Union distinct can then stream each child and never needs to have a significant amount of row data in memory (e.g. potentially very large row blobs can be discarded and only the deduplicated 128 bit hashes of emitted rows are maintained).

In some embodiments, semi/anti equijoins and intersect/except operations logically can only ever emit rows from their left child. They all can be executed with small variations on a hash table containing the 128 bit hashes of all rhs child rows (e.g. after processing the whole right hand side), but never the full row blobs. Once each rhs child has been fully processed, the left child can be streamed and rows can be emitted based on hash key membership information in the hash table.

For example, for anti equi-joins operations, the operator execution module maintains a hashset of 128 bit join key hashes for the rhs children, and/or it can emit any incoming row from the left child if the lhs join key hash is not present in the set.

As another example, except distinct operations are nearly identical to anti equi-joins, with the added requirement that the hash key for any lhs row must be added to the set once it is emitted.

As another example, except all operations require additional info to track row counts across for each distinct row on each rhs child. A match on any child is treated equivalently, so this can be represented by a hash map of 128 bit row key hashes to an integer row count. The row count can be decremented for every matched left row, and a left row can be emitted when its row hash is not present in the map or if the row count in the map is 0.

As another example, for semi equi-join operations with a single rhs child, the operator execution module maintains a hashset of 128 bit join key hashes for the rhs child and it can emit any incoming row from the left child if the lhs join key hash is present in the set.

As another example, for semi equi-join operations with multiple rhs children, the operator maintains a hash map of 128 bit join key hashes to membership info for each of the rhs children. This membership info can use a bitmask to minimize the memory required. Any incoming lhs row can be emitted if its join key hash is present in the map, and each rhs child is marked as present in the bitmask.

As another example, intersect distinct operations are nearly equivalent to semi joins with multiple children and can use a bitmask for rhs membership info. Once a single lhs row has been emitted, the membership bitmask can be cleared so no subsequent lhs rows will be emitted.

As another example, intersect all operations are also nearly equivalent to a basic semi join, but requires additional membership info for each rhs child. An array of seen row counts can be maintained for each rhs child rather than a single bool/bit. Each rhs row count can be decremented whenever a lhs row with an equivalent hash is emitted, and/or a lhs row can be emitted if and/or only if all row counts in the rhs membership array are nonzero.

In some embodiments, in the case where the set operation is only concerned with data with equivalent hash keys, some or all of the set operations described herein can be partitioned to disk (e.g. similar to a GRACE hash join). Unlike a naive grace hash join, set operators and/or semi/anti joins can be required neither to write the full row blobs to disk for all children nor to write data to disk for every incoming row.

For a union distinct that spills during streaming, the current hash set 128 bit hashes corresponding to the emitted rows must be partitioned into $2^n$ buckets based on n bits of the hash key and written to disk. Once the operator has transitioned to external, any new incoming data must have the full row blob written to an on-disk partition based on the same n bits of its hash. These incoming rows can continue to be deduplicated by maintaining an incomplete hash set of row keys that have been written to disk. When the operator is forced to release memory again or all incoming data has been received for all incoming children, this incomplete hash set may be discarded. Once all incoming data has been received, a single on disk partition can be processed by: (1) reading the spilled 128 bit hash keys corresponding emitted rows and inserting them into a hash set; (2) streaming the row blobs spilled to the same partition; and/or (3) outputting any rows if their hash key is not present in the set of emitted rows and inserting their hash key into the set to mark that the row has been emitted. In some embodiments, if there is additional memory pressure and the operator must release memory while processing this spilled partition, the emitted hash keys+row data can be further subdivided by the next n bits of the hash key.

In some embodiments, some or all features and/or functionality of spilling to disk, corresponding disk memory resources 3065, and/or handling out of memory conditions when query execution memory resources are determined to be low as described herein implements some or all features and/or functionality of spilling to disk corresponding disk memory resources, and/or handling out of memory conditions when query execution memory resources are determined to be low as disclosed by: U.S. Utility application Ser. No. 18/322,688, entitled "PROCESSING MULTI-COLUMN STREAMS DURING QUERY EXECUTION VIA A DATABASE SYSTEM", filed May 24, 2023; and/or U.S. Utility application Ser. No. 18/326,305, entitled "HANDLING NULL VALUES IN PROCESSING JOIN OPERATIONS DURING QUERY EXECUTION", filed May 31, 2023; which are hereby incorporated herein by reference in its entirety and made part of the present U.S. Utility Patent Application for all purposes. For example, non-disk memory resources 3511 can be implemented as query execution memory resources 3045.

In some embodiments, after spilling to disk and transitioning to external execution of the operation, union distinct operations can be required to copy full row blobs to disk while streaming each remaining child because any child could contain a row to emit.

In some embodiments, semi/anti joins and intersect/except operators can logically only emit a row coming from their leftmost child, so they are only required to write row blobs to disk for their leftmost child. Right children are only required to record their 128 bit row/join key hash+any additional membership data depending on the operator type.

The external algorithm (e.g. the algorithm applied after spilling to disk) is optionally implemented as: (1) to initially spill, partition any data present in the hash table into $2^n$ buckets based on n bits of the hash key and/or copy both the 128 bit hash key and any membership metadata into the appropriate on disk bucket (e.g. where the hash set structure is optionally implemented as a hash map to map the membership metadata to the corresponding bit hash key); (2) to process incoming data from the left child, generate a row/join key hash and calculate the appropriate on disk bucket based on the same n bits as the initial spill, and/or copy the full row blob to the disk bucket, (3) To process incoming data from any right child, generate a row/join key hash and insert it into a hash table with child-membership info equivalent to the internal/non-spilling algorithm for the operator type and/or discard the row blob; (4) when all incoming data has been received, partition any data present in the hash table into $2^n$ buckets based on n bits of the hash key (note: for anti joins, except distinct, and 2-child semi joins there is optionally no additional membership info associated with the row hashes generated from the right hand side children. These row hashes can eagerly be written to their disk partition as soon as they are inserted into the set, and then this set can be cleared at this point rather than re-processed), copy both the 128 bit hash key and any membership metadata into the appropriate on disk partition, and/or, to process a single on-disk partition: read all 128 bit hash keys+additional membership metadata from the on disk partition and/or insert each into a hash table and merge membership metadata appropriately (e.g. for except all the additional metadata is the number of duplicate rows seen. Merging these can be simply adding the two integers). This process can similarly be repeated for the next n bits of the hash key if a single on-disk partition does not completely fit into memory.

FIGS. 28B-28E illustrate examples of such embodiments of continuing processing of a set operation after determining to spill to disk.

FIG. 28B illustrates an embodiment where a hash set spill to disk module 3512 of a disk spill facilitation module 2720 spills hash set structure 3555 of non-disk memory resources 3511 to disk memory resources 3065 as a plurality of hash buckets 3521.1-3521.R collectively storing the set of hash values 3556 of the hash set structure. In particular, a hash bucket assignment module 3523 can identify a hash bucket 3521.*x* store the hash value 3564.*i* as a deterministic function go of hash value 3564.*i*.

As a particular example, g (identifies one of the $2^n$ buckets based on n bits of the hash key. For example, in the case where the last n bits of the hash key are considered, the four resulting buckets include: a first bucket to which hash values having the last 2 bits as 00 are assigned; a second bucket to which hash values having the last 2 bits as 01 are assigned; a third bucket to which hash values having the last 2 bits as 10 are assigned; and a fourth bucket to which hash values having the last 2 bits as 11 are assigned. The value of n can optionally be selected and/or predetermined (e.g. automatically and/or based on user configuration). For example, the value of n is selected automatically as a function (e.g. increasing function) of the size of hash set structure 3555 when the spill to disk condition is met and/or is selected automatically as a function (e.g. increasing function) of a known and/or estimated size of the input row set 2543.

FIG. 28C illustrates an embodiment of operator execution module 3215 continuing execution after spilling to disk (e.g. as illustrated in FIG. 28B) to process further input rows of input row set 2543 that include input rows 2544.K+1-2544.N (e.g. that were not yet processed illustrated in FIG. 28A prior to spiling to disk of FIG. 28B). The hash values of these rows are similarly added to the set of hash values 3556 via hash set generator module 3549 as illustrated in FIG. 28A, but based on adding the hash value to a respective hash bucket 3521 in disk memory resources 3065 identified by hash bucket assignment module 3523, where a hash value 3564.*j* generated for incoming input row 2544.*j* is added to bucket 3521.*y* as a function g ((e.g. of the last n bits of the hash value, where $2^n$ hash buckets are built) of hash value 3564.*j*. In some embodiments, in the case where all of input row set (e.g. all right input rows) were already processed prior to spilling to disk and/or in the case where the set operation is a union distinct operation, this step of adding new hash values to hash buckets 3521 illustrated in FIG. 28C is skipped.

FIG. 28D illustrates an embodiment of operator execution module further continuing execution of the set operation based on processing incoming input rows 2542 (e.g. left input rows based on all right input rows having already been processed, or further input rows 2544 in the case where there are no left and right children, such as in the case of a union distinct). This can include populating a plurality of row buckets 3527.1-3527.R via a row bucket generator module 3530. For example, the respective hash value 3654.*k* can be generated as function fo of a given input row 2542.*k*, where a row bucket 3527.*z* is assigned to store the full input row 2542.*k* (e.g. its match value 2564 and/or some or all additional column values to be emitted if included in the output) via row bucket assignment module 3524 as function go (e.g. of the last n bits of the hash value, where $2^n$ row buckets are built) of its hash value 3564.*k* (e.g. where the hash value 3521.*k* would be destined for hash bucket 3521.*z* if processed via hash bucket assignment module 3523 based on both utilizing the same function go, where the same number of row buckets are built as there are hash buckets).

For example, in the case where the last n bits of the hash key are considered in applying function go, the four row buckets include: a first row bucket to which rows having hash values having the last 2 bits as 00 are assigned; a second row bucket to which rows having hash values having the last 2 bits as 01 are assigned; a third row bucket to which rows having hash values having the last 2 bits as 10 are assigned; and a fourth row bucket to which rows having hash values having the last 2 bits as 11 are assigned.

In some embodiments, this generating of row buckets corresponds to foregoing immediate processing of input rows 2542 to generate output row set, where output row set is not built until the respective row buckets 3527 are populated via processing all input rows 2542 by row bucket assignment module 3524.

In some embodiments, in the case where all right input rows were already processed prior to spilling to disk and/or where the set operation is a union distinct operation, some input rows 2542 were already processed prior to spilling to disk and a first corresponding portion of output row set was emitted (e.g. via streaming these input rows 2542 in the case where conditions against the hash set structure were met based on whether or not a value is included in the hash set as defined for the corresponding set operation), where remaining output rows are not generated until after all input rows 2542 are processed via placement into row buckets 3527.

FIG. 28E illustrates an embodiment where bucket pairs 3552 of a given row bucket 3527 and corresponding hash bucket 3521 are processed on at a time via a bucket pair processing module 3531 to emit output rows 2546 of a corresponding output row set (and/or remaining portion of output row set if some of output row set was emitted prior to spilling to disk). For example, a given bucket pair 3552.*z* includes the row bucket 3527.*z* and hash bucket 3521.*z* to which same rows/corresponding hash values are assigned via function go. For example, in the case where the last n bits of the hash key are considered in applying function go, the four bucket pairs include: a first bucket pair having the hash bucket to which hash values having the last 2 bits as 00 are assigned as the row bucket to which rows having hash values having the last 2 bits as 00 are assigned; a second bucket pair having the hash bucket to which hash values having the last 2 bits as 01 are assigned as the row bucket to which rows having hash values having the last 2 bits as 01 are assigned; a third bucket pair having the hash bucket to which hash values having the last 2 bits as 10 are assigned as the row bucket to which rows having hash values having the last 2 bits as 10 are assigned; and a fourth bucket pair having the hash bucket to which hash values having the last 2 bits as 11 are assigned as the row bucket to which rows having hash values having the last 2 bits as 11 are assigned.

In processing of bucket pair 3552.*z* via bucket pair processing module 3531, a hash set populator module 3551 can populate hash set 3555 with hash values 3564 of a given hash bucket 3521.*z* of a given bucket pair 3552.*z* being processed, and the input rows 2542 of the corresponding row bucket 3527.*z* of the respective bucket pair 3552.*z* can be processed (e.g. streamed) via matching row determination module 2558 to determine whether or not the input row 2542 be emitted as an output row 2546 (e.g. based on whether the hash value 3564 generated for this input row 2542 is included in the hash set 3555). Once a given bucket pair 3552.*z* has completed processing, the bucket pair processing module 3531 advances to a next bucket pair 3552 and repeats the process (e.g. optionally deleting/overwriting the hash set structure 3555 generated for the prior bucket pair 3552) until all bucket pairs 3552 are processed. Thus, the size of hash set that is maintained in non-disk memory is smaller due to processing of only one bucket at a time, which can be favorable in low memory conditions inducing the spill to disk to occur.

FIG. 28F illustrates a series of steps depicting example transition between states of the hash bucket structure 3555 (e.g. "hashset { }"), the plurality of hash buckets 3521.1-3521.R (e.g. bucket 0.*h* { } and bucket 1.*h* { }), and the plurality of row buckets 3527.1-3527.R (e.g. bucket 0.*r* { } and bucket 1.*r* { }) in executing an example union distinct operation as set operation 3535. In particular, in this example, for simplicity, n=1 and 2″=2 and thus exactly two buckets are maintained based on the last single digit of the hash values), where R=2.

FIG. 28G illustrates a series of steps depicting example transition between states of the hash bucket structure 3555 (e.g. "hashmap { }"), the plurality of hash buckets 3521.1-3521.R (e.g. bucket 0.*h* { } and bucket 1.*h* { }), and the plurality of row buckets 3527.1-3527.R (e.g. bucket 0.*r* { } and bucket 1.*r* { }) in executing an example 3 child intersect distinct operation as set operation 3535. In particular, in this example, for simplicity, n=1 and 2″=2 and thus exactly two buckets are maintained based on the last single digit of the hash values), where R=2. The membership data can be indicated as a corresponding bit map (e.g. depicted as the values 'true' or 'false' in a corresponding array having indexes corresponding to the set of right children, where the array is size 2 in this case due to there being two right children: a rightmost child and a middle child.

In some embodiments, for semi joins and intersects with multiple children, prefiltering can be applied to intermediate children, for example, based on implementing some or all features and/or functionality of executing composite multi-joins disclosed by: U.S. Utility application Ser. No. 18/634,450, entitled "EXECUTING MULTI-CHILD OPERATORS DURING QUERY EXECUTION VIA APPLYING A PIECEWISE SCHEDULING STRATEGY", filed Apr. 12, 2024; which is hereby incorporated herein by reference in its entirety and made part of the present U.S. Utility Patent Application for all purposes. In some embodiments, such prefiltering cannot be applied once any data has been spilled because it is not known whether the membership in the map for a given hash key is complete and/or global.

In some embodiments, for certain operators, some map values are unconditionally irrelevant. Consider an except all operator that has seen row a once on its left child, and once on its right children. The map entry for a can still exist because individual values are never deleted from theca map, but the rhs seen count can have been decremented to 0. If another a is processed from the left child, it will be emitted because the seen count is 0, which can be equivalent behavior to the row hash not being present in the map at all. It can then be safe to discard map entries when spilling if the entry has 0 as their rhs seen row count, which can save disk space and processing overhead to spill/reload the irrelevant map entry.

In some embodiments, external anti joins, except all, except distinct, and/or intersect distinct are implemented to pre-filter incoming lhs data before spilling it. The rhs data that is present while streaming the lhs is optionally not complete because some data has likely been spilled if the operator is external. It can then be unsafe to emit any rows, but if a matching row hash is present in the incomplete map, then it is possible to immediately discard it for an anti join or except distinct. For except all the same logic applies, but the operator can be implemented to decrement the corresponding map entry. Intersect distinct can correctly filter rows if the operator records seen lhs values in the incomplete map to partially deduplicate the lhs data. Similarly to the above, external semi joins or intersect alls can eagerly emit incoming lhs data if a match is present in the incomplete map.

In some embodiments, the act of deduplicating incoming rhs data is not necessary when external. For an intersect all where every incoming row from the right hand side is already distinct, all incoming rhs row hashes can be inserted into a map, written to a disk partition, loaded from that disk partition, and inserted into a map again. In some embodiments, inserting into a hash table while external and processing incoming data is only beneficial if a significant number of duplicates are removed. In some embodiments, both approaches of maintaining and removing duplicates are supported by database system 10, where the query execution module switch between these approaches, for example, based on observed distinct cardinalities, and/or based on estimate cardinalities determined by the optimizer.

In some embodiments, using 128 bit hash values as distinct row identities is functional and saves memory when row blobs are very large, but is inefficient when the size of each row is less than 128 bits. In some embodiments, the row hashes are not utilized and the actual row values are used as hash table entries in such cases (e.g. simple cases such as a DISTINCT on a 64 bit integer column).

FIG. 28H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28H, for example, based on participating in execution of a query being executed by the database system 10. Some or all of the method of FIG. 30F can be performed by nodes executing a query in conjunction with a query execution, for example, via one or more nodes 37 implemented as nodes of a query execution module 2504 implementing a query execution plan 2405. Some or all of the steps of FIG. 28H can optionally be performed by any other one or more processing modules of the database system 10.

Some or all steps of FIG. 28H can be performed in parallel and/or concurrently via a plurality of parallelized processing resources (e.g. implemented via a plurality of nodes 37 and/or a plurality of processing core resources 48). For example, multiple instances of any given step of FIG. 28H can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of FIG. 28H can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step.

Some or all of the steps of FIG. 28H can be performed to implement some or all of the functionality of the database system 10 as described in conjunction with FIGS. 28A-28G, for example, by implementing some or all of the functionality of operator execution module 3215 and/or spill to disk facilitation module 2720. Some or all steps of FIG. 28H can be performed by database system 10 in accordance with other embodiments of the database system 10 and/or nodes 37 discussed herein. Some or all of the steps of FIG. 28H can be performed in conjunction with performing some or all steps of any other method described herein.

Step 3282 includes determining a query for execution that indicates performance of a set operation. Step 3284 includes executing the set operation upon a plurality of input rows to generate an output row set in conjunction with executing the query.

Performing step 3284 can include performing step 3286, step 3288, step 3290, and/or step 3292. Step 3286 includes processing each of a first incoming subset of input rows of the plurality of input rows prior to a spill to disk condition being met based on utilizing a hash set structure that includes a set of hash values in non-disk memory resources. Step 3288 includes, in response to the spill to disk condition being met, spill the hash set structure to disk based on partitioning the set of hash values of the hash set structure into a plurality of hash buckets written to disk memory resources. Step 3290 includes processing each of a remaining incoming subset of input rows of the plurality of input rows while the spill to disk condition is met based on storing an un-hashed row value of the each of the remaining incoming subset of input rows into one of a plurality of row buckets written to the disk memory resources. Step 3292 includes, in response completing processing of all of the plurality of input rows, generating output rows of the output row set based on processing the plurality of hash buckets and the plurality of row buckets.

In various examples, a number of row buckets in the plurality of row buckets is equal to a number of hash buckets in the plurality of hash buckets, and wherein each of the plurality of row buckets corresponds to one of the plurality of hash buckets.

In various examples, each hash value of the set of hash values includes an ordered set of bits, wherein partitioning the set of hash values into the plurality of hash buckets includes assigning the each hash value to a corresponding one of the plurality of hash buckets as a function of a subset of bits of the ordered set of bits.

In various examples, each of the set of hash values is generated from a corresponding un-hashed row value of a corresponding row included in the first incoming subset of input rows. In various examples, storing the un-hashed row value of the each of the remaining incoming subset of input rows into the one of the plurality of row buckets includes: generating a corresponding hash value from the un-hashed row value; and/or identifying the one of the plurality of row buckets for storage of the un-hashed row value as a function of the subset of bits of the ordered set of bits of the corresponding hash value.

In various examples, the ordered set of bits for the each of the set of hash values includes a first number of bits dictated by a corresponding hash function utilized to generate the each of the set of hash values, and wherein the subset of bits includes a second number of bits less than the first number of bits.

In various examples, the first number of bits is equal to 128.

In various examples, the second number of bits is equal to less than half of the first number of bits.

In various examples, the second number of bits is selected based on a number of hash values included the hash set structure when the spill to disk condition is met.

In various examples, the subset of bits of the ordered set of bits corresponds to one of: a first consecutive set of bits of the ordered set of bits, or a last consecutive set of bits of the ordered set of bits.

In various examples, a number of hash buckets in the plurality of hash buckets is equal to two to the power of a number of bits included in the subset of bits.

In various examples, the method further includes, after the spill to disk condition is met: determining a second spill to disk condition, corresponding to releasing of additional non-disk memory resources, is met. In various examples, the method further includes, in response to the second spill to disk condition being met, the method further includes: further partitioning the set of hash values across the plurality of hash buckets into a second plurality of hash buckets that includes an increased number of hash buckets from the plurality of hash buckets as a function of a second subset of bits of the ordered set of bits that includes a third number of bits greater than the second number of bits and less than the first number of bits; and/or further partitioning a set of un-hashed row values across the plurality of row buckets into a second plurality of row buckets that includes the increased number of row buckets from the plurality of row buckets as the function of the second subset of bits of the ordered set of bits.

In various examples, processing the first incoming subset of input rows of the plurality of input rows processed prior to a spill to disk condition being met includes generating additional output rows of the output row set based on: generating a hash value for the each row of the plurality of input rows; and/or determining whether to emit the each row for inclusion in the output row set based on determining whether the hash value is included in a hash set structure maintaining a set of hash values for previously processed input rows.

In various examples, the plurality of input rows correspond to a left child of the set operation, further comprising: before processing the first incoming subset of input rows, applying the set operation to each of a second plurality of input rows corresponding to at least one right child of the set operation to populate the hash set structure with the set of hash values based on generating each hash value of the set of hash values from a corresponding input row of the second plurality of input rows.

In various examples, the set operation corresponds to a union distinct operation. In various examples, the method further includes adding the hash value to the set of hash values of the hash set structure when the hash value is not included in the set of hash value of the hash set structure.

In various examples, processing the first incoming subset of input rows of the plurality of input rows prior to the spill to disk condition being met is further based on: generating a hash value for the each row of the plurality of input rows; and/or adding the hash value to the set of hash values of the hash set structure when the hash value is not included in the set of hash value of the hash set structure.

In various examples, the set operation is executed upon a plurality of child branches of the set operation that includes a left child branch and at least one right child branch. In various examples, the first incoming subset of input rows of the plurality of input rows corresponds to a first subset of rows of the at least one right child branch. In various examples, the method further includes processing a remaining subset of rows of at least one right child branch while the spill to disk condition is met to complete processing of all right child branches of the plurality of child branches based on further populating at least one of the plurality of hash buckets with hash values generated from rows of the remaining subset of rows. In various examples, the remaining incoming subset of input rows corresponds to all rows of the left child branch. In various examples, the each of the remaining incoming subset of input rows is processed based on completing processing of the all right child branches of the plurality of child branches.

In various examples, processing the plurality of hash buckets and the plurality of row buckets is based on: processing each of a plurality of hash bucket and row bucket pairs one at a time. In various examples, each hash bucket and row buck pair of the plurality of hash bucket and row bucket pairs includes one hash bucket and one row bucket for one of a plurality of possible values for a subset of bits of an ordered set of bits for the each hash value.

In various examples, processing the each of the plurality of hash bucket and row bucket pairs includes: adding, to the hash set structure stored in the non-disk memory resources, hash values stored in the one hash bucket of the each of the plurality of hash bucket and row bucket pairs; and/or determining whether to emit each row included in the one row bucket of the each of the plurality of hash bucket and row bucket pairs for inclusion in the output row set based on determining whether a corresponding hash value generated for the each row included in the one row bucket is included in the hash set structure.

In various examples, the plurality of input rows includes a plurality of sets of input rows for a corresponding plurality of child branches of the set operation that includes a left child branch and a plurality of right child branches. In various examples, the hash set structure stores, for each of the set of hash values, a corresponding bitmask value indicating in which of the plurality of right child branches a corresponding row of the plurality of input rows was received.

In various examples, the set operation corresponds to one of: a union distinct operation; an anti equi-joins operation; an except distinct operation; an except operation; a semi equi-join operation; an intersect distinct operation; and/or an intersect all operation.

In various examples, the query further indicates a disjunction of a plurality of query predicates. In various examples, executing the query further includes, based on the disjunction of the plurality of query predicates, executing an extend operator operable to generate a row identifier column of random values; and/or executing a plurality of parallelized branches serially after the extend operator, wherein each parallelized branch of the plurality of parallelized branches has a corresponding flow of operators of the plurality of operators configured to apply a corresponding one of the plurality of query predicates.

In various embodiments, any one of more of the various examples listed above are implemented in conjunction with performing some or all steps of FIG. 28H. In various embodiments, any set of the various examples listed above can be implemented in tandem, for example, in conjunction with performing some or all steps of FIG. 28H, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28H, for example, in conjunction with further implementing any one or more of the various examples described above.

In various embodiments, the operational instructions, when executed by the at least one processor, cause the database system to determining a query for execution that indicates performance of a set operation and/or execute the set operation upon a plurality of input rows to generate an output row set in conjunction with executing the query based on: processing each of a first incoming subset of input rows of the plurality of input rows prior to a spill to disk condition being met based on utilizing a hash set structure that includes a set of hash values in non-disk memory resources; in response to the spill to disk condition being met, spilling the hash set structure to disk based on partitioning the set of hash values of the hash set structure into a plurality of hash buckets written to disk memory resources; processing each of a remaining incoming subset of input rows of the plurality of input rows while the spill to disk condition is met based on storing an un-hashed row value of the each of the remaining incoming subset of input rows into one of a plurality of row buckets written to the disk memory resources; and/or in response completing processing of all of the plurality of input rows, generate output rows of the output row set based on processing the plurality of hash buckets and the plurality of row buckets.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/ signal, one item/signal substantially matching another item/ signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A database system comprises:

a plurality of computing device clusters, wherein a computing device cluster of the plurality of computing device clusters includes a plurality of computing devices, wherein a computing device of the pluralities of computing devices includes a plurality of computing nodes, wherein a computing node of the pluralities of computing nodes includes a plurality of processing core resources, wherein a set of processing core resources of the pluralities of processing core resources are operable to:

for a query operation of a query regarding data of a dataset:

identify a set of hash values from a plurality of hash values based on a plurality of state information, wherein:

the plurality of hash values is generated based on a hash function of a plurality of rows of the dataset;

a first hash value of the plurality of hash values corresponds to a first row of the plurality of rows;

first state information of the plurality of state information corresponds to the first hash value; and the set of hash values are to be used in the execution of the query operation instead of using the set of rows of the plurality of rows that the set of hash values represent;

determine whether there is sufficient available memory space to store the set of hash values and a set of corresponding state information of the plurality of state information in allocated main memory for executing the query; and when there is insufficient available memory space:

partition the set of hash values and the set of corresponding state information into a plurality of groups of hash values based on a hash value distribution protocol; and store the plurality of groups of hash values in a plurality of non-volatile memory buckets until retrieved to the allocated main memory for execution of the query operation, wherein the plurality of non-volatile memory buckets is distributed within the database system.

2. The database system of claim 1, wherein the set of processing core resources comprises:

one or more processing core resources.

3. The database system of claim 1, wherein the allocated main memory comprises:

an allocated portion of main memory of computing nodes of the plurality of computing nodes associated with the set of processing core resources.

4. The database system of claim 1, wherein the first state information comprises:

data regarding occurrences of when the first hash value has been previously used to execute the query operation instead of using the first row.

5. The database system of claim 1, wherein the query operation comprises:

a set operation.

6. The database system of claim 5, wherein the set operation comprises one of:

a union distinct operation;

an anti equi-join operation;

an except distinct operation;

an except operation;

a semi equi-join operation;

an intersect distinct operation; or an intersect all operation.

7. The database system of claim 1, wherein the hash value distribution protocol comprises at least one of:

grouping the set of hash values based on selected bits of the hash values to produce a first number of groups; and when the first number of groups is below a threshold number of groups based on available memory space, grouping the set of hash values based on the selected bits and on further selected bits to produce a second number of groups.

8. The database system of claim 1 further comprises:

for a second query operation of the query:

identify a second set of hash values from the plurality of hash values based on the plurality of state information, wherein the second set of hash values are to be used in the execution of the second query operation instead of using a second set of rows of the plurality of rows that the second set of hash values represent;

determine whether there is sufficient available memory space to store the second set of hash values and a second set of corresponding state information of the plurality of state information in allocated main memory for executing the query; and when there is insufficient available memory space:

partition the second set of hash values and the second set of corresponding state information into a second plurality of groups of hash values based on the hash value distribution protocol; and store the second plurality of groups of hash values in a second plurality of non-volatile memory buckets until retrieved to the allocated main memory for execution of the second query operation, wherein the second plurality of non-volatile memory buckets is distributed within the database system.

9. A non-transitory computer readable storage medium comprises:

a memory section that stores operational instructions that, when executed by a set of processing core resources of pluralities of processing core resources of a database system, cause the set of processing core resources to:

for a query operation of a query regarding data of a dataset:

identify a set of hash values from a plurality of hash values based on a plurality of state information, wherein:

the plurality of hash values is generated based on a hash function of a plurality of rows of the dataset;

a first hash value of the plurality of hash values corresponds to a first row of the plurality of rows;

first state information of the plurality of state information corresponds to the first hash value; and the set of hash values are to be used in the execution of the query operation instead of using the set of rows of the plurality of rows that the set of hash values represent;

determine whether there is sufficient available memory space to store the set of hash values and a set of corresponding state information of the plurality of state information in allocated main memory for executing the query; and when there is insufficient available memory space:

partition the set of hash values and the set of corresponding state information into a plurality of groups of hash values based on a hash value distribution protocol; and store the plurality of groups of hash values in a plurality of non-volatile memory buckets until retrieved to the allocated main memory for execution of the query operation, wherein the plurality of non-volatile memory buckets is distributed within the database system.

10. The non-transitory computer readable storage medium of claim 9, wherein the set of processing core resources comprises:

one or more processing core resources.

11. The non-transitory computer readable storage medium of claim 9, wherein the allocated main memory comprises:

an allocated portion of main memory of computing nodes of the plurality of computing nodes associated with the set of processing core resources.

12. The non-transitory computer readable storage medium of claim 9, wherein the first state information comprises:

data regarding occurrences of when the first hash value has been previously used to execute the query operation instead of using the first row.

13. The non-transitory computer readable storage medium of claim 9, wherein the query operation comprises:

a set operation.

14. The non-transitory computer readable storage medium of claim 13, wherein the set operation comprises one of:

a union distinct operation;

an anti equi-join operation;

an except distinct operation;

an except operation;

a semi equi-join operation;

an intersect distinct operation; or an intersect all operation.

15. The non-transitory computer readable storage medium of claim 9, wherein the hash value distribution protocol comprises at least one of:

grouping the set of hash values based on selected bits of the hash values to produce a first number of groups; and when the first number of groups is below a threshold number of groups based on available memory space, grouping the set of hash values based on the selected bits and on further selected bits to produce a second number of groups.

16. The non-transitory computer readable storage medium of claim 9, wherein the instructions further cause the set of processing core resources to:

for a second query operation of the query:

identify a second set of hash values from the plurality of hash values based on the plurality of state information, wherein the second set of hash values are to be used in the execution of the second query operation instead of using a second set of rows of the plurality of rows that the second set of hash values represent;

determine whether there is sufficient available memory space to store the second set of hash values and a second set of corresponding state information of the plurality of state information in allocated main memory for executing the query; and when there is insufficient available memory space:

partition the second set of hash values and the second set of corresponding state information into a second plurality of groups of hash values based on the hash value distribution protocol; and store the second plurality of groups of hash values in a second plurality of non-volatile memory buckets until retrieved to the allocated main memory for execution of the second query operation, wherein the second plurality of non-volatile memory buckets is distributed within the database system.

\* \* \* \* \*